United States Patent
Nakagawa et al.

(10) Patent No.: US 12,437,779 B2
(45) Date of Patent: Oct. 7, 2025

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Naoyuki Narita, Funabashi (JP); Masayuki Takagishi, Kunitachi (JP); Tomoyuki Maeda, Kawasaki (JP); Tazumi Nagasawa, Yokohama (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/765,906

(22) Filed: Jul. 8, 2024

(65) Prior Publication Data
US 2024/0363141 A1    Oct. 31, 2024

Related U.S. Application Data

(62) Division of application No. 18/336,085, filed on Jun. 16, 2023, now Pat. No. 12,080,325, which is a
(Continued)

(30) Foreign Application Priority Data

May 28, 2021    (JP) .................... 2021-089833

(51) Int. Cl.
*G11B 5/21* (2006.01)
*G11B 5/127* (2006.01)
*G11B 5/31* (2006.01)

(52) U.S. Cl.
CPC .............. *G11B 5/21* (2013.01); *G11B 5/1278* (2013.01); *G11B 5/3146* (2013.01)

(58) Field of Classification Search
None
See application file for complete search history.

(56) References Cited

U.S. PATENT DOCUMENTS

| | | | |
|---|---|---|---|
| 7,616,412 B2 | 11/2009 | Zhu et al. | |
| 8,582,240 B1 * | 11/2013 | Chen ...................... | G11B 5/399 360/125.3 |

(Continued)

FOREIGN PATENT DOCUMENTS

| | | | | |
|---|---|---|---|---|
| CN | 109560192 A | | 4/2019 | |
| CN | 111681684 A * | | 9/2020 | ............. B32B 15/01 |

(Continued)

OTHER PUBLICATIONS

Vouille et al., "Microscopic mechanisms of giant magnetoresistance", Physical Review B, vol. 60, No. 9, 1999, 13 pages.
(Continued)

*Primary Examiner* — William J Klimowicz
(74) *Attorney, Agent, or Firm* — Oblon, McClelland, Maier & Neustadt, L.L.P.

(57) ABSTRACT

According to one embodiment, a magnetic head includes first and second magnetic poles, and a stacked body provided between the first and second magnetic poles. The stacked body includes a first magnetic layer, a second magnetic layer provided between the first magnetic layer and the second magnetic pole, a first nonmagnetic layer provided between the first and second magnetic layers, a second nonmagnetic layer provided between the second magnetic layer and the second magnetic pole, and a third nonmagnetic layer provided between the first magnetic pole and the first magnetic layer. The first magnetic layer includes a first element including at least one of Fe, Co, or Ni. The
(Continued)

second magnetic layer includes $(Fe_{100-x}Co_x)_{100-y}E_y$. A second element E includes at least one selected from the group consisting of Cr, V, Mn, Yi, and Sc. The first magnetic layer does not include the second element.

17 Claims, 27 Drawing Sheets

Related U.S. Application Data division of application No. 17/586,880, filed on Jan. 28, 2022, now Pat. No. 11,721,359.

(56) References Cited

U.S. PATENT DOCUMENTS

| | | |
|---|---|---|
| 8,687,321 B2 | 4/2014 | Yamada |
| 10,325,618 B1 | 6/2019 | Wu |
| 10,978,098 B1 | 4/2021 | Narita |
| 11,205,447 B2 | 12/2021 | Chen |
| 11,393,493 B1 | 7/2022 | Nakagawa |
| 2008/0268291 A1 | 10/2008 | Akiyama et al. |
| 2009/0316303 A1 | 12/2009 | Yamada et al. |
| 2011/0279921 A1 | 11/2011 | Zhang |
| 2012/0002325 A1* | 1/2012 | Oikawa ............ G11B 5/1278 360/110 |
| 2013/0082787 A1 | 4/2013 | Zhang |
| 2019/0088274 A1 | 3/2019 | Narita et al. |
| 2019/0094315 A1 | 3/2019 | Inubushi |
| 2020/0294535 A1 | 9/2020 | Narita et al. |
| 2021/0074319 A1 | 3/2021 | Takagishi et al. |
| 2021/0142821 A1 | 5/2021 | Iwasaki |
| 2021/0375309 A1 | 12/2021 | Iwasaki |
| 2021/0375312 A1 | 12/2021 | Narita |
| 2022/0005497 A1 | 1/2022 | Takagishi et al. |
| 2022/0068299 A1 | 3/2022 | Iwasaki |
| 2022/0270640 A1 | 8/2022 | Nakagawa |
| 2022/0270641 A1* | 8/2022 | Nakagawa ............ G11B 5/3146 |
| 2023/0178102 A1 | 6/2023 | Nakagawa |

FOREIGN PATENT DOCUMENTS

| | | | |
|---|---|---|---|
| CN | 112614517 A | 4/2021 | |
| CN | 112786074 A | 5/2021 | |
| JP | 2008-277586 A | 11/2008 | |
| JP | 2012-119027 A | 6/2012 | |
| JP | 4951095 B2 * | 6/2012 | ........... G11B 5/1278 |
| JP | 2022-012263 A | 1/2022 | |
| WO | WO-2011052021 A1 | 5/2011 | |

OTHER PUBLICATIONS

Japanese Office Action issued Jul. 23. 2024 in Japanese Patent Application No. 2021-089833 (with English translation)., 9 pages.
Combined Chinese Office Action and Search Report issued on Mar. 7, 2025 in Chinese Patent Application No. 202210078110.4 (with unedited computer-generated English translation of Office Action), 21 pages.
Chinese Notice of Allowance issued on May 30, 2025, in Chinese patent application No. 202210078110.4, citing document Nos. 1, 15 and 24-25, therein, 5 total pages.
Yao Jianmin et al., "Theory of Giant Magneto-impedance Effect in Sandwiched Film", Journal of Capital Normal University (Natural Science Edition), vol. 27, No. 4, Aug. 2006 (with English Abstract and English machine translation).
Jiang Werrhong et al., "Thermal Relaxation of Recorded Signal on Hard Disk at High Recording Density", Acta Electronica Sinica, vol. 29, No. 11, Nov. 2001 (with English Abstract and English machine translation).

* cited by examiner

MAGNETIC HEAD AND MAGNETIC RECORDING DEVICE

CROSS-REFERENCE TO RELATED APPLICATIONS

This application is a divisional application of U.S. application Ser. No. 18/336,085, filed Jun. 16, 2024, which is a divisional of and claims benefit under 35 U.S.C. § 120 to U.S. application Ser. No. 17/586,880 filed Jan. 28, 2022 (now U.S. Pat. No. 11,721,359), which is based upon and claims the benefit of priority under 35 U.S.C. § 119 from Japanese Patent Application No. 2021-089833, filed May 28, 2021, the entire contents of each of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

Figure 1A:
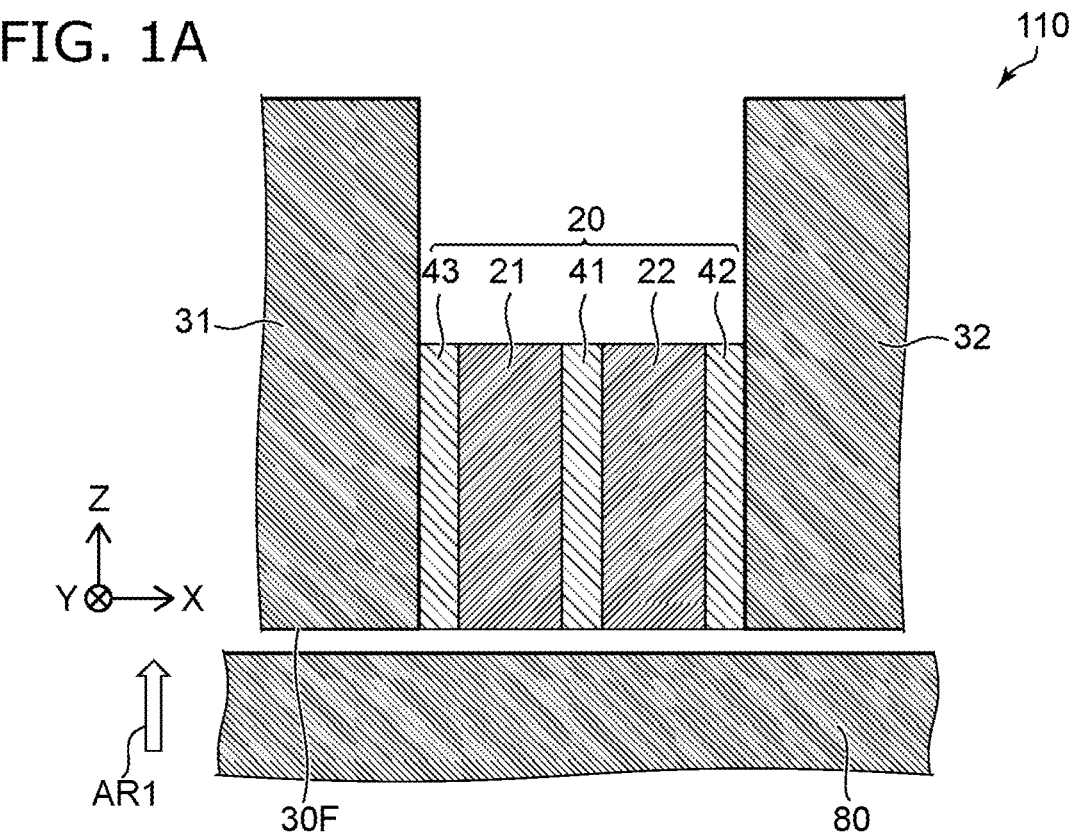
FIGS. 1A and 1B are schematic views illustrating a magnetic head according to a first embodiment.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic layer and the second magnetic pole, a first nonmagnetic layer provided between the first magnetic layer and the second magnetic layer, a second nonmagnetic layer provided between the second magnetic layer and the second magnetic pole, and a third nonmagnetic layer provided between the first magnetic pole and the first magnetic layer. The first magnetic layer includes a first element including at least one of Fe, Co, or Ni. The second magnetic layer includes $(Fe_{100-x}Co_x)_{100-y}E_y$ (10 atomic %≤x≤50 atomic %, 10 atomic %≤y≤90 atomic %). A second element E includes at least one selected from the group consisting of Cr, V, Mn, Ti, and Sc. The first magnetic layer does not include the second element, or a concentration of the second element in the first magnetic layer is less than a concentration of the second element in the second magnetic layer.

According to one embodiment, a magnetic recording device includes the magnetic head described above, and an electrical circuit. The electrical circuit is configured to supply a current to the stacked body. The current has an orientation from the first magnetic layer toward the second magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
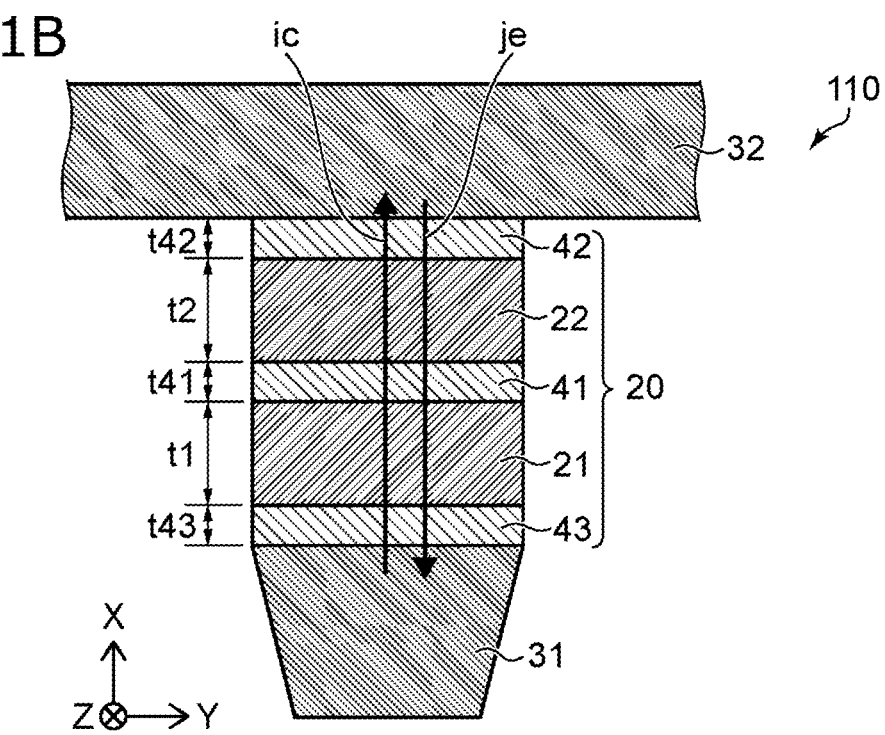

FIGS. 1A and 1B are schematic views illustrating a magnetic head according to a first embodiment FIG. 1A is a cross-sectional view. FIG. 1B is a plan view viewed in a direction of an arrow AR1 of FIG. 1A.

Figure 2:
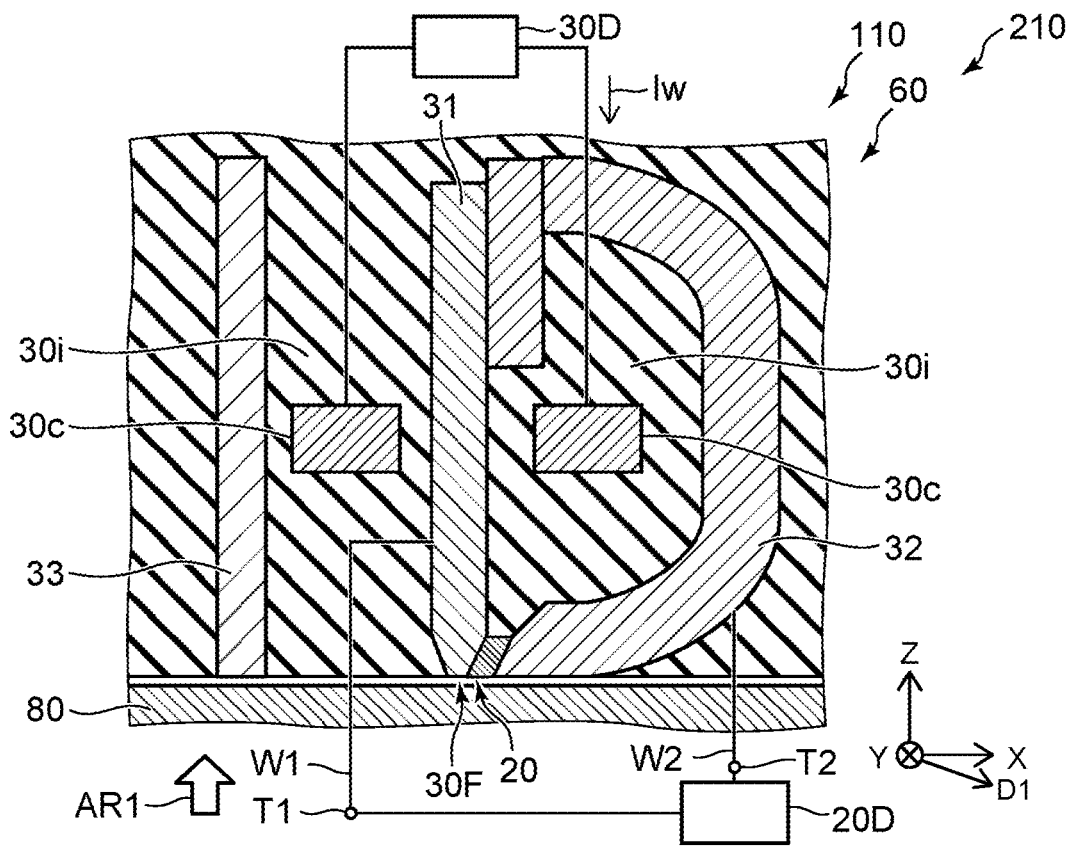
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, a magnetic recording device 210 according to the embodiment includes a magnetic head 110 and an electrical circuit 20D. The magnetic recording device 210 may include a magnetic recording medium 80. At least the recording operation is performed in the magnetic recording device. In the recording operation, information is recorded on the magnetic 20 recording medium 80 using the magnetic head 110.

The magnetic head 110 includes a recording part 60. As will be described later, the magnetic head 110 may include a reproducing part. The recording part 60 includes a first magnetic pole 31, a second magnetic pole 32, and a stacked body 20. The stacked body 20 is located between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be a trailing shield, and the second magnetic pole 32 may be a main magnetic pole.

The direction from the magnetic recording medium 80 toward the magnetic head 110 is taken as a Z-axis direction. One direction perpendicular to the Z-axis direction is taken as an X-axis direction. The direction perpendicular to the Z-axis direction and the X-axis direction is taken as a Y-axis direction. The Z-axis direction corresponds to, for example, a height direction. The X-axis direction corresponds to, for example, a down track direction. The Y-axis direction corresponds to, for example, a cross-track direction. The magnetic recording medium 80 and the magnetic head 110 move relatively along the down track direction. A magnetic field (recording magnetic field) generated from the magnetic head 110 is applied to a desired position of the magnetic recording medium 80. The magnetization of the magnetic recording medium 80 at a desired position is controlled in a direction corresponding to the recording magnetic field. As a result, information is recorded on the magnetic recording medium 80.

The direction from the first magnetic pole 31 toward the second magnetic pole 32 is taken as a first direction D1. The first direction D1 substantially follows the X-axis direction. In the embodiment, the first direction D1 may be inclined at a small angle with respect to the X-axis direction.

As shown in FIG. 2, a coil 30c is provided. In this example, a portion of the coil 30c is between the first magnetic pole 31 and the second magnetic pole 32. In this example, a shield 33 is provided. In the X-axis direction, there is the first magnetic pole 31 between the shield 33 and the second magnetic pole 32. Another portion of the coil 30c is between the shield 33 and the first magnetic pole 31. An insulating portion 30i is provided between these multiple elements. The shield 33 is, for example, a leading shield. The magnetic head 110 may include a side shield (not shown).

As shown in FIG. 2, a recording current Iw is supplied to the coil 30c from a recording circuit 30D. A recording magnetic field corresponding to the recording current Iw is applied to the magnetic recording medium 80 from the first magnetic pole 31.

As shown in FIG. 2, the first magnetic pole 31 includes a medium facing surface 30F. The medium facing surface 30F is, for example, ABS (Air Bearing Surface). The medium facing surface 30F faces, for example, the magnetic recording medium 80. The medium facing surface 30F is, for example, along the XY plane.

As shown in FIG. 2, the electrical circuit 20D is electrically connected to the stacked body 20. In this example, the stacked body 20 is electrically connected to the first magnetic pole 31 and the second magnetic pole 32. The magnetic head 110 is provided with a first terminal T1 and a second terminal T2. The first terminal T1 is electrically connected to the stacked body 20 via a first wiring W1 and the first magnetic pole 31. The second terminal T2 is electrically connected to the stacked body 20 via a second wiring W2 and the second magnetic pole 32. From the electrical circuit 20D, for example, a current (for example, a direct current) is supplied to the stacked body 20.

As shown in FIGS. 1A and 1B, the stacked body 20 includes a first magnetic layer 21, a second magnetic layer 22, a third magnetic layer 23, a first nonmagnetic layer 41, and a second nonmagnetic layer 42, and a third nonmagnetic layer 43. In FIGS. 1A and 1B, the insulating portion 30i is omitted.

The second magnetic layer 22 is located between the first magnetic layer 21 and the second magnetic pole 32. The first nonmagnetic layer 41 is located between the first magnetic layer 21 and the second magnetic layer 22. The second nonmagnetic layer 42 is located between the second magnetic layer 22 and the second magnetic pole 32. The third nonmagnetic layer 43 is located between the first magnetic pole 31 and the first magnetic layer 21.

For example, the third nonmagnetic layer 43 may be in contact with the first magnetic pole 31 and the first magnetic layer 21. The first nonmagnetic layer 41 may be in contact with the first magnetic layer 21 and the second magnetic layer 22. The second nonmagnetic layer 42 may be in contact with the second magnetic layer 22 and the second magnetic pole 32.

At least one of the first nonmagnetic layer 41, the second nonmagnetic layer 42, or the third nonmagnetic layer 43 includes a third element. The third element includes, for example, at least one selected from the group consisting of Cu, Au, Cr, V, Al, and Ag. In a nonmagnetic layer including such a material, for example, high spin transmittance can be obtained. For example, high oscillation strength can be obtained.

At least one of the second nonmagnetic layer 42 or the third nonmagnetic layer 43 may include a fourth element. The fourth element includes, for example, at least one selected from the group consisting of Ru, Ir, Ta, Rh, Pd, Pt, and W. In a nonmagnetic layer including such a material, for example, low spin transmittance can be obtained. For example, stable oscillation can be easily obtained. At least one of the second nonmagnetic layer 42 or the third nonmagnetic layer 43 may include the above-mentioned third element and fourth element.

In the first embodiment, the first magnetic layer 21 includes a first element. The first element includes at least one of Fe, Co, or Ni.

The second magnetic layer 22 includes the first element and a second element. The second element includes at least one selected from the group consisting of Cr, V, Mn, Ti, and Sc. The first magnetic layer 21 does not include the second element. Or, a concentration of the second element in the first magnetic layer 21 is less than a concentration of the second element in the second magnetic layer 22.

For example, the concentration of the second element in the second magnetic layer 22 is not less than 10 atomic % and not more than 80 atomic %. The second magnetic layer 22 including such a material has, for example, negative spin polarization. On the other hand, for example, the first magnetic layer 21 has positive spin polarization.

As shown in FIG. 1B, a current ic is supplied to such a stacked body 20. The current ic is supplied from, for example, the electrical circuit 20D described above. As shown in FIG. 1B, the current ic has an orientation from the first magnetic layer 21 toward the second magnetic layer 22. As shown in FIG. 1B, an electron flow je accompanying the current ic has an orientation from the second magnetic layer 22 toward the first magnetic layer 21.

For example, when the current ic that is not less than a threshold value flows through the stacked body 20, the magnetization of the magnetic layer included in the stacked body 20 oscillates. The stacked body 20 functions as, for example, an STO (Spin-Torque Oscillator). An alternating magnetic field (for example, a high frequency magnetic field) is generated from the stacked body 20 with the oscillation. The alternating magnetic field generated by the stacked body 20 is applied to the magnetic recording medium 80, and writing to the magnetic recording medium 80 is assisted. For example, MAMR (Microwave Assisted Magnetic Recording) can be performed.

In the magnetic head 110, the first magnetic layer 21 and the second magnetic layer 22 function as, for example, an oscillation layer. For example, the spin torque of negative transmission from the second magnetic layer 22 acts on the first magnetic layer 21. For example, the spin torque reflected by the first magnetic layer 21 acts on the second magnetic layer 22. For example, the magnetization of the first magnetic layer 21 and the magnetization of the second magnetic layer 22 rotate while interacting with each other.

As shown in FIG. 1B, the thickness of the first magnetic layer 21 along the first direction (direction from the first magnetic pole 31 toward the second magnetic pole 32) is taken as a first thickness t1. The thickness of the second magnetic layer 22 along the first direction is taken as a second thickness t2. In the first embodiment, for example, the first thickness t1 may be the same as the second thickness t2. This makes it easier to obtain oscillation, as will be described later.

The thickness of the first nonmagnetic layer 41 along the first direction is taken as a thickness t41. The thickness of the second nonmagnetic layer 42 along the first direction is taken as a thickness t42. The thickness of the third nonmagnetic layer 43 along the first direction is taken as a thickness t43. These thicknesses are, for example, not less than 0.5 nm and not more 6 nm. When these thicknesses are not less than 0.5 nm, stable oscillation becomes easy. When these thicknesses are not more than 6 nm, for example, the spin transmittance tends to be high. For example, it is easy to obtain high oscillation strength.

In the following, an example of simulation results regarding the behavior of oscillation in the stacked body 20 will be described. In the simulation model, the configuration shown in FIG. 1B is provided. That is, the first magnetic pole 31, the second magnetic pole 32, the first magnetic layer 21, the second magnetic layer 22, and the first to third nonmagnetic layers 41 to 43 are provided. The oscillation characteristics of magnetization when the current ic (current not less than the threshold value) illustrated in FIG. 1B is supplied is simulated. In the simulation model, the physical characteristic value of the $Fe_{70}Co_{30}$ alloy is used as the physical characteristic value of the first magnetic layer 21. The physical characteristic value of the $Fe_{70}Cr_{30}$ alloy is used as the physical characteristic value of the second magnetic layer 22. The physical characteristic value of Cu is used as the physical characteristic value of the first nonmagnetic layer 41 and the third nonmagnetic layer 43. The physical characteristic value of Ta is used as the physical characteristic value of the second nonmagnetic layer 42. The thicknesses t41 to t43 are 2 nm.

Figure 3:
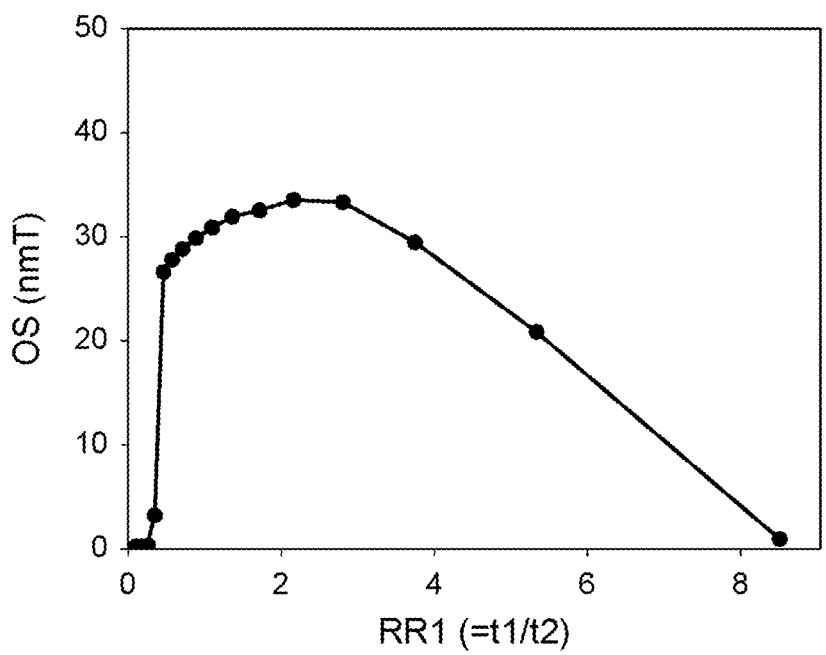
FIG. 3 is a graph illustrating characteristics of the magnetic head.

FIG. 3 is a graph illustrating characteristics of the magnetic head.

In the simulation illustrated in FIG. 3, a sum of the first thickness t1 of the first magnetic layer 21 and the second thickness t2 of the second magnetic layer 22 is kept constant at 19 nm, and a ratio of the first thickness t1 to the second thickness t2 is changed. The horizontal axis of FIG. 3 is a thickness ratio RR1. The thickness ratio RR1 is a ratio of the first thickness t1 to the second thickness t2 (that is, t1/t2). The vertical axis is oscillation strength OS. The oscillation strength OS is a sum of the product of the amplitude of the magnetization of the first magnetic layer 21 and the first thickness t1 and the product of the amplitude of the vibration of the magnetization of the second magnetic layer 22 and the second thickness t2. When the oscillation strength OS is high, for example, the recording density by MAMR is likely to be improved.

As shown in FIG. 3, when the thickness ratio RR1 is close to 1, the high oscillation strength OS can be obtained. For example, stable oscillation can be obtained when the thickness ratio RR1 is not less than 0.25 and not more than 4. The thickness ratio RR1 may be not less than 0.33. Higher oscillation strength OS can be obtained. The thickness ratio RR1 may be not more than 3. Higher oscillation strength OS can be obtained.

In the first embodiment, the first thickness t1 is preferably not less than 0.25 times and not more than 4 times the second thickness t2. As a result, high oscillation strength OS can be obtained. Stable oscillation can be obtained. The first thickness t1 may be not less than 0.33 times and not more than 3 times of the second thickness t2. Higher oscillation strength OS can be obtained. More stable oscillation can be obtained. According to the first embodiment, stable MAMR can be carried out. It is possible to provide a magnetic head which is possible to improve the recording density.

Figure 4A:
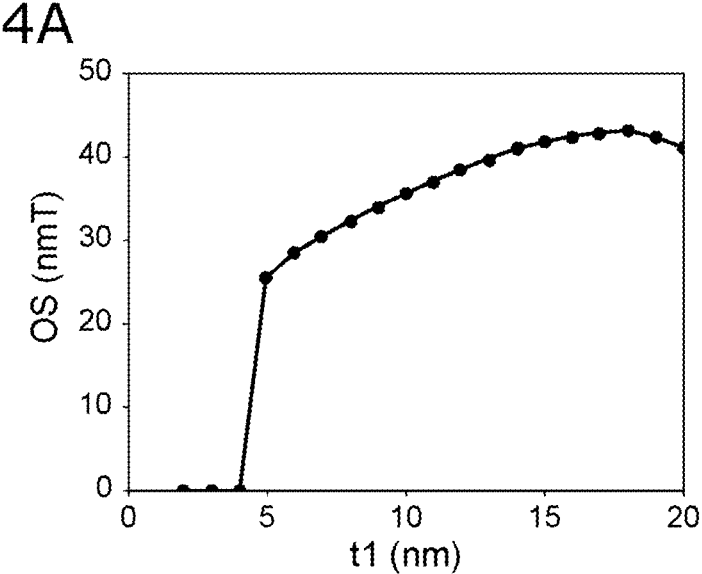
FIGS. 4A and 4B are graphs illustrating characteristics of the magnetic head.
Figure 4B:
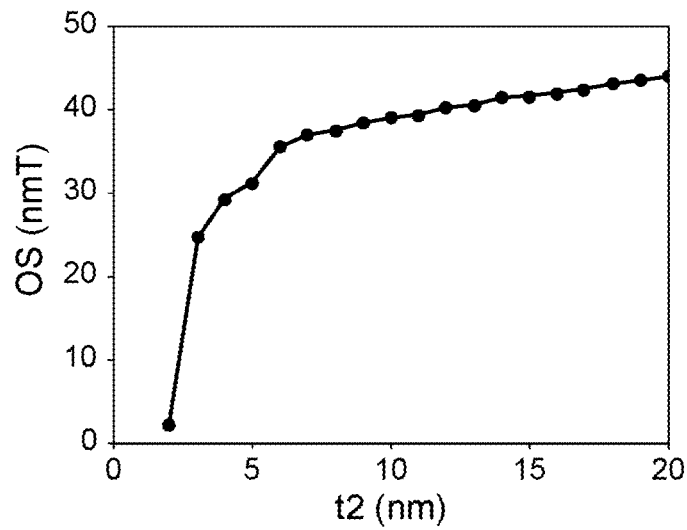

FIGS. 4A and 4B are graphs illustrating characteristics of the magnetic head.

The horizontal axis of FIG. 4A is the first thickness t1. In FIG. 4A, the second thickness t2 is 15 nm. The horizontal axis of FIG. 4B is the second thickness t2. In FIG. 4B, the first thickness t1 is 15 nm. In FIGS. 4A and 4B, the current ic supplied to the stacked body 20 is $2.5 \times 10^8$ A/cm$^2$. The vertical axis of FIGS. 4A and 4B is the oscillation strength OS.

As shown in FIG. 4A, the first thickness t1 is preferably not less than 5 nm. As a result, high oscillation strength OS can be obtained. The first thickness t1 may be, for example, not more than 20 nm. For example, the distance between the first magnetic pole 31 and the second magnetic pole 32 (for example, a recording gap) can be shortened. For example, it is easy to obtain a high recording density.

As shown in FIG. 4B, the second thickness t2 is preferably not less than 5 nm. As a result, high oscillation strength OS can be obtained. The second thickness t2 may be not more than 20 nm. For example, the recording gap can be shortened. For example, it is easy to obtain a high recording density.

Figure 5:
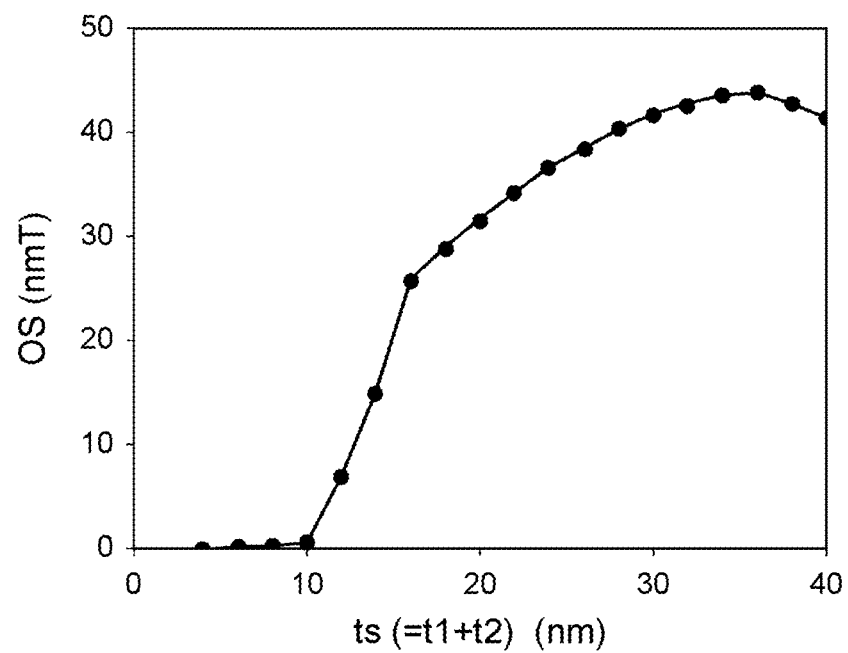
FIG. 5 is a graph illustrating characteristics of the magnetic head.

FIG. 5 is a graph illustrating characteristics of the magnetic head.

The horizontal axis of FIG. 5 is a sum ts of the first thickness t1 and the second thickness t2. The vertical axis is oscillation strength OS.

As shown in FIG. 5, the sum ts of the first thickness t1 and the second thickness t2 is preferably not less than 15 nm. As a result, high oscillation strength OS can be obtained. The sum ts may be not more than 40 nm. For example, the recording gap can be shortened. For example, it is easy to obtain a high recording density.

Figure 6A:
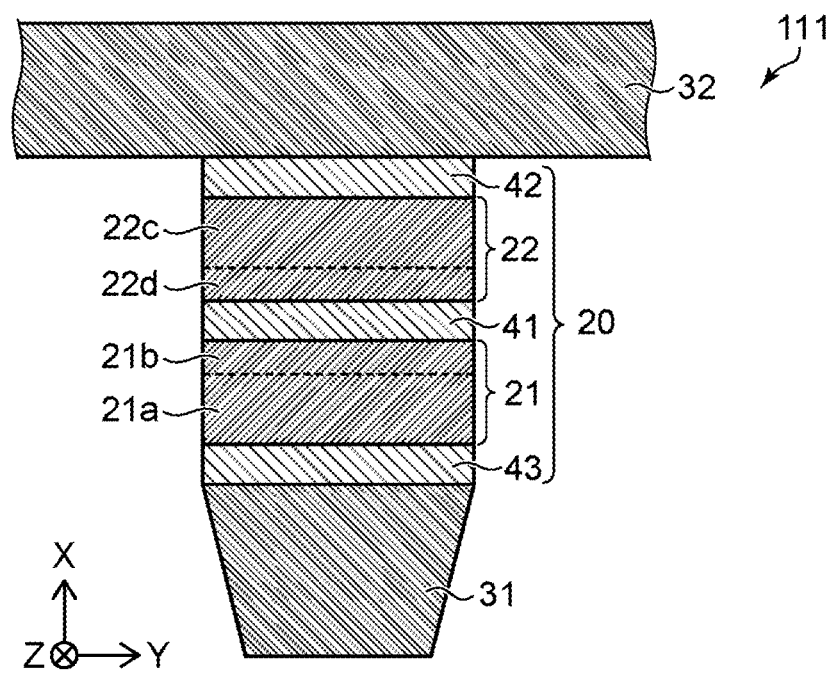
FIGS. 6A and 6B are schematic plan views illustrating the magnetic head according to the first embodiment.
Figure 6B:
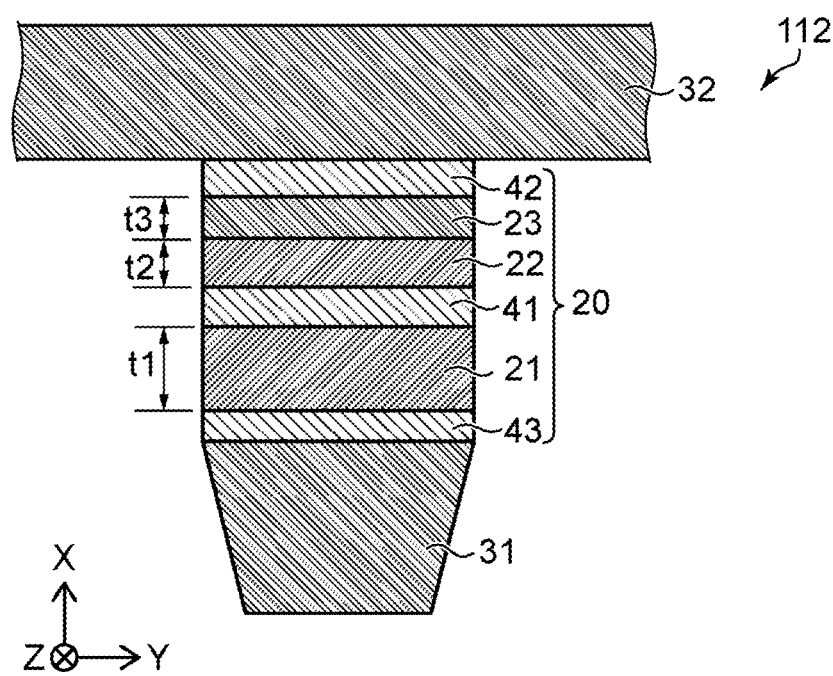

FIGS. 6A and 6B are schematic plan views illustrating the magnetic head according to the first embodiment.

As shown in FIG. 6A, a magnetic head 111 according to the first embodiment includes the first magnetic pole 31, the second magnetic pole 32, and the stacked body 20. In the magnetic head 111 as well, the stacked body 20 includes the first magnetic layer 21, the second magnetic layer 22, the first nonmagnetic layer 41, the second nonmagnetic layer 42, and the third nonmagnetic layer 43. In the magnetic head 111, at least one of the first magnetic layer 21 or the second magnetic layer 22 includes multiple regions. Other configurations of the magnetic head 111 may be the same as those of the magnetic head 110.

For example, the first magnetic layer 21 includes a first magnetic region 21a and a second magnetic region 21b. The second magnetic region 21b is between the first magnetic region 21a and the first nonmagnetic layer 41. For example, saturation magnetization of the first magnetic region 21a is greater than saturation magnetization of the second magnetic region 21b. This makes it easy to obtain stable oscillation, for example.

For example, the saturation magnetization of the first magnetic region 21a is not less than 1.2 times the saturation magnetization of the second magnetic region 21b. As a result, stable oscillation can be easily obtained. The saturation magnetization of the first magnetic region 21a may be not more than 3 times the saturation magnetization of the second magnetic region 21b. As a result, stable oscillation can be easily obtained.

For example, a concentration of Fe in the first magnetic region 21a is greater than a concentration of Fe in the second magnetic region 21b. For example, the saturation magnetization of the first magnetic region 21a tends to be greater than the saturation magnetization of the second magnetic region 21b. For example, a concentration of Ni in the first magnetic region 21a is less than a concentration of Ni in the second magnetic region 21b. As a result, for example, the saturation magnetization of the first magnetic region 21a tends to be greater than the saturation magnetization of the second magnetic region 21b. The boundary between the first magnetic region 21a and the second magnetic region 21b may be clear or unclear.

For example, the second magnetic layer 22 includes a third magnetic region 22c and a fourth magnetic region 22d. The fourth magnetic region 22d is between the third magnetic region 22c and the first nonmagnetic layer 41. For example, saturation magnetization of the third magnetic region 22c is greater than saturation magnetization of the fourth magnetic region 22d. This makes it easy to obtain stable oscillation, for example.

For example, the saturation magnetization of the third magnetic region 22c is not less than 1.2 times the saturation magnetization of the fourth magnetic region 22d. This makes it easy to obtain stable oscillation. The saturation magnetization of the third magnetic region 22c may be not more than 3 times the saturation magnetization of the fourth magnetic region 22d. This makes it easy to obtain stable oscillation.

For example, a concentration of Fe in the third magnetic region 22c is greater than a concentration of Fe in the fourth magnetic region 22d. As a result, for example, the saturation magnetization of the third magnetic region 22c tends to be greater than the saturation magnetization of the fourth magnetic region 22d. For example, a concentration of the second element in the third magnetic region 22c is less than a concentration of the second element in the fourth magnetic region 22d. As a result, for example, the saturation magnetization of the third magnetic region 22c tends to be greater than the saturation magnetization of the fourth magnetic region 22d. The boundary between the third magnetic region 22c and the fourth magnetic region 22d may be clear or unclear.

As shown in FIG. 6B, a magnetic head 112 according to the first embodiment includes the first magnetic pole 31, the second magnetic pole 32, and the stack body 20. In the magnetic head 112, the stacked body 20 includes a third magnetic layer 23 in addition to the first magnetic layer 21, the second magnetic layer 22, the first nonmagnetic layer 41, the second nonmagnetic layer 42, and the third nonmagnetic layer 43. Other configurations of the magnetic head 112 may be the same as those of the magnetic head 110 or the magnetic head 111.

The third magnetic layer 23 is located between the second magnetic layer 22 and the second nonmagnetic layer 42. The third magnetic layer 23 includes the first element including at least one of Fe, Co, or Ni. The third magnetic layer 23 does not include the second element. Or, a concentration of the second element in the third magnetic layer 23 is less than a concentration of the second element in the second magnetic layer 22. As described above, the second element includes at least one selected from the group consisting of Cr, V, Mn, Ti, and Sc.

For example, saturation magnetization of the third magnetic layer 23 is greater than saturation magnetization of the second magnetic layer 22. This makes it easy to obtain stable oscillation, for example. The boundary between the third magnetic layer 23 and the first magnetic layer 21 may be clear or unclear. The third magnetic layer 23 may be continuous with the second magnetic layer 22.

In the magnetic head 112, the first thickness t1 of the first magnetic layer 21 is, for example, not less than 0.8 times and not more than 1.25 times a sum of the third thickness t3 of the third magnetic layer 23 along the first direction (direction from the first magnetic pole 31 toward the second magnetic pole 32) and the second thickness t2 of the second magnetic layer 22. For example, high oscillation strength OS can be obtained. Stable oscillation can be obtained.

Figure 7A:
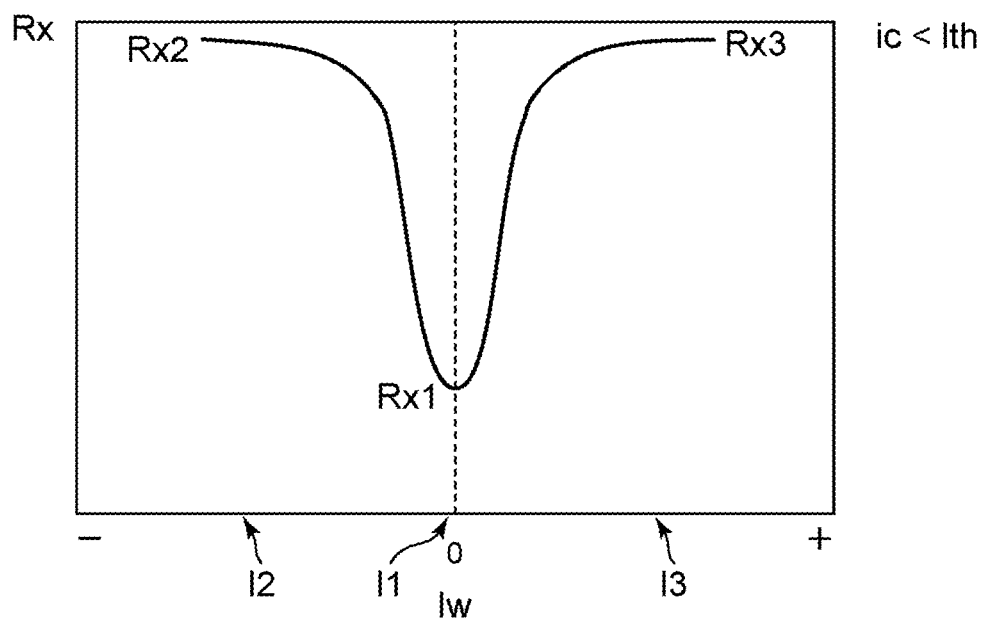
FIGS. 7A and 7B are schematic views illustrating characteristics of the magnetic head according to the embodiment.
Figure 7B:
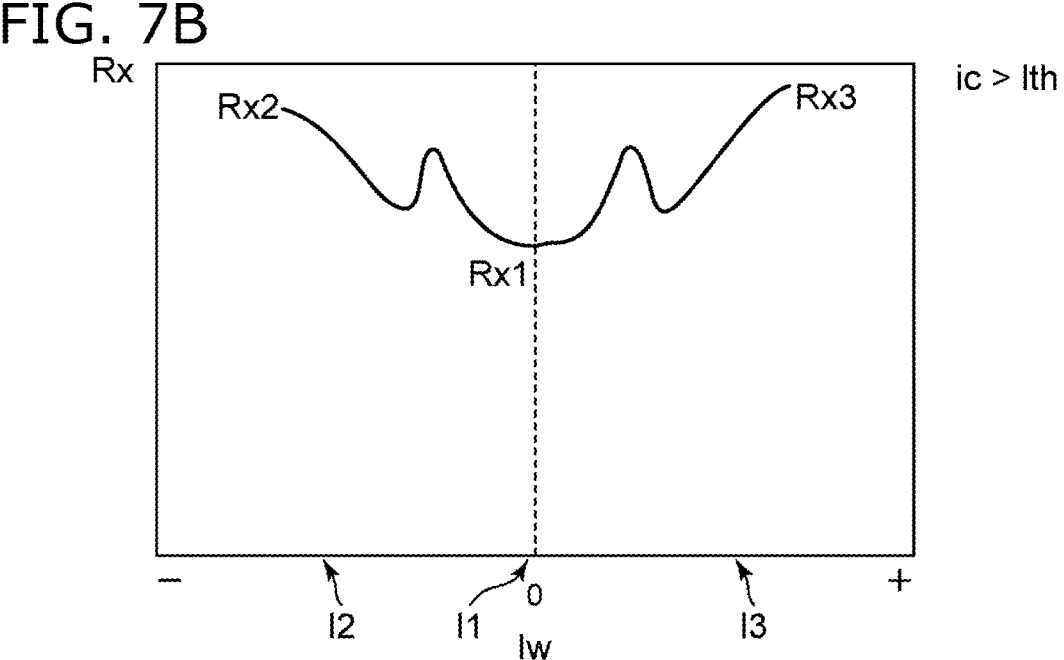

FIGS. 7A and 7B are schematic views illustrating characteristics of the magnetic head according to the first embodiment.

The horizontal axis of FIGS. 7A and 7B is the recording current Iw flowing through the coil 30c. The recording magnetic field generated from at least one of the first magnetic pole 31 or the second magnetic pole 32 changes according to the recording current Iw flowing through the coil 30c. The recording magnetic field is applied to the stacked body 20. Therefore, the horizontal axis corresponds to the magnetic field applied to the stacked body 20. The vertical axis of FIGS. 7A and 7B is an electrical resistance Rx of the stacked body 20.

In FIG. 7A, the current ic supplied to the stacked body 20 is less than a threshold current Ith of oscillation. In the example of FIG. 7A, the current ic is, for example, $1.0 \times 10^6$ A/cm$^2$. In FIG. 7B, the current ic supplied to the stacked body 20 is greater than the threshold current Ith. In the example of FIG. 7B, the current ic is $1.0 \times 10^8$ A/cm$^2$. The current ic in FIG. 7B is 100 times the current ic in FIG. 7A. FIG. 7A corresponds to characteristics in the non-oscillating state. FIG. 7B corresponds to characteristics in the oscillating state. These figures illustrate characteristics of the temporal average value of the electrical resistance Rx. When the stacked body 20 is oscillating, the electrical resistance Rx changes with the oscillation. A temporal average resistance is adopted as the electrical resistance Rx. The time average can also suppress the influence of noise, for example.

As shown in FIG. 7A, in a case where the current ic is sufficiently less than the threshold current Ith, the electrical resistance Rx increases as the absolute value of the recording current Iw (that is, the magnetic field) increases. When the absolute value of the recording current Iw is sufficiently large, the electrical resistance Rx is saturated. For example, the recording current Iw when the electrical resistance Rx is saturated is, for example, 50 mA. The magnetic field at this time is about 15,000 Oe.

In the magnetic recording device head according to the first embodiment, for example, the characteristics illustrated in FIG. 7A occur. As shown in FIG. 7A, the electrical resistance Rx of the stacked body 20 is a first resistance Rx1 when the recording current Iw is a first current I1. The electrical resistance Rx is a second resistance Rx2 when the recording current Iw is a second current I2. The electrical resistance Rx is a third resistance Rx3 when the recording current Iw is a third current I3. The absolute value of the first current I1 is less than the absolute value of the second current I2 and less than the absolute value of the third current I3. The orientation of the second current I2 is opposite to the orientation of the third current I3. The first resistance Rx1 is less than the second resistance Rx2 and is less than the third resistance Rx3. For example, a valley-shaped current-resistance characteristic occurs. The first current I1 may be substantially 0.

As shown in FIG. 7B, in a case where the current ic is greater than the threshold current Ith and oscillation occurs, the electrical resistance Rx shows the characteristics of peaks and valleys. Also in this case, if the absolute values of the second current I2 and the third current I3 are sufficiently large, it can be regarded as a valley-shaped characteristic. For example, the absolute values of the second current I2 and the third current I3 may be values when the electrical resistance Rx is saturated in a case where the current ic is sufficiently less than the threshold current Ith. Also in this case, the first resistance Rx1 is less than the second resistance Rx2 and is less than the third resistance Rx3. On the other hand, in a general STO, a mountain-shaped characteristic occurs. The valley-shaped characteristics in the first embodiment are considered to be specific characteristics depending on the configuration according to the first embodiment.

Such specific characteristics may be related to the fact that the first magnetic layer 21 has positive polarization and the second magnetic layer 22 has negative polarization. In such a combination, in a case where the absolute value of the recording current Iw is large (that is, a case where the absolute value of the magnetic field is large), the orientations of magnetization of the first magnetic layer 21 and the second magnetic layer 22 are close to parallel to each other, and the resistance is considered to be increasing. In a general STO, each magnetic layer has positive polarization. The resistance decreases when the magnetization orientations are close to parallel to each other.

Figure 8:
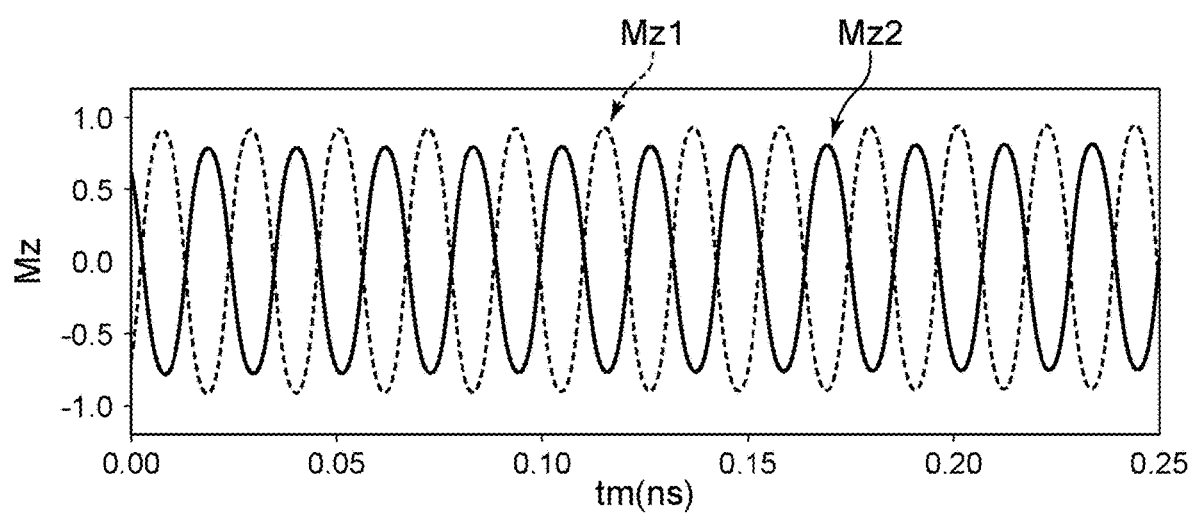
FIG. 8 is a schematic view illustrating characteristics of the magnetic head according to the first embodiment.

FIG. 8 is a schematic view illustrating characteristics of the magnetic head according to the first embodiment.

The horizontal axis in FIG. 8 is a time tm. The vertical axis is magnetization Mz (normalized value). FIG. 8 shows an example relating to magnetization Mz1 of the first magnetic layer 21 and magnetization Mz2 of the second magnetic layer 22. As shown in FIG. 8, the magnetization Mz1 and the magnetization Mz2 rotate in opposite phases (for example, in a state where the opposite orientations are kept).

The first embodiment may include the following configurations (e.g., technical proposals).

Configuration 1

A magnetic head, comprising:
a first magnetic pole;
a second magnetic pole; and
a stacked body provided between the first magnetic pole and the second magnetic pole,
the stacked body including
 a first magnetic layer,
 a second magnetic layer provided between the first magnetic layer and the second magnetic pole,
 a first nonmagnetic layer provided between the first magnetic layer and the second magnetic layer,
 a second nonmagnetic layer provided between the second magnetic layer and the second magnetic pole, and
 a third nonmagnetic layer provided between the first magnetic pole and the first magnetic layer,
the first magnetic layer including a first element including at least one of Fe, Co, or Ni,
the second magnetic layer including the first element, and a second element including at least one selected from the group consisting of Cr, V, Mn, Ti, and Sc, the first magnetic layer not including the second element, or a concentration of the second element in the first magnetic layer being less than a concentration of the second element in the second magnetic layer, and a first thickness of the first magnetic layer along a first direction from the first magnetic pole toward the second magnetic pole being not less than 0.25 times and not more than 4 times a second thickness of the second magnetic layer along the first direction.

Configuration 2

The magnetic head according to Configuration 1, wherein the first thickness is not less than 0.33 times the second thickness.

Configuration 3

The magnetic head according to Configuration 1 or 2, wherein
the third nonmagnetic layer contacts the first magnetic pole and the first magnetic layer.

Configuration 4

The magnetic head according to one of Configurations 1 to 3, wherein
the first nonmagnetic layer contacts the first magnetic layer and the second magnetic layer.

Configuration 5

The magnetic head according to one of Configurations 1 to 4, wherein
the second nonmagnetic layer contacts the second magnetic layer and the second magnetic pole.

Configuration 6

The magnetic head according to Configuration 1, wherein at least one of the first nonmagnetic layer, the second nonmagnetic layer, or the third nonmagnetic layer includes a third element including at least one selected from the group consisting of Cu, Au, Cr, V, Al, or Ag.

Configuration 7

The magnetic head according to one of Configurations 1 to 6, wherein
the second thickness is not less than 5 nm.

Configuration 8

The magnetic head according to one of Configurations 1 to 7, wherein
the first thickness is not less than 5 nm.

Configuration 9

The magnetic head according to one of Configurations 1 to 8, wherein
a sum of the first thickness and the second thickness is not less than 15 nm.

Configuration 10

The magnetic head according to one of Configurations 1 to 9, wherein
the first magnetic layer includes a first magnetic region and a second magnetic region,
the second magnetic region is between the first magnetic region and the first nonmagnetic layer, and
saturation magnetization of the first magnetic region is greater than saturation magnetization of the second magnetic region.

Configuration 11

The magnetic head according to one of Configurations 1 to 9, wherein
the first magnetic layer includes a first magnetic region and a second magnetic region,
the second magnetic region is between the first magnetic region and the first nonmagnetic layer, and
a concentration of Fe in the first magnetic region is greater than a concentration of Fe in the second magnetic region.

Configuration 12

The magnetic head according to one of Configurations 1 to 11, wherein
the second magnetic layer includes a third magnetic region and a fourth magnetic region,
the fourth magnetic region is between the third magnetic region and the first nonmagnetic layer, and
saturation magnetization of the third magnetic region is greater than saturation magnetization of the fourth magnetic region.

Configuration 13

The magnetic head according to one of configurations 1 to 12, wherein
the second magnetic layer includes a third magnetic region and a fourth magnetic region,
the fourth magnetic region is between the third magnetic region and the first nonmagnetic layer, and
a concentration of Fe in the third magnetic region is greater than a concentration of Fe in the fourth magnetic region.

Configuration 14

The magnetic head according to one of Configurations 1 to 13, wherein
the stacked body further includes a third magnetic layer,
the third magnetic layer is provided between the second magnetic layer and the second nonmagnetic layer,
the third magnetic layer includes a first element including at least one of Fe, Co, or Ni, and
the third magnetic layer does not include the second element, or a concentration of the second element in the third magnetic layer is less than a concentration of the second element in the second magnetic layer.

Configuration 15

The magnetic head according to one of Configurations 1 to 14, wherein
a concentration of the second element in the second magnetic layer is not less than 10 atomic % and not more than 80 atomic %.

Configuration 16

The magnetic head according to one of Configurations 1 to 15, wherein
a current is supplied to the stacked body in an orientation from the first magnetic layer toward the second magnetic layer.

Configuration 17

The magnetic head according to Configurations 16, wherein
an alternating magnetic field is generated from the stacked body when the current is supplied to the stacked body.

Configuration 18

The magnetic head according to one of Configurations 1 to 17, further comprising:
a coil,
a recording magnetic field generated from at least one of the first magnetic pole or the second magnetic pole changing according to a recording current flowing through the coil,
an electrical resistance of the stacked body being a first resistance when the recording current is a first current,
the electrical resistance being a second resistance when the recording current is a second current,
the electrical resistance being a third resistance when the recording current is a third current,
an absolute value of the first current being less than an absolute value of the second current, and being less than an absolute value of the third current,
an orientation of the second current being opposite to an orientation of the third current, and
the first resistance being less than the second resistance, and being less than the third resistance.

Configuration 19

A magnetic recording device, comprising:
the magnetic head according to one of Configurations 1 to 16; and
an electrical circuit,
the electrical circuit being configured to supply a current to the stacked body, and
the current having an orientation from the first magnetic layer toward the second magnetic layer.

Configuration 20

The magnetic recording device according to Configuration 19, wherein
when the electrical circuit supplies a current to the stacked body, an alternating magnetic field is generated from the stacked body.

In the first embodiment, the second magnetic layer 22 includes $(Fe_{100-x}Co_x)_{100-y}E_y$ (10 atomic %≤x≤50 atomic %, 10 atomic %≤y≤90 atomic %). A second element E includes at least one selected from the group consisting of Cr, V, Mn, Ti and Sc. The composition ratio x and the composition ratio y are atomic percentages (atomic %). The first magnetic layer 21 does not include the second element E. Alternatively, the concentration of the second element E in the first magnetic layer 21 is less than the concentration of the second element E in the second magnetic layer 22. With such a material, in the second magnetic layer 22, for example, a high saturation magnetic flux density and a negative spin polarization having a large absolute value can be easily obtained.

Figure 9A:
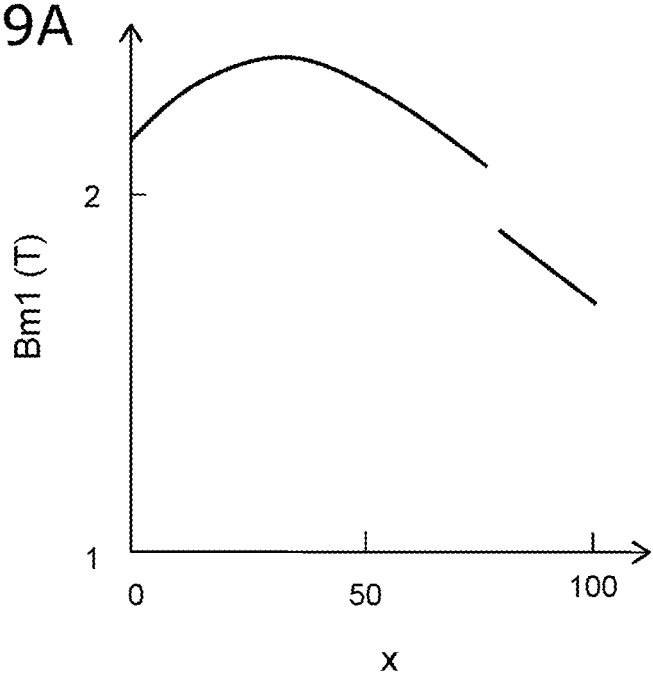
FIGS. 9A and 9B are graphs illustrating the characteristics of the magnetic layer included in the magnetic head.
Figure 9B:
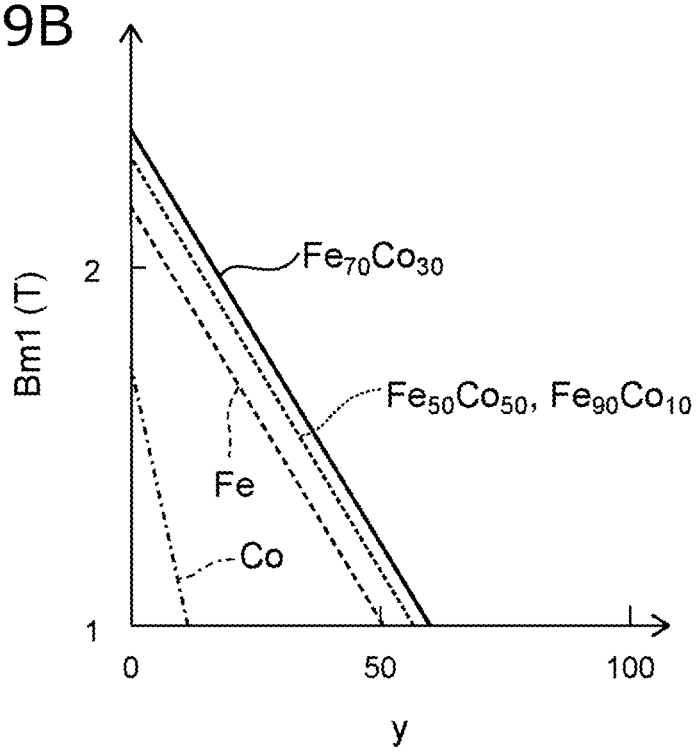

FIGS. 9A and 9B are graphs illustrating the characteristics of the magnetic layer included in the magnetic head.

FIG. 9A illustrates the characteristics when the magnetic layer does not include the second element. In this example, the magnetic layer includes $Fe_{100-x}Co_x$. The horizontal axis of FIG. 9A is the composition ratio x (concentration of Co). The vertical axis is the saturation magnetic flux density Bm1. As shown in FIG. 9A, a high saturation magnetic flux density Bm1 can be obtained when the composition ratio x is not less than 10 atomic % and not more than 50 atomic %. When the composition ratio x is not more than 75 atomic %, the magnetic layer has a BCC structure. When the composition ratio x exceeds 75 atomic %, the magnetic layer has an fcc structure.

FIG. 9B illustrates the characteristics when the composition ratio of the second element in the magnetic layer is changed. The horizontal axis of FIG. 9B is the composition ratio y. In this example, the second element E is Cr. The vertical axis is the saturation magnetic flux density Bm1. As shown in FIG. 9B, when the composition ratio y is high, the saturation magnetic flux density Bm1 is obtained. When the magnetic layer includes $Fe_{50}Co_{50}$ or $Fe_{90}Co_{10}$, substantially the same characteristics can be obtained. When the magnetic layer includes $Fe_{70}Co_{30}$, a higher saturation magnetic flux density Bm1 can be obtained at the same composition ratio y as compared with other compositions. When the magnetic layer includes the second element, the composition ratio x is preferably not less than 10 atomic % and not more than 50 atomic %.

Figure 10:
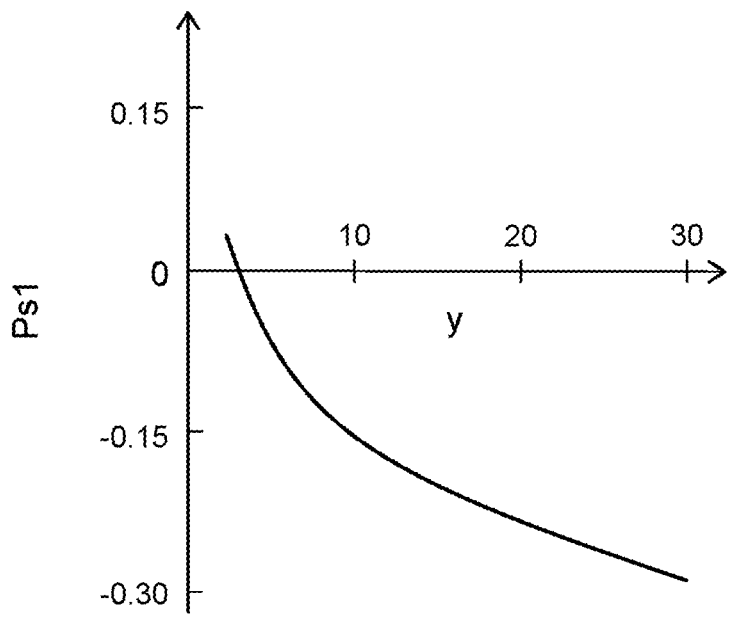
FIG. 10 is a graph illustrating the characteristics of the magnetic layer included in the magnetic head.

FIG. 10 is a graph illustrating the characteristics of the magnetic layer included in the magnetic head.

FIG. 10 illustrates a change in spin polarization of the magnetic layer when the composition ratio y is changed when the composition ratio of Co to Fe is fixed. The horizontal axis of FIG. 10 is the composition ratio y of the second element E. The vertical axis is spin polarization Ps1 (spin polarization value). As shown in FIG. 10, when the composition ratio y of the second element E is not less than 3 atomic %, negative spin polarization Ps1 is obtained. When the composition ratio y is high, the absolute value of the negative spin polarization Ps1 becomes large. When the composition ratio y is not less than 10%, negative spin polarization Ps1 having a large absolute value can be obtained. For example, the composition ratio y may be not less than 10 atomic % and not more than 30 atomic %.

As can be seen from FIGS. 9B and 10, in the embodiment, it is preferable that the composition ratio x of Co is not less than 10 atomic % and not more than 50 atomic %, and the composition ratio y of the second element E is not less than 10 atomic %. The composition ratio y of the second element E is preferably not more than 90 atomic %. As a result, a high saturation magnetic flux density Bm1 can be obtained. In the embodiment, the composition ratio y of the second element E may be not less than 10 atomic % and not more than 50 atomic %.

Figure 11:
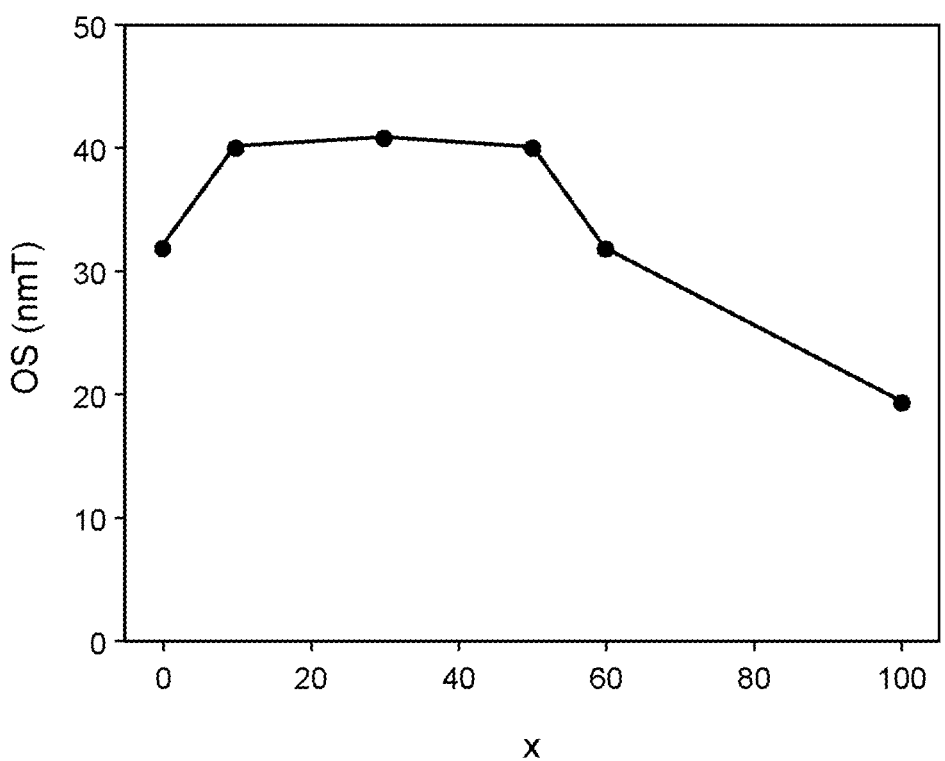
FIG. 11 is a graph illustrating the characteristics of the magnetic layer included in the magnetic head.

FIG. 11 is a graph illustrating the characteristics of the magnetic layer included in the magnetic head.

FIG. 11 illustrates oscillation strength OS when the composition of the second magnetic layer 22 is changed. In this example, the composition ratio y is 20 atomic %, and the composition ratio x of Co is changed. The second element E is Cr. The horizontal axis of FIG. 11 is the composition ratio x. The vertical axis is the oscillation strength OS. As can be seen from FIG. 11, when the composition ratio x is not less than 10 atomic % and not more than 50 atomic %, high oscillation strength OS can be obtained. Under this condition, for example, the recording density by MAMR is likely to be improved. The composition ratio x is more preferably not less than 25 atomic % and not more than 35 atomic %. High oscillation strength OS is stable and easy to obtain.

As described above, it is preferable that the second magnetic layer 22 (for example, magnetic layer having negative spin polarization) has the above composition. As a result, for example, a high saturation magnetic flux density Bm1 and a negative spin polarization Ps1 having a large absolute value can be easily obtained. For example, stable oscillation can be easily obtained.

In the first embodiment, the second thickness t2 of the second magnetic layer 22 is preferably not less than 5 nm and not more than 15 nm. In the first embodiment, the thickness t41 of the first nonmagnetic layer 41 and the thickness t42 of the second nonmagnetic layer 42 are each preferably not less than 0.5 nm and not more than 6 nm.

Second Embodiment

Figure 12:
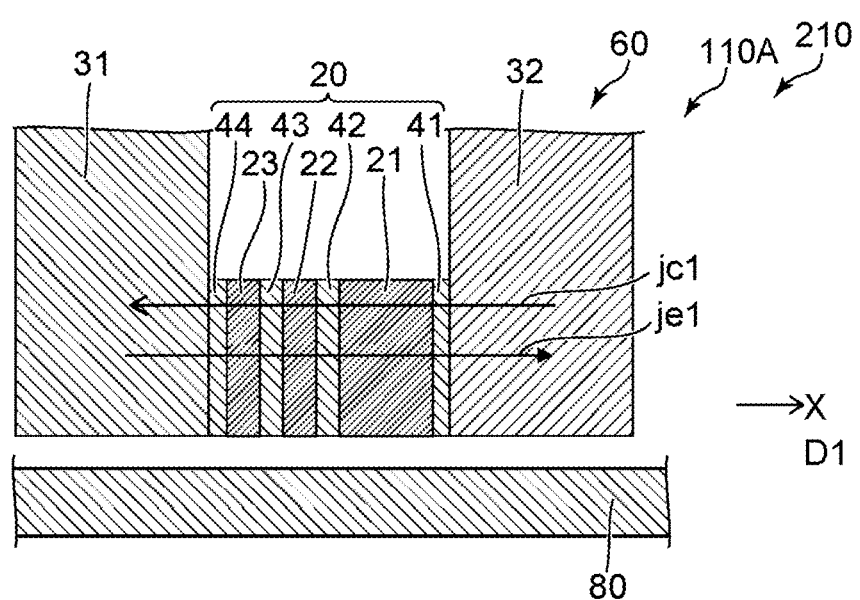
FIG. 12 is a schematic cross-sectional view illustrating a portion of a magnetic recording device according to a second embodiment.

FIG. 12 is a schematic cross-sectional view illustrating a portion of a magnetic recording device according to a second embodiment.

A magnetic recording device 210 according to the second embodiment also includes a magnetic head 110A and an electrical circuit 20D. The magnetic recording device 210 may include a magnetic recording medium 80. For example, the magnetic recording device 210 performs at least a recording operation. Information is recorded in the magnetic recording medium 80 by using the magnetic head 110A in the recording operation.

Also in this case, the electrical circuit 20D (referring to FIG. 2) is electrically connected to the stacked body 20. In the example, the stacked body 20 is electrically connected to the first and second magnetic poles 31 and 32. A first terminal T1 and a second terminal T2 are provided in the magnetic head 110A. The first terminal T1 is electrically connected to the stacked body 20 via first wiring W1 and the first magnetic pole 31. The second terminal T2 is electrically connected to the stacked body 20 via second wiring W2 and the second magnetic pole 32. For example, a current (e.g., a direct current) is supplied from the electrical circuit 20D to the stacked body 20.

As shown in FIG. 12, the stacked body 20 includes a first magnetic layer 21, a second magnetic layer 22, a third magnetic layer 23, a first nonmagnetic layer 41, a second nonmagnetic layer 42, and a third nonmagnetic layer 43. A fourth nonmagnetic layer 44 is provided in the example.

The second magnetic layer 22 is located between the first magnetic pole 31 and the first magnetic layer 21. The third magnetic layer 23 is located between the first magnetic pole 31 and the second magnetic layer 22. The first nonmagnetic layer 41 is located between the first magnetic layer 21 and the second magnetic pole 32. The second nonmagnetic layer 42 is located between the second magnetic layer 22 and the first magnetic layer 21. The third nonmagnetic layer 43 is located between the third magnetic layer 23 and the second magnetic layer 22. When the fourth nonmagnetic layer 44 is provided, the fourth nonmagnetic layer 44 is located between the first magnetic pole 31 and the third magnetic layer 23.

The first magnetic layer 21 includes at least one of Fe, Co, or Ni. The second magnetic layer 22 includes at least one of Fe, Co, or Ni. For example, the first magnetic layer 21 and the second magnetic layer 22 have positive spin polarization.

The third magnetic layer 23 includes a first element and a second element. The first element includes at least one of Fe, Co, or Ni. The second element includes at least one selected from the group consisting of Cr, V, Mn, Ti, and Sc. The second element is, for example, an added element. The ratio (e.g., the concentration) of the second element in the third magnetic layer 23 is, for example, not less than 1 atomic % and not more than 80 atomic %. For example, the third magnetic layer 23 has negative spin polarization.

The first magnetic layer 21 and the second magnetic layer 22 substantially do not include the second element described above. Or, the concentrations of the second element in the first and second magnetic layers 21 and 22 are less than the concentration of the second element in the third magnetic layer 23.

The first nonmagnetic layer 41 includes, for example, at least one selected from the group consisting of Cu, Ag, Au, Al, and Cr. For example, the first nonmagnetic layer 41 functions as a layer that transfers polarized spin.

The second nonmagnetic layer 42 includes, for example, at least one selected from the group consisting of Ta, Pt, W, Mo, Ir, Ru, Tb, Rh, Cr, and Pd. For example, the second nonmagnetic layer 42 functions as a layer that attenuates polarized spin.

The third nonmagnetic layer 43 includes at least one selected from the group consisting of Cu, Ag, Au, Al, and Cr. For example, the third nonmagnetic layer 43 functions as a layer that transfers polarized spin.

The fourth nonmagnetic layer 44 includes at least one selected from the group consisting of Cu, Ag, Au, Al, and Cr. For example, the fourth nonmagnetic layer 44 functions as a layer that transfers polarized spin.

As shown in FIG. 12, for example, a current jc1 that is supplied from the electrical circuit 20D to the stacked body 20 has an orientation from the second magnetic pole 32 toward the first magnetic pole 31. The current jc1 has an orientation from the first magnetic layer 21 toward the second magnetic layer 22. An electron current je1 has an orientation from the first magnetic pole 31 toward the second magnetic pole 32.

For example, when the current jc1 is not supplied to the stacked body 20, the orientation of the magnetization of the first magnetic layer 21 is substantially the same as the orientation of the magnetization of the first magnetic pole 31 and the orientation of the magnetization of the second magnetic pole 32. A portion of the magnetic field (the recording magnetic field) emitted from the first magnetic pole 31 is oriented toward the magnetic recording medium 80. On the other hand, another portion of the magnetic field (the recording magnetic field) emitted from the first magnetic pole 31 passes through the stacked body 20 and enters the second magnetic pole 32 without being oriented toward the magnetic recording medium 80. Therefore, the proportion of the recording magnetic field emitted from the first magnetic pole 31 that is oriented toward the magnetic recording medium 80 is low.

When the current jc1 is supplied to the stacked body 20, the orientation of the magnetization of the first magnetic layer 21 is reversed with respect to the orientation of the magnetization of the first magnetic pole 31 and the orientation of the magnetization of the second magnetic pole 32. Therefore, the magnetic field (the recording magnetic field) that is emitted from the first magnetic pole 31 is not easily oriented toward the stacked body 20. Therefore, the proportion of the recording magnetic field emitted from the first magnetic pole 31 that is oriented toward the magnetic recording medium 80 is high compared to when the current jc1 is not supplied to the stacked body 20. The recording magnetic field that is emitted from the first magnetic pole 31 is effectively applied to the magnetic recording medium 80.

This phenomenon becomes more pronounced as the distance (the recording gap) between the first magnetic pole 31 and the second magnetic pole 32 is reduced. By using such a stacked body 20, good recording can be performed even when the recording gap is small. According to the second embodiment, the recording gap at which good recording is possible can be reduced. According to the second embodiment, a magnetic recording device can be provided in which the recording density can be increased.

On the other hand, in MAMR (Microwave Assisted Magnetic Recording), the recording is performed by locally controlling the magnetic properties of the magnetic recording medium 80 by applying, to the magnetic recording medium 80, a high frequency magnetic field generated from a stacked body including multiple magnetic layers. In MAMR, the high frequency magnetic field is generated by the oscillations of the magnetizations of the magnetic layers.

Conversely, according to the second embodiment, the magnetization of the first magnetic layer 21 reverses with respect to the magnetization of the first magnetic pole 31 and the magnetization of the second magnetic pole 32. The magnetic field that is emitted from the first magnetic pole 31 is efficiently applied to the magnetic recording medium 80 by an operation that is different from MAMR.

An example of characteristics of the magnetic head 110A according to the second embodiment will now be described.

Figure 13A:
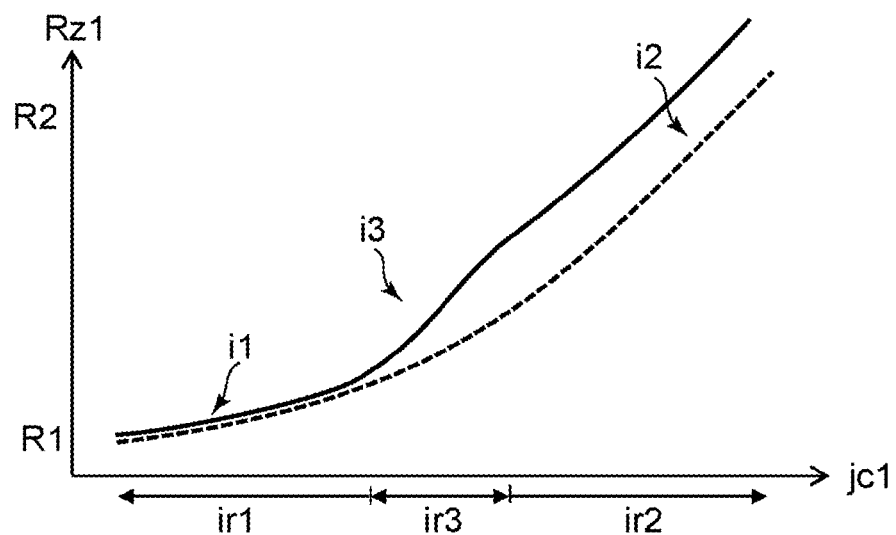
FIGS. 13A and 13B are schematic views illustrating characteristics of the magnetic recording device according to the embodiment.
Figure 13B:
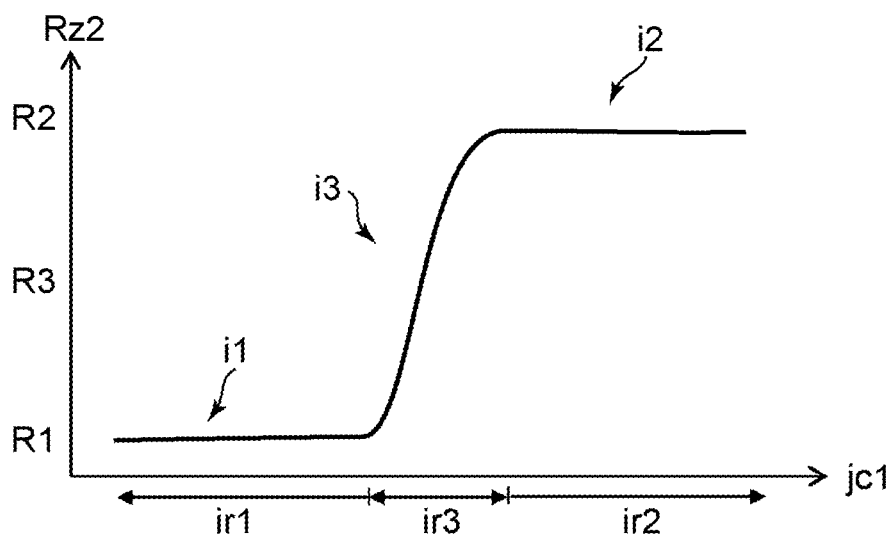

FIGS. 13A and 13B are schematic views illustrating characteristics of the magnetic recording device according to the embodiment.

These figures schematically show the relationship between the electrical resistance of the stacked body 20 and the magnitude of the current jc1 flowing in the stacked body 20 according to the embodiment. In these figures, the horizontal axis is the magnitude of the current jc1. The vertical axis of FIG. 13A is an electrical resistance Rz1 of the stacked body 20.

As shown in FIG. 13A, the electrical resistance Rz1 increases as the current jc1 increases. As shown in FIG. 13A, the magnitude of the current jc1 can be separated into a first current range ir1, a second current range ir2, and a third current range ir3. The third current range ir3 is between the first current range ir1 and the second current range ir2.

In the first and second current ranges ir1 and ir2, the electrical resistance Rz1 changes as a quadratic function of the magnitude of the current jc1. It is considered that this is caused by the temperature of the stacked body 20 increasing as the current jc1 increases.

The change of the electrical resistance Rz1 in the third current range ir3 is different from the effect of the temperature increase. It is considered that the change of the electrical resistance Rz1 in the third current range ir3 is due to a magnetoresistance effect based on the reversal rates of the magnetizations of the magnetic layers.

FIG. 13B shows the relationship between an electrical resistance Rz2 and the magnitude of the current jc1, in which the change of the quadratic function (the effect of the temperature) of FIG. 13A has been removed. When the effect of the quadratic function is removed as shown in FIG. 13B, the electrical resistance Rz2 is substantially constant in the first current range ir1. Or, compared to the third current range ir3, the electrical resistance Rz2 gradually changes in the first current range ir1. The electrical resistance Rz2 changes in the third current range ir3. The electrical resistance Rz2 is substantially constant in the second current range ir2. Or, compared to the third current range ir3, the electrical resistance Rz2 gradually changes in the second current range ir2.

For example, as shown in FIG. 13B, the electrical resistance Rz2 of the stacked body 20 is a first resistance R1 when the current jc1 flowing in the stacked body 20 is a first current i1. The first current i1 is in the first current range ir1.

As shown in FIG. 13B, the electrical resistance Rz2 of the stacked body 20 is a second resistance R2 when the current jc1 flowing in the stacked body 20 is a second current i2. The second current i2 is greater than the first current i1. The second current i2 is in the second current range ir2. The second resistance R2 is greater than the first resistance R1.

The electrical resistance Rz2 of the stacked body 20 is a third resistance R3 at a third current i3 that is between the first current i1 and the second current i2. The third current i3 is in the third current range ir3.

For example, the electrical resistance Rz2 substantially does not oscillate when the current jc1 is the first or second current i1 or i2. For example, the electrical resistance Rz2 oscillates when the current jc1 is the third current i3. The first current i1, the second current i2, and the third current i3 have orientations from the first magnetic layer 21 toward the second magnetic layer 22.

Figure 14A:
FIGS. 14A to 14C are schematic views illustrating characteristics of the magnetic recording device according to the second embodiment.
Figure 14B:
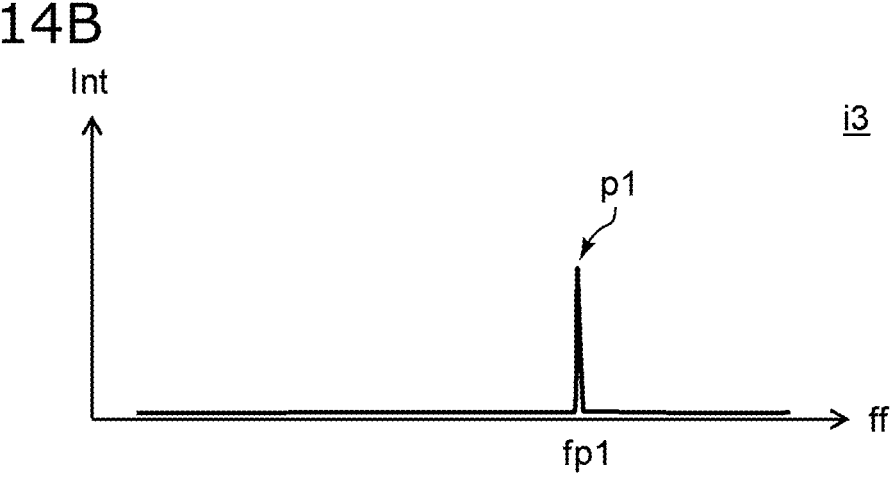
Figure 14C:

FIGS. 14A to 14C are schematic views illustrating characteristics of the magnetic recording device according to the second embodiment.

These figures illustrate signals on which FFT (Fast Fourier Transform) processing of a portion of the signal of the electrical resistance Rz2 is performed. The signal of the electrical resistance Rz2 includes a component (a high frequency component) that temporally changes, and a component (the component of the temporal average value) that substantially does not change temporally. The temporally-changing component of the electrical resistance Rz2 is processed by the FFT processing. In these figures, the horizontal axis is a frequency ff. The vertical axis is an intensity Int of the signal. FIG. 14A corresponds to when the current jc1 is the first current i1. FIG. 14B corresponds to when the current jc1 is the third current i3. FIG. 14C corresponds to when the current jc1 is the second current i2.

As shown in FIG. 14B, when the current jc1 is the third current i3, a peak p1 is observed at one frequency fp1. The peak corresponds to a high frequency oscillation being generated by the stacked body 20.

As shown in FIGS. 14A and 14C, the peak p1 is not distinctly observed when the current jc1 is the first or second current i1 or i2. For these currents, a magnetization oscillation that is effective for MAMR is substantially not generated.

Thus, the electrical resistance Rz2 of the stacked body 20 oscillates when the current jc1 flowing in the stacked body 20 is the third current i3 that is between the first current i1 and the second current i2.

According to the second embodiment, the recording operation is performed using the stacked body 20 that has such characteristics.

According to the second embodiment, the electrical circuit 20D is configured to supply the second current i2 described above to the stacked body 20 in the recording operation of using the magnetic head 110A to record the information in the magnetic recording medium 80. Compared to when the recording operation is performed without supplying the second current i2, the amount of the recording magnetic field oriented from the first magnetic pole 31 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the embodiment, a magnetic recording device can be provided in which the recording density can be increased.

An example of characteristics of a magnetic recording device will now be described.

Figure 15:
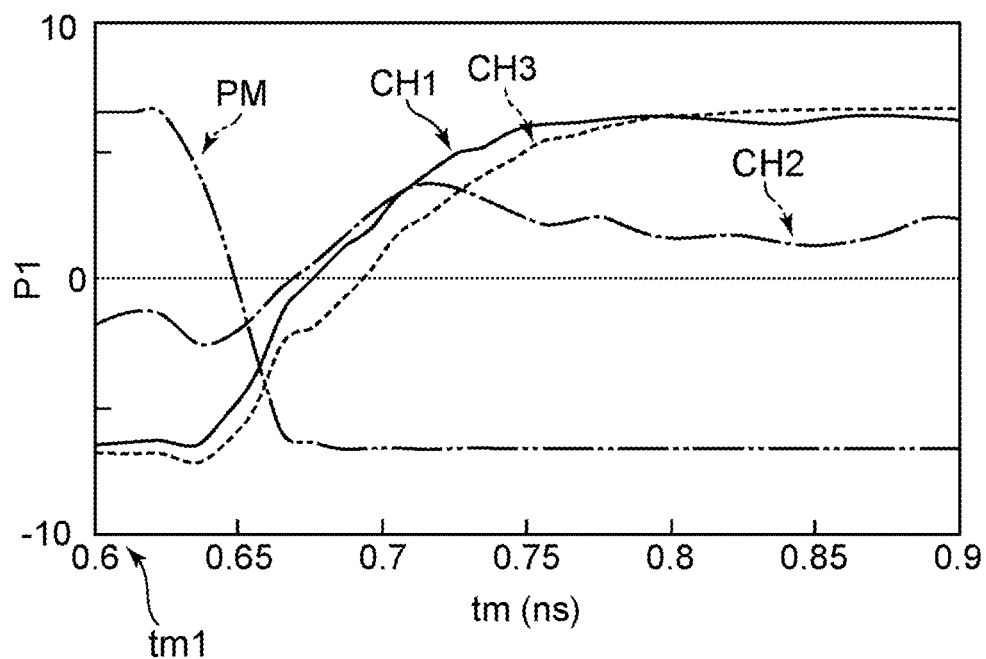
FIG. 15 is a schematic view illustrating characteristics of the magnetic recording device.

FIG. 15 is a schematic view illustrating characteristics of the magnetic recording device.

FIG. 15 illustrates simulation results of characteristics of a magnetic head including the stacked body 20 having a first condition CH1, a second condition CH2, and a third condition CH3. As the first condition CH1, the configuration of the magnetic head 110A described above is applied. Namely, for example, the second nonmagnetic layer 42 is Ta; and the second nonmagnetic layer 42 attenuates polarized spin.

As the second condition CH2, for example, the second nonmagnetic layer 42 is Cu; and the second nonmagnetic layer 42 transfers polarized spin. Otherwise, the configuration of the second condition CH2 is similar to the configuration of the first condition CH1.

As the third condition CH3, the second nonmagnetic layer 42 is not provided, and the first magnetic layer 21 and the second magnetic layer 22 contact each other. Otherwise, the configuration of the third condition CH3 is similar to the configuration of the first condition CH1.

The horizontal axis of FIG. 15 is a time tm. The polarity of the recording current Iw reverses at a first time tm1. The vertical axis of FIG. 15 is a parameter P1 corresponding to the reversal amount of the magnetization. The parameter P1 corresponds to the reversal amount of a magnetization existing between the first magnetic pole 31 and the second magnetic pole 32 for the first to third conditions CH1, CH2, and CH3.

FIG. 15 also illustrates a characteristic PM of the orientation of the magnetization of the first magnetic pole 31. For the characteristic PM, the parameter P1 corresponds to the orientation of the magnetization of the first magnetic pole 31. In the example of FIG. 15, the polarity of the recording current Iw reverses at the first time tm1 (when the time tm is 0.60 ns). When the time tm is 0.62 ns, the orientation of the magnetization of the first magnetic pole 31 starts to change. When the time tm is 0.67 ns, the change of the orientation of the magnetization of the first magnetic pole 31 substantially ends.

As shown in FIG. 15, the absolute value of the parameter P1 is small for the second condition CH2. For the second condition CH2, a magnetization that exists between the first magnetic pole 31 and the second magnetic pole 32 does not distinctly reverse with respect to the magnetization of the first magnetic pole 31.

For the first condition CH1 and the third condition CH3 as shown in FIG. 15, it can be seen that a magnetization that exists between the first magnetic pole 31 and the second magnetic pole 32 substantially reverses with respect to the magnetization of the first magnetic pole 31. The change of the parameter P1 for the first condition CH1 is faster than the change of the parameter P1 for the third condition CH3. A fast magnetization reversal is obtained for the first condition CH1. For the first condition CH1, a high responsiveness with respect to the change of the magnetization of the first magnetic pole 31 is obtained because the magnetization of the first magnetic layer 21 quickly changes. For the first condition CH1, for example, the BER (Bit Error Rate) can be effectively reduced in practical conditions of use.

According to the second embodiment, the BER can be effectively reduced, and the recording gap at which good recording is possible can be reduced. According to the second embodiment, a magnetic recording device can be provided in which the recording density can be increased.

According to the second embodiment, a high recording capacity in a high-speed recording operation at a high frequency can be obtained. The recording density can be more effectively improved.

Figure 16:
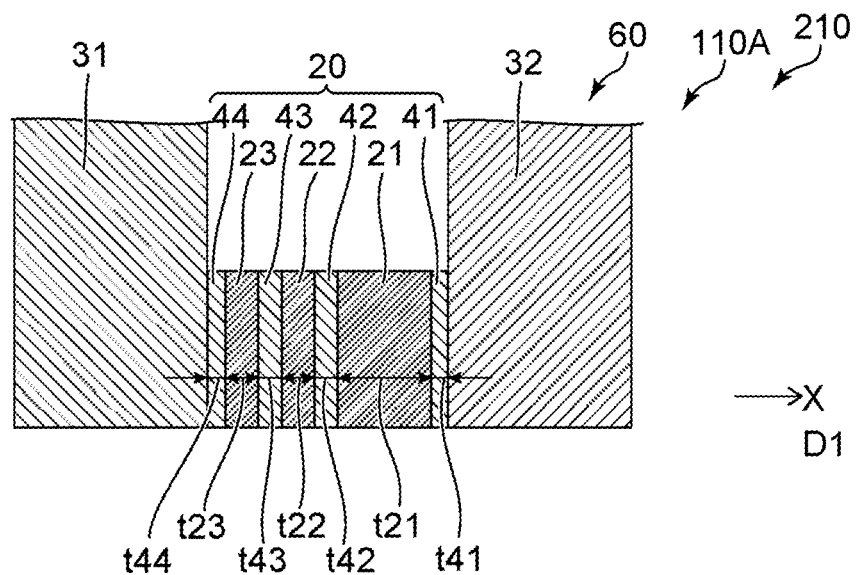
FIG. 16 is a schematic cross-sectional view illustrating a portion of the magnetic recording device according to the second embodiment.

FIG. 16 is a schematic cross-sectional view illustrating a portion of the magnetic recording device according to the second embodiment.

FIG. 16 illustrates the magnetic head 110A.

As shown in FIG. 16, the first magnetic layer 21 has a thickness t21. The second magnetic layer 22 has a thickness t22. The third magnetic layer 23 has a thickness t23. The first nonmagnetic layer 41 has a thickness t41. The second nonmagnetic layer 42 has a thickness t42. The third nonmagnetic layer 43 has a thickness t43. The fourth nonmagnetic layer 44 has a thickness t44. These thicknesses are lengths along the first direction D1. As described above, the first direction D1 may be oblique to the X-axis direction.

In the magnetic head 110A, the thickness t21 of the first magnetic layer 21 is, for example, not less than 2 nm and not more than 10 nm. Because the thickness t21 is not less than 2 nm, for example, the magnetic field that is oriented toward the magnetic recording medium 80 can be effectively increased. Because the thickness t21 is not more than 8 nm, for example, an efficient magnetization reversal is easily obtained.

In the magnetic head 110A, the thickness t22 of the second magnetic layer 22 is, for example, not less than 2 nm and not more than 4 nm. When the thickness t22 is not less than 2 nm, a higher gain is easily obtained in a high-speed operation. Because the thickness t22 is not more than 4 nm, stable operations are easily obtained.

In the magnetic head 110A, the thickness t23 of the third magnetic layer 23 is, for example, not less than 2 nm and not more than 5 nm. When the thickness t23 is not less than 2 nm, for example, the electrons that pass through the third magnetic layer 23 easily spin. Because the thickness t23 is not more than 5 nm, for example, the magnetization of the third magnetic layer 23 easily stabilizes.

In the magnetic head 110A, the thickness t41 of the first nonmagnetic layer 41 is, for example, not less than 1 nm and not more than 5 nm. When the thickness t41 is in this range, for example, the electrons that are spin-polarized by the second magnetic pole 32 easily reach the first magnetic layer 21.

In the magnetic head 110A, the thickness t42 of the second nonmagnetic layer 42 is, for example, not less than 1 nm and not more than 5 nm. Because the thickness t42 is in this range, for example, a higher gain is easily obtained.

In the magnetic head 110A, the thickness t43 of the third nonmagnetic layer 43 is, for example, not less than 1 nm and not more than 5 nm. Because the thickness t43 is in this range, for example, the magnetization of the second magnetic layer 22 and the magnetization of the third magnetic layer 23 are easily mutually-stabilized.

In the magnetic head 110A, the thickness t44 of the fourth nonmagnetic layer 44 is, for example, not less than 1 nm and not more than 5 nm. Because the thickness t44 is in this range, for example, the magnetization of the third magnetic layer 23 easily stabilizes.

According to the second embodiment, for example, the first nonmagnetic layer 41 contacts the first magnetic layer 21 and the second magnetic pole 32. For example, the second nonmagnetic layer 42 contacts the second magnetic layer 22 and the first magnetic layer 21. For example, the third nonmagnetic layer 43 contacts the third magnetic layer 23 and the second magnetic layer 22. For example, the fourth nonmagnetic layer 44 contacts the first magnetic pole 31 and the third magnetic layer 23.

Figure 17:
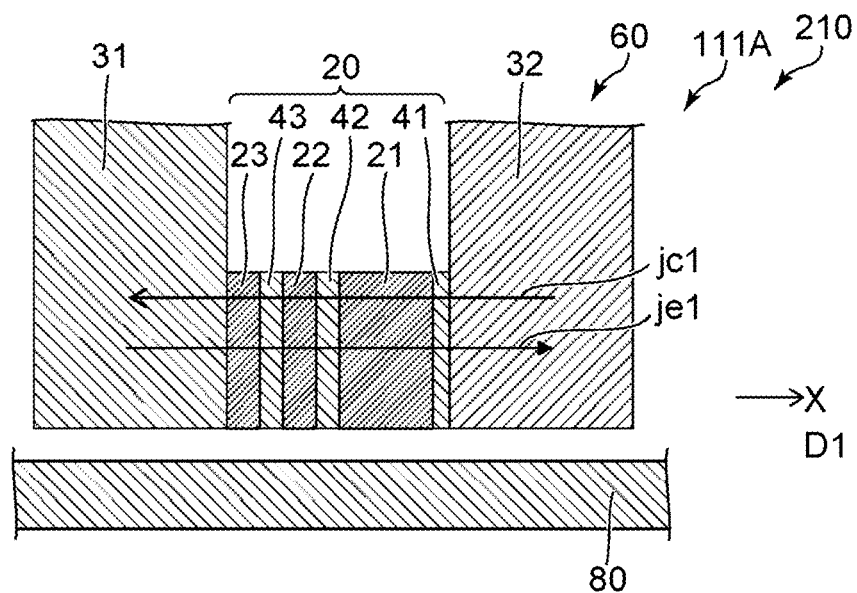
FIG. 17 is a schematic cross-sectional view illustrating a portion of the magnetic recording device according to the second embodiment.

FIG. 17 is a schematic cross-sectional view illustrating a portion of the magnetic recording device according to the second embodiment.

As shown in FIG. 17, the fourth nonmagnetic layer 44 is not provided in a magnetic head 111A according to the second embodiment. In the magnetic head 111A, the first magnetic pole 31 contacts the third magnetic layer 23. Otherwise, the configuration of the magnetic head 111A may be similar to the configuration of the magnetic head 110A.

In the magnetic head 111A as well, a fast magnetization reversal is obtained. The BER can be effectively reduced, and the recording gap at which good recording is possible can be reduced. According to the second embodiment, a magnetic recording device can be provided in which the recording density can be increased.

In the magnetic head 110A and the magnetic head 111A, it is favorable for the third nonmagnetic layer 43 to include Cr. Thereby, for example, the magnetization of the second magnetic layer 22 stabilizes more easily.

Third Embodiment

An example according to a third embodiment will now be described. In the following description, a description of portions similar to the first embodiment is omitted as appropriate.

Figure 18:
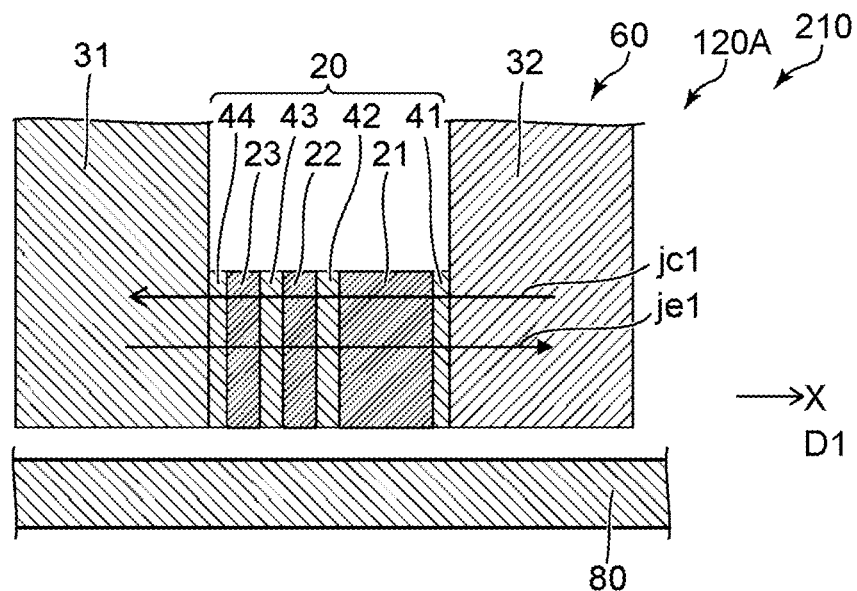
FIG. 18 is a schematic cross-sectional view illustrating a portion of a magnetic recording device according to a third embodiment.

FIG. 18 is a schematic cross-sectional view illustrating a portion of a magnetic recording device according to the third embodiment.

As shown in FIG. 18, the magnetic recording device 210 according to the third embodiment includes a magnetic head 120A, the magnetic recording medium 80, and the electrical circuit 20D. In the magnetic head 120A as well, the stacked body 20 includes the first magnetic layer 21, the second magnetic layer 22, the third magnetic layer 23, the first nonmagnetic layer 41, the second nonmagnetic layer 42, and the third nonmagnetic layer 43. The fourth nonmagnetic layer 44 is provided in the example. In the magnetic head 120A as well, the second magnetic layer 22 is located between the first magnetic pole 31 and the first magnetic layer 21. The third magnetic layer 23 is located between the first magnetic pole 31 and the second magnetic layer 22. The first nonmagnetic layer 41 is located between the first magnetic layer 21 and the second magnetic pole 32. The second nonmagnetic layer 42 is located between the second magnetic layer 22 and the first magnetic layer 21. The third nonmagnetic layer 43 is located between the third magnetic layer 23 and the second magnetic layer 22. When the fourth nonmagnetic layer 44 is provided, the fourth nonmagnetic layer 44 is located between the first magnetic pole 31 and the third magnetic layer 23.

In the magnetic head 120A, the first magnetic layer 21 includes the first element that includes at least one of Fe, Co, or Ni, and includes the second element that includes at least one selected from the group consisting of Cr, V, Mn, Ti, and Sc. For example, the first magnetic layer 21 has negative polarization. The concentration of the second element in the first magnetic layer 21 is, for example, not less than 1 atomic % and not more than 80 atomic %.

In the magnetic head 120A, the second magnetic layer 22 includes at least one of Fe, Co, or Ni. The second magnetic layer 22 substantially does not include the second element described above. Or, the concentration of the second element in the second magnetic layer 22 is less than the concentration of the second element in the first magnetic layer 21. For example, the second magnetic layer 22 has positive polarization.

In the magnetic head 120A, the third magnetic layer 23 includes a third element that includes at least one of Fe, Co, or Ni, and includes a fourth element that includes at least one selected from the group consisting of Cr, V, Mn, Ti, and Sc. For example, the third magnetic layer 23 has negative polarization. The concentration of the fourth element in the third magnetic layer 23 is, for example, not less than 1 atomic % and not more than 80 atomic %. The second magnetic layer 22 substantially does not include the fourth element described above. Or, the concentration of the fourth element in the second magnetic layer 22 is less than the concentration of the fourth element in the third magnetic layer 23.

In the magnetic head 120A, for example, the first nonmagnetic layer 41 includes at least one selected from the group consisting of Cu, Ag, Au, Al, and Cr. In the magnetic head 120A, for example, the first nonmagnetic layer 41 functions as a layer that transfers polarized spin.

In the magnetic head 120A, for example, the second nonmagnetic layer 42 includes at least one selected from the group consisting of Cu, Ag, Au, Al, and Cr. In the magnetic head 120A, for example, the second nonmagnetic layer 42 functions as a layer that transfers polarized spin.

In the magnetic head 120A, for example, the third nonmagnetic layer 43 includes at least one selected from the group consisting of Cu, Ag, Au, Al, and Cr. In the magnetic head 120A, for example, the third nonmagnetic layer 43 functions as a layer that transfers polarized spin.

In the magnetic head 120A, the fourth nonmagnetic layer 44 may be provided between the first magnetic pole 31 and the third magnetic layer 23. The fourth nonmagnetic layer 44 includes, for example, at least one selected from the group consisting of Cu, Ag, Au, Al, and Cr. In the magnetic head 120A, for example, the fourth nonmagnetic layer 44 functions as a layer that transfers polarized spin.

For example, the first nonmagnetic layer 41 may contact the first magnetic layer 21 and the second magnetic pole 32. The second nonmagnetic layer 42 may contact the second magnetic layer 22 and the first magnetic layer 21. The third nonmagnetic layer 43 may contact the third magnetic layer 23 and the second magnetic layer 22. The fourth nonmagnetic layer 44 may contact the first magnetic pole 31 and the third magnetic layer 23.

In the magnetic head 120A as well, the operations described with reference to FIGS. 13A and 13B may be performed. In the magnetic head 120A as well, as shown in FIG. 13B, the electrical resistance Rz2 of the stacked body 20 is the first resistance R1 when the current jc1 flowing in the stacked body 20 is the first current i1. The first current i1 is in the first current range ir1.

In the magnetic head 120A as well, as shown in FIG. 13B, the electrical resistance Rz2 of the stacked body 20 is the second resistance R2 when the current jc1 flowing in the stacked body 20 is the second current i2. The second current i2 is greater than the first current i1. The second current i2 is in the second current range ir2. The second resistance R2 is greater than the first resistance R1.

The electrical resistance Rz2 of the stacked body 20 is the third resistance R3 at the third current i3 that is between the first current i1 and the second current i2. The third current i3 is in the third current range ir3.

In the magnetic head 120A as well, for example, the electrical resistance Rz2 substantially does not oscillate when the current jc1 is the first or second current i1 or i2. For example, the electrical resistance Rz2 oscillates when the current jc1 is the third current i3. The first current i1, the second current i2, and the third current i3 have orientations from the first magnetic layer 21 toward the second magnetic layer 22.

According to the third embodiment, the electrical circuit 20D is configured to supply the second current i2 described above to the stacked body 20 in the recording operation of using the magnetic head 120A to record the information in the magnetic recording medium 80. Compared to when the recording operation is performed without supplying the second current i2, the amount of the recording magnetic field oriented from the first magnetic pole 31 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the third embodiment, a magnetic recording device can be provided in which the recording density can be increased.

An example of characteristics of a magnetic recording device will now be described.

Figure 19:
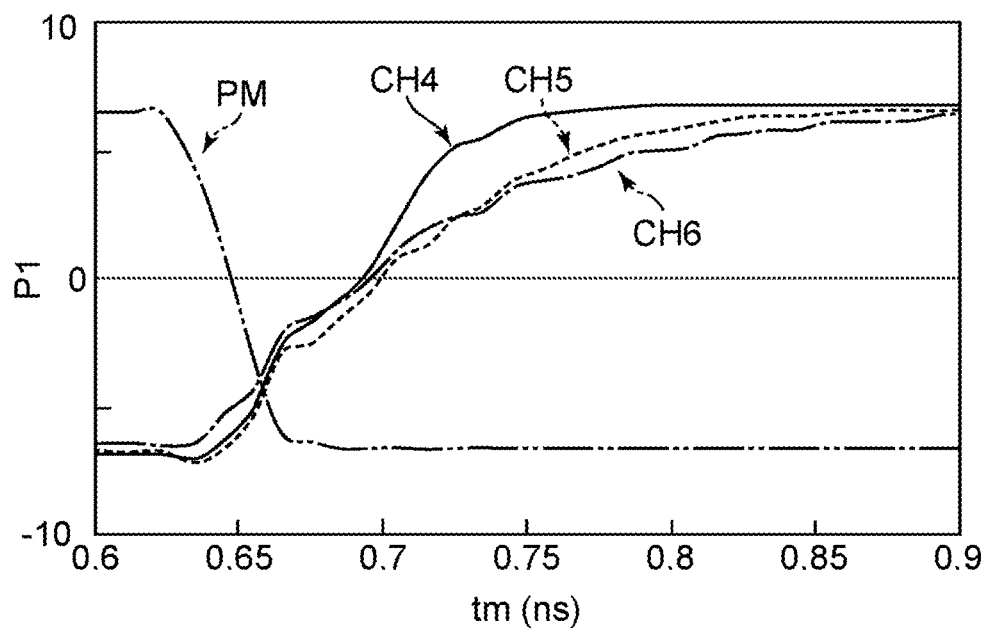
FIG. 19 is a schematic view illustrating characteristics of the magnetic recording device.

FIG. 19 is a schematic view illustrating characteristics of the magnetic recording device.

FIG. 19 illustrates simulation results of characteristics of a magnetic head including the stacked body 20 having a fourth condition CH4, a fifth condition CH5, and a sixth condition CH6. As the fourth condition CH4, the configuration of the magnetic head 120A described above is applied. Namely, for example, the second nonmagnetic layer 42 is Cu; and the second nonmagnetic layer 42 transfers polarized spin.

As the fifth condition CH5, for example, the second nonmagnetic layer 42 is Ta; and the second nonmagnetic layer 42 attenuates polarized spin. Otherwise, the configuration of the fifth condition CH5 is similar to the configuration of the fourth condition CH4.

As the sixth condition CH6, the second nonmagnetic layer 42 is not provided, and the first magnetic layer 21 and the second magnetic layer 22 contact each other. Otherwise, the configuration of the sixth condition CH6 is similar to the configuration of the fourth condition CH4.

The horizontal axis of FIG. 19 is the time tm. The polarity of the recording current Iw reverses at the first time tm1 (when the time tm is 0.60 ns (referring to FIG. 15)). The vertical axis of FIG. 19 is the parameter P1 that corresponds to the reversal amount of the magnetization. The parameter P1 corresponds to the reversal amount of a magnetization existing between the first magnetic pole 31 and the second magnetic pole 32 for the fourth condition CH4, the fifth condition CH5, and the sixth condition CH6.

FIG. 19 also illustrates the characteristic PM of the orientation of the magnetization of the first magnetic pole 31. For the characteristic PM, the parameter P1 corresponds to the orientation of the magnetization of the first magnetic pole 31. In the example of FIG. 19, the polarity of the recording current Iw reverses at the first time tm1 (when the time tm is 0.60 ns). When the time tm is 0.62 ns, the orientation of the magnetization of the first magnetic pole 31 starts to change. When the time tm is 0.67 ns, the change of the orientation of the magnetization of the first magnetic pole 31 substantially ends.

As shown in FIG. 19, when the time tm is equal to or greater than 0.7 ns, the parameter P1 is larger for the fourth condition CH4 than for the fifth condition CH5 and the sixth condition CH6. For the fourth condition CH4, a magnetization that exists between the first magnetic pole 31 and the second magnetic pole 32 substantially reverses with respect to the magnetization of the first magnetic pole 31. For the fourth condition CH4, a magnetic body that has a large magnetization volume can be quickly reversed. In particular, for the fourth condition CH4, the OW (Over Write) characteristic of the magnetic recording can be improved.

According to the third embodiment, the configuration of the magnetic head 120A described above is applied. For example, even at a relatively high recording frequency, the recording capacity is effectively improved thereby, and the recording characteristics are improved. According to the second embodiment, a magnetic recording device can be provided in which the recording density can be increased.

In the magnetic head 120A, the first to third magnetic layers 21 to 23 respectively have the thicknesses t21 to t23 (referring to FIG. 16). In the magnetic head 120A, the first to fourth nonmagnetic layers 41 to 44 respectively have the thicknesses t41 to t44 (referring to FIG. 16).

In the magnetic head 120A, the thickness t21 of the first magnetic layer 21 is, for example, not less than 2 nm and not more than 10 nm. Because the thickness t21 is not less than 2 nm, for example, the magnetic field that is oriented toward the magnetic recording medium 80 can be effectively increased. Because the thickness t21 is not more than 8 nm, for example, an efficient magnetization reversal is easily obtained.

In the magnetic head 120A, the thickness t22 of the second magnetic layer 22 is, for example, not less than 2 nm and not more than 4 nm. When the thickness t22 is not less than 2 nm, a higher gain is easily obtained in a high-speed operation. Because the thickness t22 is not more than 4 nm, stable operations are easily obtained.

In the magnetic head 120A, the thickness t23 of the third magnetic layer 23 is, for example, not less than 2 nm and not more than 5 nm. When the thickness t23 is not less than 2 nm, for example, the electrons that pass through the third magnetic layer 23 easily have spin polarization. Because the thickness t23 is not more than 5 nm, for example, the magnetization of the third magnetic layer 23 easily stabilizes.

In the magnetic head 120A, the thickness t41 of the first nonmagnetic layer 41 is, for example, not less than 1 nm and not more than 5 nm. When the thickness t41 is in this range, for example, the spin can be effectively transferred.

In the magnetic head 120A, the thickness t42 of the second nonmagnetic layer 42 is, for example, not less than 1 nm and not more than 5 nm. When the thickness t42 is in this range, for example, the spin can be effectively transferred.

In the magnetic head 120A, the thickness t43 of the third nonmagnetic layer 43 is, for example, not less than 1 nm and not more than 5 nm. When the thickness t43 is in this range, for example, the spin can be effectively transferred.

In the magnetic head 120A, the thickness t44 of the fourth nonmagnetic layer 44 is, for example, not less than 1 nm and not more than 5 nm. When the thickness t44 is in this range, for example, the spin can be effectively transferred.

Figure 20:
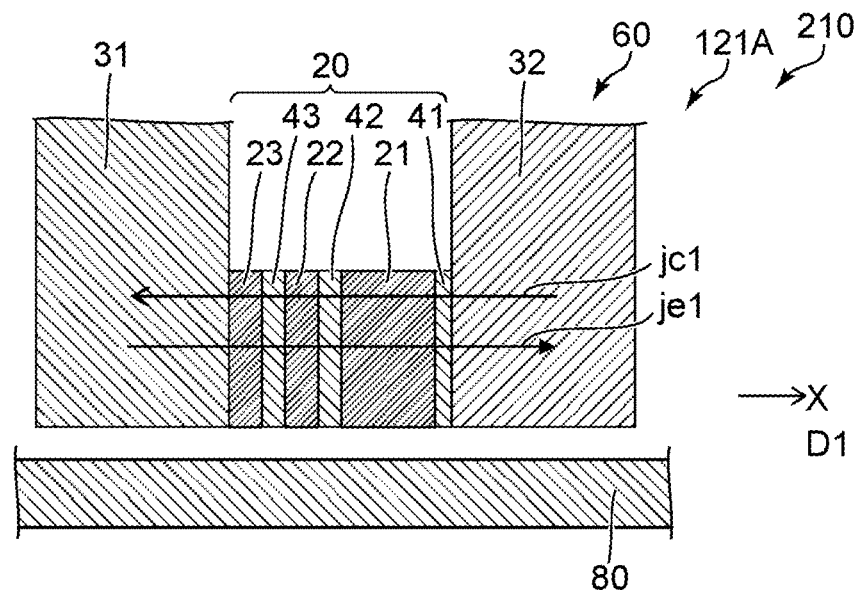
FIG. 20 is a schematic cross-sectional view illustrating a portion of a magnetic recording device according to the third embodiment.

FIG. 20 is a schematic cross-sectional view illustrating a portion of a magnetic recording device according to the third embodiment.

As shown in FIG. 20, the fourth nonmagnetic layer 44 is not provided in a magnetic head 121A according to the third embodiment. In the magnetic head 121A, the first magnetic pole 31 contacts the third magnetic layer 23. Otherwise, the configuration of the magnetic head 121A may be similar to the configuration of the magnetic head 120A.

In the magnetic head 121A as well, a magnetization that exists between the first magnetic pole 31 and the second magnetic pole 32 reverses with respect to the magnetization of the first magnetic pole 31. A magnetic body that has a large magnetization volume can be quickly reversed. According to the second embodiment, a magnetic recording device can be provided in which the recording density can be increased.

In the magnetic head 120A and the magnetic head 121A, it is favorable for the second nonmagnetic layer 42 and the third nonmagnetic layer 43 to include Cr. For example, the transferred spin amount is more easily improved thereby.

The second embodiment and the third embodiment may configurations (e.g., technological include the following proposals).

Configuration A1

A magnetic head, comprising:
a first magnetic pole;
a second magnetic pole; and
a stacked body provided between the first magnetic pole and the second magnetic pole,
the stacked body including
 a first magnetic layer,
 a second magnetic layer provided between the first magnetic pole and the first magnetic layer,
 a third magnetic layer provided between the first magnetic pole and the second magnetic layer,
 a first nonmagnetic layer provided between the first magnetic layer and the second magnetic pole,
 a second nonmagnetic layer provided between the second magnetic layer and the first magnetic layer, and
 a third nonmagnetic layer provided between the third magnetic layer and the second magnetic layer,
the first magnetic layer including at least one of Fe, Co, or Ni,
the second magnetic layer including at least one of Fe, Co, or Ni,
the third magnetic layer including
 a first element including at least one of Fe, Co, or Ni, and
 a second element including at least one selected from the group consisting of Cr, V, Mn, Ti, and Sc,
the first magnetic layer and the second magnetic layer not including the second element, or concentrations of the second element in the first and second magnetic layers being less than a concentration of the second element in the third magnetic layer,
the first nonmagnetic layer including at least one selected from the group consisting of Cu, Ag, Au, Al, and Cr,
the second nonmagnetic layer including at least one selected from the group consisting of Ta, Pt, W, Mo, Ir, Ru, Tb, Rh, Cr, and Pd,
the third nonmagnetic layer including at least one selected from the group consisting of Cu, Ag, Au, Al, and Cr.

Configuration A2

The magnetic head according to Configuration A1, wherein
the third nonmagnetic layer includes Cr.

Configuration A3

A magnetic head, comprising:
a first magnetic pole;
a second magnetic pole; and
a stacked body provided between the first magnetic pole and the second magnetic pole,
the stacked body including
 a first magnetic layer,
 a second magnetic layer provided between the first magnetic pole and the first magnetic layer,
 a third magnetic layer provided between the first magnetic pole and the second magnetic layer,
 a first nonmagnetic layer provided between the first magnetic layer and the second magnetic pole,
 a second nonmagnetic layer provided between the second magnetic layer and the first magnetic layer, and
 a third nonmagnetic layer provided between the third magnetic layer and the second magnetic layer,
the first magnetic layer including
 a first element including at least one of Fe, Co, or Ni, and
 a second element including at least one selected from the group consisting of Cr, V, Mn, Ti, and Sc,
the second magnetic layer including at least one of Fe, Co, or Ni,
the second magnetic layer not including the second element, or a concentration of the second element in the second magnetic layer being less than a concentration of the second element in the first magnetic layer,
the third magnetic layer including
 a third element including at least one of Fe, Co, or Ni, and
 a fourth element including at least one selected from the group consisting of Cr, V, Mn, Ti, and Sc,
the second magnetic layer not including the fourth element, or a concentration of the fourth element in the second magnetic layer being less than a concentration of the fourth element in the third magnetic layer,
the first nonmagnetic layer including at least one selected from the group consisting of Cu, Ag, Au, Al, and Cr,
the second nonmagnetic layer including at least one selected from the group consisting of Cu, Ag, Au, Al, and Cr,
the third nonmagnetic layer including at least one selected from the group consisting of Cu, Ag, Au, Al, and Cr.

Configuration A4

The magnetic head according to Configuration A3, wherein
the second nonmagnetic layer and the third nonmagnetic layer include Cr.

Configuration A5

The magnetic head according to any one of Configurations A1 to A4, wherein
the first nonmagnetic layer contacts the first magnetic layer and the second magnetic pole,
the second nonmagnetic layer contacts the second magnetic layer and the first magnetic layer, and
the third nonmagnetic layer contacts the third magnetic layer and the second magnetic layer.

Configuration A6

The magnetic head according to any one of Configurations A1 to A5, wherein
the first magnetic pole contacts the third magnetic layer.

Configuration A7

The magnetic head according to any one of Configurations A1 to A6, wherein
the stacked body further includes a fourth nonmagnetic layer,
the fourth nonmagnetic layer is located between the first magnetic pole and the third magnetic layer, and
the fourth nonmagnetic layer includes at least one selected from the group consisting of Cu, Ag, Au, Al, and Cr.

Configuration A8

The magnetic head according to Configuration A7, wherein
the fourth nonmagnetic layer contacts the first magnetic pole and the third magnetic layer.

Configuration A9

The magnetic head according to Configuration A7 or A8, wherein
a thickness of the fourth nonmagnetic layer is not less than 1 nm and not more than 5 nm.

Configuration A10

The magnetic head according to any one of Configurations A1 to A9, wherein
a second current has an orientation from the first magnetic layer toward the second magnetic layer.

Configuration A11

The magnetic head according to any one of Configurations A1 to A10, wherein
a thickness of the first nonmagnetic layer is not less than 1 nm and not more than 5 nm.

Configuration A12

The magnetic head according to any one of Configurations A1 to A11, wherein
a thickness of the second nonmagnetic layer is not less than 1 nm and not more than 5 nm.

Configuration A13

The magnetic head according to any one of Configurations A1 to A12, wherein
a thickness of the third nonmagnetic layer is not less than 1 nm and not more than 5 nm.

Configuration A14

The magnetic head according to any one of Configurations A1 to A13, wherein
a thickness of the first magnetic layer is not less than 2 nm and not more than 8 nm.

Configuration A15

The magnetic head according to any one of Configurations A1 to A14, wherein
a thickness of the second magnetic layer is not less than 2 nm and not more than 5 nm.

Configuration A16

The magnetic head according to any one of Configurations A1 to A15, wherein
a thickness of the third magnetic layer is not less than 2 nm and not more than 5 nm.

Configuration A17

A magnetic recording device, comprising:
the magnetic head according to any one of Configurations A1 to A16;
a magnetic recording medium; and
an electrical circuit,
an electrical resistance of the stacked body being a first resistance when a current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of using the magnetic head to record information in the magnetic recording medium.

Figure 21:
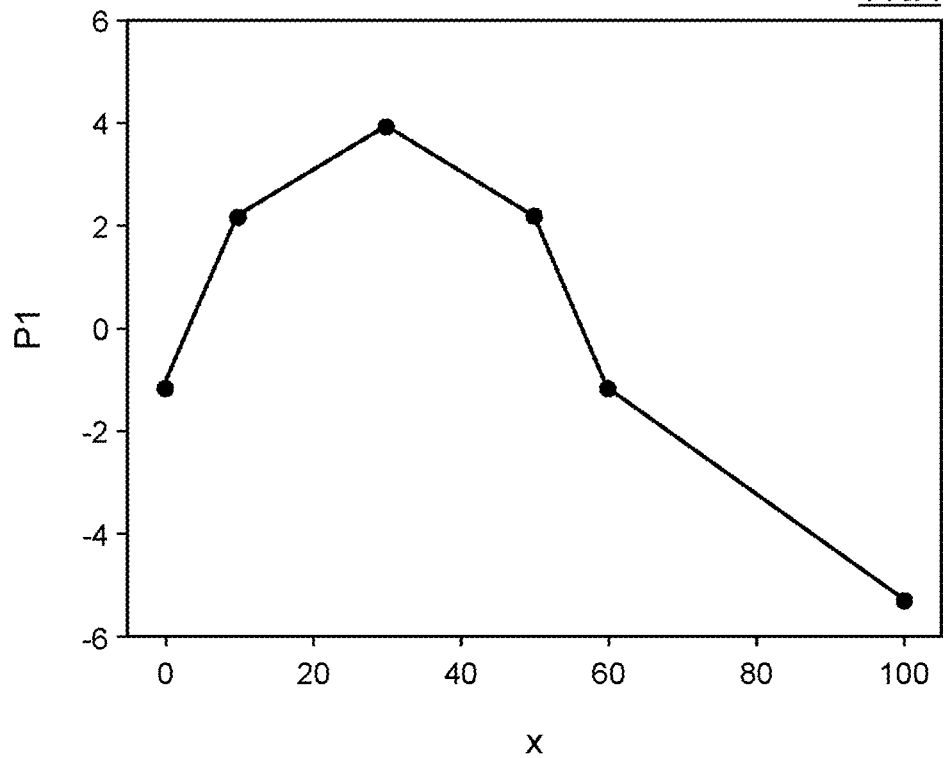
FIG. 21 is a graph illustrating the characteristics of the magnetic layer included in the magnetic head.

FIG. 21 is a graph illustrating the characteristics of the magnetic layer included in the magnetic head.

FIG. 21 is a parameter P1 corresponding to the amount of magnetization reversal when the composition of the third magnetic layer 23 is changed in the configuration of the magnetic head 110A. In this example, the composition ratio y is 20 atomic %, and the composition ratio x of Co is changed. The second element E is Cr. The horizontal axis of FIG. 21 is the composition ratio x. The vertical axis is the parameter P1. In this example, the parameter P1 is a value at 0.1 ns after the polarity of the recording current Iw is reversed. In FIG. 21, when the parameter P1 is positive and large, it corresponds to the high speed of magnetization reversal. In FIG. 21, a high recording density is obtained when the parameter P1 is positive and large. As can be seen from FIG. 21, when the composition ratio x is not less than 10 atomic % and not more than 50 atomic %, a large parameter P1 can be obtained. Under this condition, for example, the magnetization can be reversed at high speed, and high-efficiency recording can be performed. This makes it easy to improve the recording density. The composition ratio x is more preferably not less than 25 atomic % and not more than 35 atomic %. The following high-speed reversal is easily obtained with stability.

In the magnetic heads (magnetic heads 110A and 111A) according to the second embodiment, the third magnetic layer 23 (for example, the magnetic layer having negative spin polarization) is $(Fe_{100-x}Co_x)_{100-y}E_y$ (10 atomic %≤x≤50 atomic %, 10 atomic %≤y≤90 atomic %). The second element E includes at least one selected from the group consisting of Cr, V, Mn, Ti and Sc. The composition ratio x and the composition ratio y are atomic percentages (atomic %). Thereby, for example, a high saturation magnetic flux density and a negative spin polarization having a large absolute value can be easily obtained. Efficient magnetization reversal is obtained. It is possible to improve the recording density.

Figure 22:
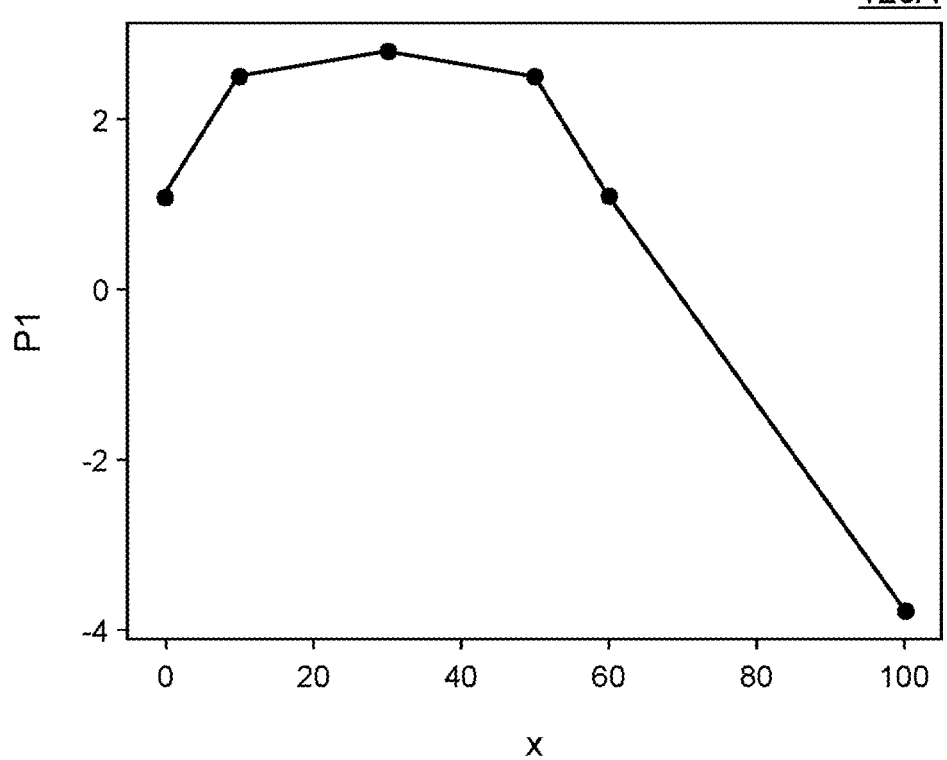
FIG. 22 is a graph illustrating the characteristics of the magnetic layer included in the magnetic head.

FIG. 22 is a graph illustrating the characteristics of the magnetic layer included in the magnetic head.

FIG. 22 is a parameter P1 corresponding to the amount of magnetization reversal when the compositions of the first magnetic layer 21 and the third magnetic layer 23 are changed in the configuration of the magnetic head 120A. In this example, the composition ratio y is 20 atomic %, and the composition ratio x of Co is changed. The second element E is Cr. In this example, the composition ratio x and the composition ratio y in the first magnetic layer 21 are the same as the composition ratio x and the composition ratio y in the third magnetic layer 23, respectively. The horizontal axis of FIG. 22 is the composition ratio x. The vertical axis is the parameter P1. In FIG. 22, the parameter P1 is a value at 0.1 ns after the polarity of the recording current Iw is reversed. As can be seen from FIG. 22, when the composition ratio x is not less than 10 atomic % and not more than 50 atomic %, a large parameter P1 can be obtained. Under this condition, for example, the magnetization can be reversed at high speed, and high-efficiency recording can be performed. This makes it easy to improve the recording density. The composition ratio x is more preferably not less than 25 atomic % and not more than 35 atomic %. The following high-speed reversal is easily obtained with stability.

In the magnetic heads (magnetic heads 120A and 121A) according to the third embodiment, it is preferable that the first magnetic layer 21 and the third magnetic layer 23 (for example, the magnetic layer having negative spin polarization) include the above-mentioned $(Fe_{100-x}Co_x)_{100-y}E_y$ (10 atomic %≤x≤50 atomic %, 10 atomic %≤y≤90 atomic %). This makes it easy to obtain, for example, a high saturation magnetic flux density and a negative and large absolute value spin polarization. Efficient reversal of magnetization can be obtained. The recording density can be improved. The composition ratio of the third magnetic layer 23 may be different from the composition ratio of the first magnetic layer 21. For example, the third magnetic layer 23 includes $(Fe_{100-x1}Co_{x1})_{100-y1}EX_{y1}$ (10 atomic %≤x1≤50 atomic %, 10 atomic %≤y1≤90 atomic %), and the fourth element EX includes at least one selected from the group consisting of Cr, V, Mn, Ti and Sc.

Fourth Embodiment

Figure 23:
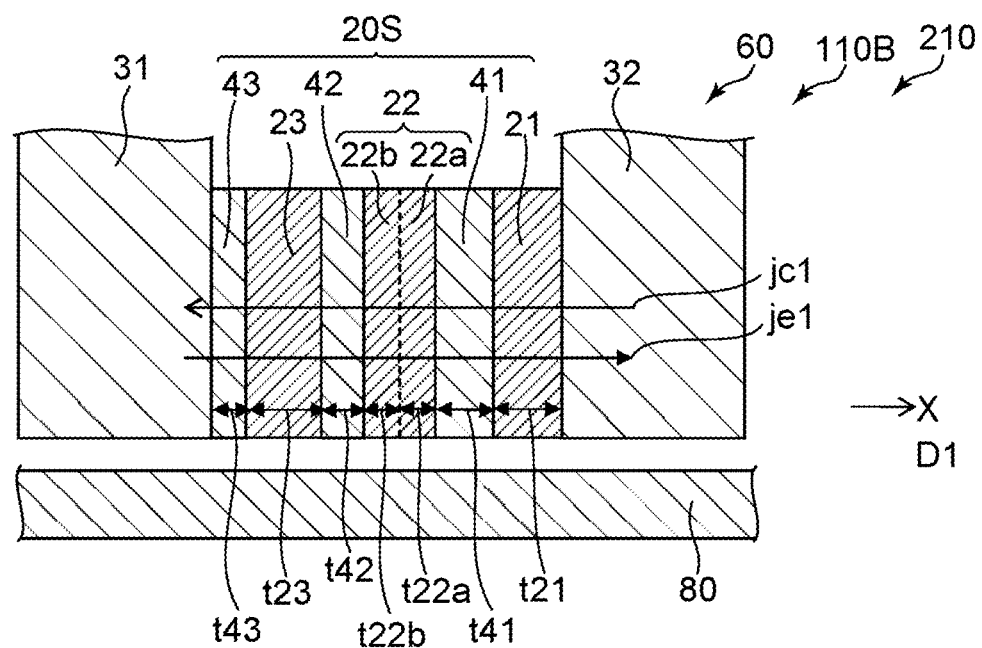
FIG. 23 is a schematic cross-sectional view illustrating a magnetic head according to a fourth embodiment.

FIG. 23 is a schematic cross-sectional view illustrating a magnetic head according to a fourth embodiment.

The magnetic recording device 210 according to the fourth embodiment also includes a magnetic head 110B and the electrical circuit 20D. The magnetic recording device 210 may include the magnetic recording medium 80. For example, at least a recording operation is performed in the magnetic recording device 210. In the recording operation, information is recorded in the magnetic recording medium 80 by using the magnetic head 110B.

In the example as well, the electrical circuit 20D (referring to FIG. 2) is electrically connected to the stacked body 20S. In the example, the stacked body 20S is electrically connected to the first and second magnetic poles 31 and 32. A first terminal T1 and a second terminal T2 are provided in the magnetic head 110B. The first terminal T1 is electrically connected to the stacked body 20S via first wiring W1 and the first magnetic pole 31. The second terminal T2 is electrically connected to the stacked body 20S via second wiring W2 and the second magnetic pole 32. For example, a current Is (e.g., a direct current) is supplied from the electrical circuit 20D to the stacked body 20S.

As shown in FIG. 23, the stacked body 20S includes a first magnetic layer 21, a second magnetic layer 22, a third magnetic layer 23, a first nonmagnetic layer 41, a second nonmagnetic layer 42, and a third nonmagnetic layer 43.

The first magnetic layer 21 is between the first magnetic pole 31 and the second magnetic pole 32. The second magnetic layer 22 is located between the first magnetic pole 31 and the first magnetic layer 21. The third magnetic layer 23 is located between the first magnetic pole 31 and the second magnetic layer 22.

The first nonmagnetic layer 41 is located between the second magnetic layer 22 and the first magnetic layer 21. The first nonmagnetic layer 41 includes Cu. The first nonmagnetic layer 41 is, for example, a Cu layer.

The second nonmagnetic layer 42 is located between the third magnetic layer 23 and the second magnetic layer 22. The third nonmagnetic layer 43 is located between the first magnetic pole 31 and the third magnetic layer 23.

In the example, the first magnetic layer 21 contacts the second magnetic pole 32. The first nonmagnetic layer 41 contacts the second magnetic layer 22 and the first magnetic layer 21. The second nonmagnetic layer 42 contacts the third magnetic layer 23 and the second magnetic layer 22. The third nonmagnetic layer 43 contacts the first magnetic pole 31 and the third magnetic layer 23.

The second magnetic layer 22 includes a first magnetic region 22a and a second magnetic region 22b. The second magnetic region 22b is between the second nonmagnetic layer 42 and the first magnetic region 22a. The first magnetic region 22a is a region at the first nonmagnetic layer 41 side. The second magnetic region 22b is a region at the second nonmagnetic layer 42 side. For example, the first magnetic region 22a contacts the first nonmagnetic layer 41. For example, the second magnetic region 22b contacts the second nonmagnetic layer 42.

The first magnetic region 22a includes a first element that includes at least one of Fe, Co, or Ni. The second magnetic region 22b includes the first element and a second element. The second element includes at least one selected from the group consisting of Cr, V, Mn, Ti, and Sc. When the second magnetic region 22b includes such a material, for example, the second magnetic region 22b has negative spin polarization. The first magnetic region 22a does not include the second element. Or, the concentration of the second element in the first magnetic region 22a is less than the concentration of the second element in the second magnetic region 22b. When the first magnetic region 22a includes such a material, the first magnetic region 22a has positive spin polarization.

In one example, the concentration of the second element in the first magnetic region 22a is substantially 0 atomic %. For example, the concentration of the second element in the first magnetic region 22a may be not less than 0 atomic % but less than 20 atomic %. For example, the concentration of the second element in the second magnetic region 22b is not less than 20 atomic % and not more than 50%.

As described above, the current Is is supplied from the electrical circuit 20D to the stacked body 20S (referring to FIG. 2). As shown in FIG. 23, a current jc1 (the current Is) that flows through the stacked body 20S has an orientation from the first magnetic layer 21 toward the third magnetic layer 23. An electron current je1 has an orientation from the third magnetic layer 23 toward the first magnetic layer 21.

For example, when the current jc1 is not supplied to the stacked body 20S, the orientations of the magnetizations of the first, second, and third magnetic layers 21, 22, and 23 are substantially the same as the orientation of the magnetization of the first magnetic pole 31 and the orientation of the magnetization of the second magnetic pole 32. A portion of the magnetic field (the recording magnetic field) emitted from the first magnetic pole 31 is oriented toward the magnetic recording medium 80. On the other hand, another portion of the magnetic field (the recording magnetic field) emitted from the first magnetic pole 31 passes through the stacked body 20S and enters the second magnetic pole 32 without being oriented toward the magnetic recording medium 80. Therefore, the proportion of the portion of the recording magnetic field emitted from the first magnetic pole 31 that is oriented toward the magnetic recording medium 80 is low.

When the current jc1 is supplied to the stacked body 20S, for example, the orientation of the magnetization of at least a portion of the stacked body 20S (e.g., at least a portion of the second and third magnetic layers 22 and 23) is reversed with respect to the orientation of the magnetization of the first magnetic pole 31 and the orientation of the magnetization of the second magnetic pole 32. Thereby, the magnetic field (the recording magnetic field) that is emitted from the first magnetic pole 31 is not easily oriented toward the stacked body 20S. Therefore, the proportion of the portion of the recording magnetic field emitted from the first magnetic pole 31 that is oriented toward the magnetic recording medium 80 is high compared to when the current jc1 is not supplied to the stacked body 20S. The recording magnetic field that is emitted from the first magnetic pole 31 is effectively applied to the magnetic recording medium 80.

This phenomenon becomes more pronounced as the distance (the recording gap) between the first magnetic pole 31 and the second magnetic pole 32 is reduced. By using such a stacked body 20S, good recording can be performed even when the recording gap is small. According to the fourth embodiment, the recording gap at which good recording is possible can be reduced. According to the fourth embodiment, a magnetic recording device can be provided in which the recording density can be increased.

On the other hand, in MAMR (Microwave Assisted Magnetic Recording), the recording is performed by locally controlling the magnetic properties of the magnetic recording medium 80 by applying, to the magnetic recording medium 80, a high frequency magnetic field generated from a stacked body including multiple magnetic layers. In MAMR, the high frequency magnetic field is generated by the oscillations of the magnetizations of the magnetic layers.

Conversely, according to the fourth embodiment, for example, the magnetization of at least a portion of the stacked body 20S reverses with respect to the magnetization of the first magnetic pole 31 and the magnetization of the second magnetic pole 32. The magnetic field that is emitted from the first magnetic pole 31 is efficiently applied to the magnetic recording medium 80 by an operation that is different from MAMR.

According to the fourth embodiment, the second magnetic layer 22 includes the first magnetic region 22a and the second magnetic region 22b. By such a configuration, the recording magnetic field that is emitted from the first magnetic pole 31 is effectively and more stably applied to the magnetic recording medium 80.

An example of experiment results when the second magnetic layer 22 does not include the first magnetic region 22a and the second magnetic region 22b will now be described.

Figure 24:
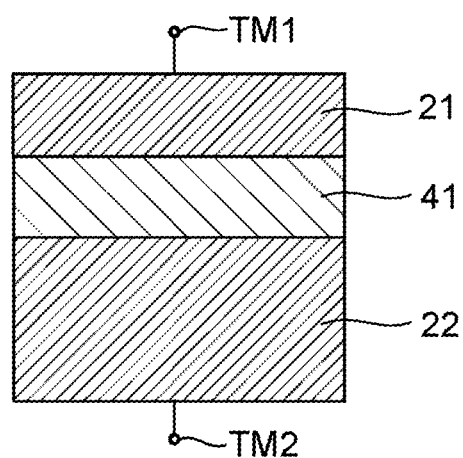
FIG. 24 is a schematic cross-sectional view illustrating experiment samples.

FIG. 24 is a schematic cross-sectional view illustrating experiment samples.

Figure 25:
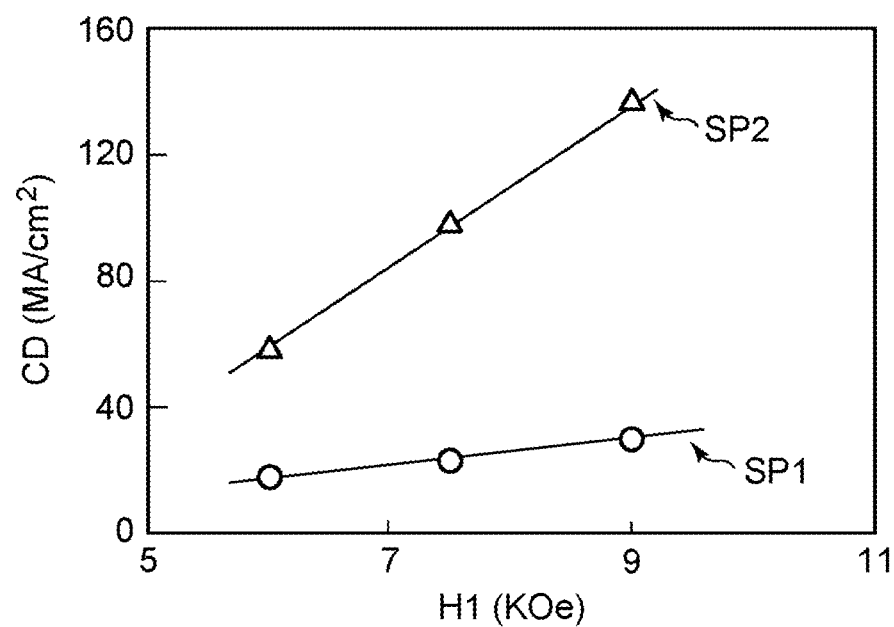
FIG. 25 is a graph illustrating the experiment results.

FIG. 25 is a graph illustrating the experiment results.

As shown in FIG. 24, the experiment samples included the first magnetic layer 21, the second magnetic layer 22, and the first nonmagnetic layer 41. The first nonmagnetic layer 41 was between the first magnetic layer 21 and the second magnetic layer 22. The first magnetic layer 21 was an FeCo layer. The first nonmagnetic layer 41 was a Cu layer. In a first sample, the second magnetic layer 22 included FeCr. In a second sample, the second magnetic layer 22 included FeCo. In the first sample, the second magnetic layer 22 had negative spin polarization. In the second sample, the second magnetic layer 22 had positive spin polarization.

For such samples, a current that had an orientation from a first terminal TM1 toward a second terminal TM2 was supplied while applying a magnetic field. The magnetic field had an orientation from the second magnetic layer 22 toward the first magnetic layer 21. The relationship between the fluctuation of the magnetization of the first magnetic layer 21 and the intensity of the magnetic field was verified.

The horizontal axis of FIG. 25 is an intensity H1 of the magnetic field. The vertical axis of FIG. 25 is a current density CD at which the magnetic field of the first magnetic layer 21 starts to fluctuate. In the first sample SP1 as shown in FIG. 25, the current density CD at which the magnetic field of the first magnetic layer 21 starts to fluctuate was low. In the second sample SP2, the current density CD at which the magnetic field of the first magnetic layer 21 starts to fluctuate was high. It is considered that the magnetization of the first magnetic layer 21 was unstable in the first sample SP1.

It is considered that the magnetization of the first magnetic layer 21 is destabilized in the first sample SP1 by the transmission spin-transfer torque (STT) from the second magnetic layer 22 that has negative polarization acting on the first magnetic layer 21.

According to the fourth embodiment, the first magnetic region 22a and the second magnetic region 22b are provided in the second magnetic layer 22. For example, the first magnetic region 22a has positive spin polarization. Therefore, the action of the STT on the first magnetic layer 21 is suppressed, and the magnetization of the first magnetic layer 21 is stable. It is considered that by stabilizing the magnetization of the first magnetic layer 21, for example, the magnetizations of the second and third magnetic layers 22 and 23 can be stably reversed by the STT from the first magnetic layer 21. Thereby, according to the fourth embodiment, the recording magnetic field that is emitted from the first magnetic pole 31 is effectively and more stably applied to the magnetic recording medium 80. A magnetic head can be provided in which the recording density can be increased.

An example of the reversal of the magnetization will now be described.

Figure 26A:
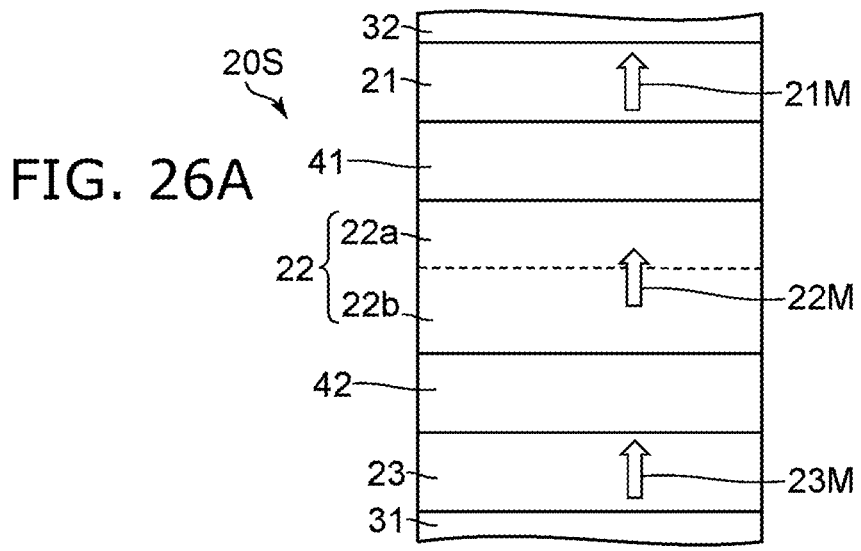
FIGS. 26A to 26C are schematic views illustrating the magnetic head according to the fourth embodiment.
Figure 26B:
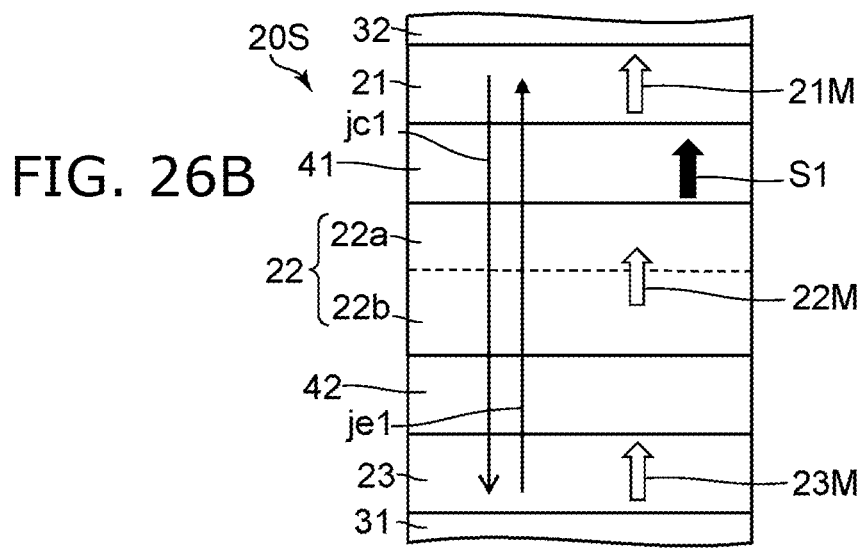
Figure 26C:
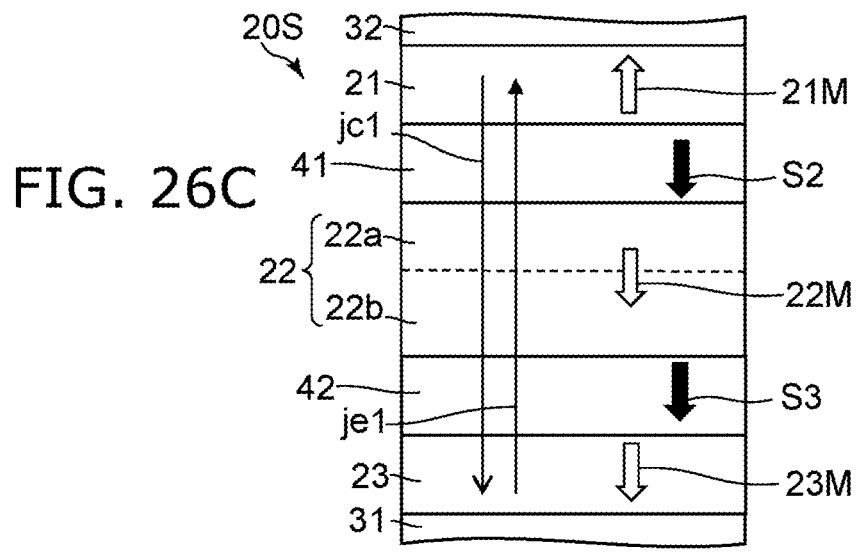

FIGS. 26A to 26C are schematic views illustrating the magnetic head according to the fourth embodiment.

In these drawings, the magnetizations of the first and second magnetic poles 31 and 32 have orientations from the first magnetic pole 31 toward the second magnetic pole 32.

As shown in FIG. 26A, a magnetization 21M of the first magnetic layer 21, a magnetization 22M of the second magnetic layer 22, and the magnetization of the third magnetic layer 23 are the same as the orientations of the magnetizations of the first and second magnetic poles 31 and 32 (the orientation from the first magnetic pole 31 toward the second magnetic pole 32) when the current jc1 is not supplied to the stacked body 20S. The orientation of the electron current je1 is the orientation from the second magnetic pole 32 toward the first magnetic pole 31.

As shown in FIG. 26B, when the current jc1 that is not less than a threshold is supplied to the stacked body 20S, a positive transmission spin-transfer torque S1 from the first magnetic region 22a acts on the first magnetic layer 21; and the magnetization 21M of the first magnetic layer 21 is stabilized.

As shown in FIG. 26C, the magnetization 22M of the second magnetic layer 22 is reversed by a positive reflection spin-transfer torque S2 from the first magnetic layer 21. A magnetization 23M of the third magnetic layer 23 is reversed by a negative reflection spin-transfer torque S3 from the reversed magnetization 22M. Thus, for example, the magnetization 22M of the second magnetic layer 22 and the magnetization 23M of the third magnetic layer 23 are stably reversed with respect to the magnetizations of the first and second magnetic poles 31 and 32. Thereby, the recording magnetic field that is emitted from the first magnetic pole 31 is effectively applied to the magnetic recording medium 80. A magnetic head can be provided in which the recording density can be increased. The recording performance improves.

According to the fourth embodiment, the first magnetic layer 21 includes, for example, Fe and Co. For example, the first magnetic layer 21 has positive spin polarization.

In the magnetic head 110B, the third magnetic layer 23 includes, for example, the first element described above and the second element described above. For example, the third magnetic layer 23 has negative spin polarization. As described below, the third magnetic layer 23 may have positive spin polarization.

As described above, the first nonmagnetic layer 41 includes Cu. The spin-transfer torque can be efficiently transferred thereby.

The second nonmagnetic layer 42 includes, for example, Cu. The second nonmagnetic layer 42 may include Cu and the second element described above.

In the example of FIG. 23, the third nonmagnetic layer 43 includes, for example, at least one selected from the group consisting of Ta, Ru, and Cr.

In the magnetic head 110B as shown in FIG. 23, the first magnetic layer 21 has a thickness t21. The first magnetic region 22a has a thickness t22a. The second magnetic region 22b has a thickness t22b. The third magnetic layer 23 has a thickness t23. In the magnetic head 110B, the first to third nonmagnetic layers 41 to 43 have thicknesses t41 to t43 (referring to FIG. 23).

In the magnetic head 110B, it is favorable for the thickness t22a of the first magnetic region 22a to be, for example, not less than 0.5 nm and not more than 10 nm. By setting the thickness t22a to be not less than 0.5 nm, for example, the STT can be effectively reduced. By setting the thickness t22a to be not more than 10 nm, for example, an excessively large reversal current is suppressed; for example, high reliability is obtained. The thickness t22a may be not more than 0.3 nm. The recording capacity due to the reversal of the magnetization is effectively improved thereby.

For example, it is favorable for the thickness t22b of the second magnetic region 22b to be not less than 2 nm and not more than 7 nm. By setting the thickness t22b to be not less than 2 nm, for example, a large spin-transfer torque can be obtained, and the magnetization 23M of the third magnetic layer 23 can be effectively reversed by the action of the second magnetic region 22b. By setting the thickness t22b to be not more than 7 nm, for example, an excessively high hardness of the second magnetic region 22b can be suppressed. Therefore, the patterning of the stacked body 20S is easier.

It is favorable for the thickness of the second magnetic layer 22 (e.g., the sum of the thickness t22a and the thickness t22b) to be, for example, not less than 3 nm and not more than 10 nm.

It is favorable for the thickness t21 of the first magnetic layer 21 to be, for example, not less than 1 nm and not more than 3 nm. By setting the thickness t21 to be not less than 1 nm, for example, the magnetization 21M of the first magnetic layer 21 is stabilized. By setting the thickness t21 to be not more than 3 nm, for example, an excessively large gap length (the distance between the first magnetic pole 31 and the second magnetic pole 32) can be suppressed. For example, a high recording density is easily obtained.

It is favorable for the thickness t23 of the third magnetic layer 23 to be, for example, not less than 1 nm and not more than 5 nm. By setting the thickness t23 to be not less than 1 nm, for example, an extreme reduction of the magnetization of the third magnetic layer 23 can be suppressed. By setting the thickness t23 to be not more than 5 nm, for example, the reversal of the magnetization 23M of the third magnetic layer 23 is easier.

It is favorable for the thickness t41 of the first nonmagnetic layer 41 to be, for example, not less than 1 nm and not more than 5 nm. By setting the thickness t41 to be not less than 1 nm, for example, the magnetic separation between the first magnetic layer 21 and the second magnetic layer 22 is stabilized. By setting the thickness t41 to be not more than 5 nm, for example, the patterning of the stacked body 20S is easier.

It is favorable for the thickness t42 of the second nonmagnetic layer 42 to be, for example, not less than 1 nm and not more than 5 nm. By setting the thickness t42 to be not less than 1 nm, for example, the magnetic separation between the second magnetic layer 22 and the third magnetic layer 23 is stabilized. By setting the thickness t42 to be not more than 5 nm, for example, the patterning of the stacked body 20S is easier.

In the example of FIG. 23, it is favorable for the thickness t43 of the third nonmagnetic layer 43 to be, for example, not less than 1 nm and not more than 5 nm. By setting the thickness t43 to be not less than 1 nm, for example, the magnetic separation is easier at both X-axis direction sides of the third nonmagnetic layer 43. By setting the thickness t43 to be not more than 5 nm, for example, the transfer of the STT is easier.

Figure 27:
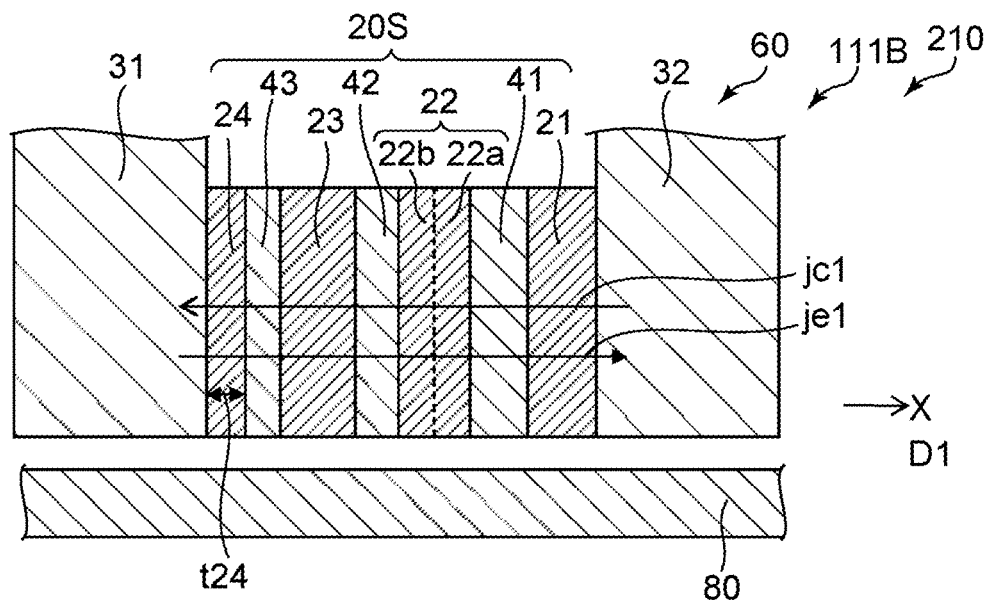
FIG. 27 is a schematic cross-sectional view illustrating a magnetic head according to the fourth embodiment.

FIG. 27 is a schematic cross-sectional view illustrating a magnetic head according to the fourth embodiment.

In the magnetic head 111B according to the fourth embodiment as shown in FIG. 27, the stacked body 20S includes a fourth magnetic layer 24 in addition to the first to third magnetic layers 21 to 23 and the first to third nonmagnetic layers 41 to 43. In the magnetic head 111B, the third magnetic layer 23 has positive spin polarization. Otherwise, the configuration of the magnetic head 111B may be similar to the configuration of the magnetic head 110B.

The fourth magnetic layer 24 is between the first magnetic pole 31 and the third nonmagnetic layer 43. The fourth magnetic layer 24 includes, for example, the first and second elements.

For example, the concentration of the second element in the fourth magnetic layer 24 is not less than 20 atomic % and not more than 50%. For example, the third magnetic layer 23 includes the first element described above. The third magnetic layer 23 is, for example, an FeCo layer. The third magnetic layer 23 does not include the second element described above. Or, the concentration of the second element in the third magnetic layer 23 is less than the concentration of the second element in the second magnetic region 22b. In one example, the fourth magnetic layer 24 contacts the first magnetic pole 31 and is magnetically coupled with the first magnetic pole 31. For example, a layer that magnetically couples the first magnetic pole 31 and the fourth magnetic layer 24 may be provided between the first magnetic pole 31 and the fourth magnetic layer 24.

In such a magnetic head 111B as well, the magnetization 21M of the first magnetic layer 21 is stabilized. For example, the magnetization of the second magnetic layer 22 and the magnetization 23M of the third magnetic layer 23 can be stably reversed. The recording magnetic field that is emitted from the first magnetic pole 31 is effectively applied to the magnetic recording medium 80. A magnetic head can be provided in which the recording density can be increased.

In the example of FIG. 27, the third nonmagnetic layer 43 includes, for example, Cu. The third nonmagnetic layer 43 may further include the second element. It is favorable for the thickness t43 of the third nonmagnetic layer 43 to be, for example, not less than 1 nm and not more than 5 nm.

In the example of FIG. 27, it is favorable for a thickness t24 of the fourth magnetic layer 24 to be, for example, not less than 2 nm and not more than 5 nm. By setting the thickness t24 to be not less than 2 nm, for example, negative polarization of the fourth magnetic layer 24 is stably obtained. By setting the thickness t24 to be not more than 5 nm, for example, an excessively large gap length can be suppressed. A steep reduction of the recording magnetic field can be suppressed. For example, a high recording density is easily obtained.

Figure 28:
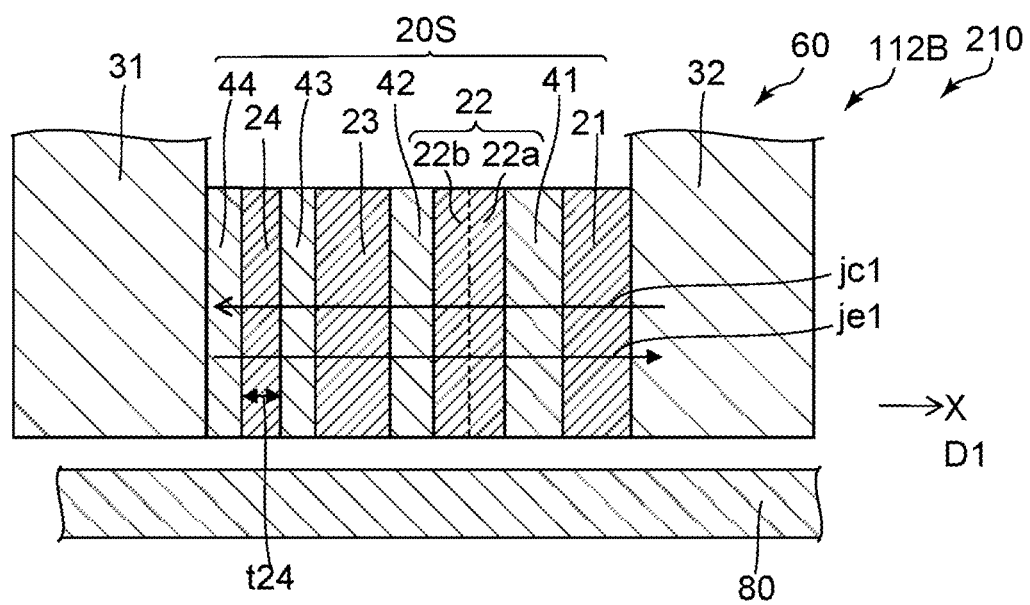
FIG. 28 is a schematic cross-sectional view illustrating a magnetic head according to the fourth embodiment.

FIG. 28 is a schematic cross-sectional view illustrating a magnetic head according to the fourth embodiment.

In the magnetic head 112B according to the fourth embodiment as shown in FIG. 28 as well, the stacked body 20S includes the fourth magnetic layer 24 and a fourth nonmagnetic layer 44 in addition to the first to third magnetic layers 21 to 23 and the first to third nonmagnetic layers 41 to 43. In the magnetic head 112B, the third magnetic layer 23 has negative spin polarization. Otherwise, the configuration of the magnetic head 112B may be similar to the configuration of the magnetic head 110B.

The fourth magnetic layer 24 is between the first magnetic pole 31 and the third nonmagnetic layer 43. The fourth magnetic layer 24 includes, for example, the first and second elements. The concentration of the second element in the fourth magnetic layer 24 is not less than 20 atomic % and not more than 50%. For example, the third magnetic layer 23 includes the first and second elements. For example, the concentration of the second element in the third magnetic layer 23 is not less than 20 atomic % and not more than 50%.

The fourth nonmagnetic layer 44 is between the first magnetic pole 31 and the fourth magnetic layer 24. The fourth nonmagnetic layer 44 includes at least one selected from the group consisting of Ta, Ru, and Cr.

In such a magnetic head 112B as well, the magnetization 21M of the first magnetic layer 21 is stabilized. For example, the magnetization of the second magnetic layer 22 and the magnetization 23M of the third magnetic layer 23 can be stably reversed. The recording magnetic field that is emitted from the first magnetic pole 31 is effectively applied to the magnetic recording medium 80. A magnetic head can be provided in which the recording density can be increased.

In the example of FIG. 28, it is favorable for the thickness t24 of the fourth magnetic layer 24 to be, for example, not less than 1 nm and not more than 5 nm. By setting the thickness t24 to be not less than 1 nm, for example, the magnetic coupling between the magnetic pole 31 and the fourth magnetic layer 24 can be stably suppressed. For example, the transfer of the STT between the magnetic pole 31 and the fourth magnetic layer 24 can be stably suppressed. By setting the thickness t24 to be not more than 5 nm, for example, an excessively large gap length can be suppressed. A steep reduction of the recording magnetic field can be suppressed. For example, a high recording density is easily obtained.

In the fourth embodiment as well, for example, the characteristics described with reference to FIGS. 13A and 13B are obtained. The electrical resistance Rz1 increases as the current jc1 increases. The magnitude of the current jc1 can be separated into a first current range ir1, a second current range ir2, and a third current range ir3. The third current range ir3 is between the first current range ir1 and the second current range ir2.

In the first and second current ranges ir1 and ir2, the electrical resistance Rz1 changes as a quadratic function of the magnitude of the current jc1. It is considered that this is caused by the temperature of the stacked body 20S increasing as the current jc1 increases.

The change of the electrical resistance Rz1 in the third current range ir3 is different from the effect of the temperature increase. It is considered that the change of the electrical resistance Rz1 in the third current range ir3 is due to a magnetoresistance effect based on the reversal rates of the magnetizations of the magnetic layers.

For example, when the effect of the quadratic function is removed with respect to the electrical resistance, the electrical resistance Rz2 is substantially constant in the first current range ir1. Or, compared to the third current range ir3, the electrical resistance Rz2 gradually changes in the first current range ir1. The electrical resistance Rz2 changes in the third current range ir3. The electrical resistance Rz2 is substantially constant in the second current range ir2. Or, compared to the third current range ir3, the electrical resistance Rz2 gradually changes in the second current range ir2.

For example, the electrical resistance Rz2 of the stacked body 20S is a first resistance R1 when the current jc1 flowing in the stacked body 20S is a first current i1. The first current i1 is in the first current range ir1.

The electrical resistance Rz2 of the stacked body 20S is a second resistance R2 when the current jc1 flowing in the stacked body 20S is a second current i2. The second current i2 is greater than the first current i1. The second current i2 is in the second current range ir2. The second resistance R2 is greater than the first resistance R1.

The electrical resistance Rz2 of the stacked body 20S is a third resistance R3 at a third current i3 that is between the first current i1 and the second current i2. The third current i3 is in the third current range ir3.

For example, the electrical resistance Rz2 substantially does not oscillate when the current jc1 is the first or second current i1 or i2. For example, the electrical resistance Rz2 oscillates when the current jc1 is the third current i3. The first current i1, the second current i2, and the third current i3 have orientations from the first magnetic layer 21 toward the third magnetic layer 23.

In the fourth embodiment as well, for example, the characteristics described with reference to FIGS. 14A to 14C are obtained. When the current jc1 is the third current i3, a peak p1 is observed at one frequency fp1. The peak corresponds to a high frequency oscillation being generated by the stacked body 20S.

The peak p1 is not distinctly observed when the current jc1 is the first or second current i1 or i2. For these currents, a magnetization oscillation that is effective for MAMR is substantially not generated.

Thus, the electrical resistance Rz2 of the stacked body 20S oscillates when the current jc1 flowing in the stacked body 20S is the third current i3 that is between the first current i1 and the second current i2.

According to the fourth embodiment, the recording operation is performed using the stacked body 20S that has such characteristics.

The electrical circuit 20D is configured to supply the second current i2 described above to the stacked body 20S in the recording operation of using the magnetic head according to the fourth embodiment to record the information in the magnetic recording medium 80. Compared to when the recording operation is performed without supplying the second current i2, the amount of the recording magnetic field oriented from the first magnetic pole 31 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the fourth embodiment, a magnetic recording device can be provided in which the recording density can be increased.

The magnetic recording device 210 includes the magnetic head (e.g., the magnetic head 110B) according to the fourth embodiment, and the electrical circuit 20D that is configured to supply the current jc1 (or the current Is) to the stacked body 20S. The current jc1 has an orientation from the first magnetic layer 21 toward the third magnetic layer 23. The electrical circuit 20D is configured to supply the second current i2 described above to the stacked body 20S in the recording operation. The recording magnetic field that is emitted from the first magnetic pole 31 is effectively applied to the magnetic recording medium 80. A magnetic head can be provided in which the recording density can be increased.

The fourth embodiment may include the following configurations (e.g., technological proposals).

Configuration B1

A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first nonmagnetic layer provided between the second magnetic layer and the first magnetic layer, the first nonmagnetic layer including Cu,
a second nonmagnetic layer provided between the third magnetic layer and the second magnetic layer, and
a third nonmagnetic layer provided between the first magnetic pole and the third magnetic layer,
the second magnetic layer including a first magnetic region and a second magnetic region,
the second magnetic region being between the second nonmagnetic layer and the first magnetic region,
the first magnetic region including a first element including at least one of Fe, Co, or Ni,
the second magnetic region including
the first element, and
a second element including at least one selected from the group consisting of Cr, V, Mn, Ti, and Sc,
the first magnetic region not including the second element, or a concentration of the second element in the first magnetic region being less than a concentration of the second element in the second magnetic region.

Configuration B2

The magnetic head according to Configuration B1, wherein
the concentration of the second element in the first magnetic region is not less than 0 atomic % but less than 20 atomic %, and
the concentration of the second element in the second magnetic region is not less than 20 atomic % and not more than 50%.

Configuration B3

The magnetic head according to Configuration B1 or B2, wherein
the first magnetic layer includes Fe and Co.

Configuration B4

The magnetic head according to any one of Configurations B1 to B3, wherein
the second nonmagnetic layer includes Cu.

Configuration B5

The magnetic head according to Configuration B4, wherein
the second nonmagnetic layer includes the second element.

Configuration B6

The magnetic head according to any one of Configurations B1 to B5, wherein
the third nonmagnetic layer includes Cu.

Configuration B7

The magnetic head according to any one of Configurations B1 to B6, wherein
the third magnetic layer includes the first and second elements.

Configuration B8

The magnetic head according to any one of Configurations B1 to B6, wherein
the stacked body further includes a fourth magnetic layer,
the fourth magnetic layer is between the first magnetic pole and the third nonmagnetic layer,
the third magnetic layer includes the first element, and
the third magnetic layer does not include the second element, or a concentration of the second element in the third magnetic layer is less than the concentration of the second element in the second magnetic region.

Configuration B9

The magnetic head according to any one of Configurations B1 to B6, wherein
the stacked body further includes a fourth magnetic layer,
the fourth magnetic layer is between the first magnetic pole and the third nonmagnetic layer,
the fourth magnetic layer includes the first and second elements, and
the third magnetic layer includes the first and second elements.

Configuration B10

The magnetic head according to any one of Configurations B1 to B9, wherein
the first magnetic region contacts the first nonmagnetic layer, and
the second magnetic region contacts the second nonmagnetic layer.

Configuration B11

The magnetic head according to any one of Configurations B1 to B10, wherein
a thickness of the first magnetic region is not less than 0.5 nm and not more than 10 nm.

Configuration B12

The magnetic head according to any one of Configurations B1 to B11, wherein
a thickness of the second magnetic region is not less than 1 nm and not more than 7 nm.

Configuration B13

The magnetic head according to any one of Configurations B1 to B12, wherein
a thickness of the first magnetic layer is not less than 1 nm and not more than 3 nm.

Configuration B14

The magnetic head according to any one of Configurations B1 to B13, wherein
a thickness of the third magnetic layer is not less than 1 nm and not more than 5 nm.

Configuration B15

The magnetic head according to any one of Configurations B1 to B14, wherein
a thickness of the first nonmagnetic layer is not less than 1 nm and not more than 5 nm.

Configuration B16

The magnetic head according to any one of Configurations B1 to B15, wherein
a thickness of the second nonmagnetic layer is not less than 1 nm and not more than 5 nm.

Configuration B17

The magnetic head according to any one of Configurations B1 to B16, wherein
a thickness of the third nonmagnetic layer is not less than 1 nm and not more than 5 nm.

Configuration B18

The magnetic head according to any one of Configurations B1 to B17, wherein
a current flows through the stacked body and has an orientation from the first magnetic layer toward the third magnetic layer.

Configuration B19

A magnetic recording device, comprising:
the magnetic head according to any one of Configurations B1 to B17; and
an electrical circuit configured to supply a current to the stacked body,
the current having an orientation from the first magnetic layer toward the third magnetic layer.

Configuration B20

The magnetic recording device according to Configuration B19, further comprising:
a magnetic recording medium,
an electrical resistance of the stacked body being a first resistance when the current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current, the electrical circuit being configured to supply the second current to the stacked body in a recording operation of recording information to the magnetic recording medium by using the magnetic head.

In the magnetic heads (magnetic heads 110B, 111B and 112B) according to the fourth embodiment, the second magnetic region 22b (for example, the magnetic region having negative spin polarization) and the third magnetic layer 23 (for example, the magnetic layer having negative spin polarization) includes $(Fe_{100-x}Co_x)_{100-y}E_y$ (10 atomic %≤x≤50 atomic %, 10 atomic %≤ y≤90 atomic %). The second element E includes at least one selected from the group consisting of Cr, V, Mn, Ti and Sc. The composition ratio x and the composition ratio y are atomic percentages (atomic %). Thereby, for example, a high saturation magnetic flux density and a negative spin polarization having a large absolute value can be easily obtained. Efficient magnetization reversal is obtained. It is possible to improve the recording density.

Fifth Embodiment

Figure 29:
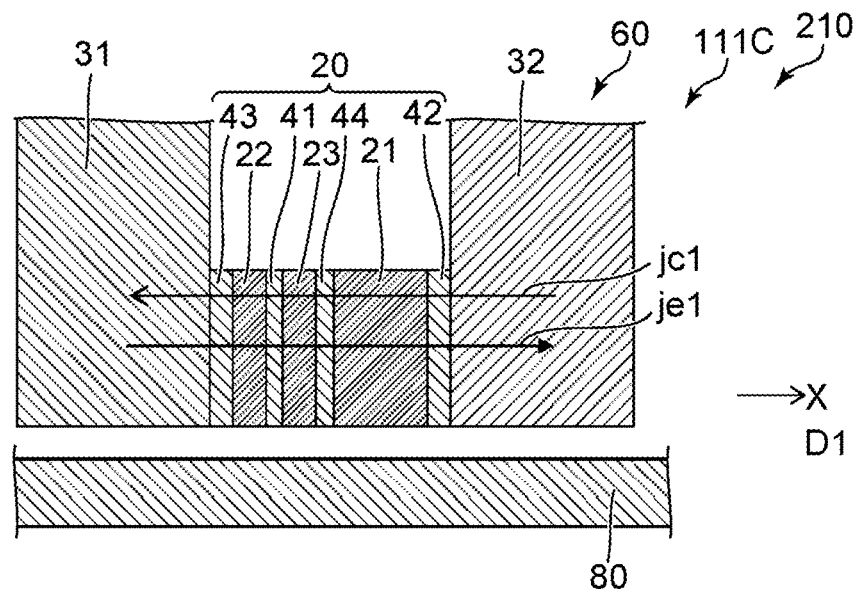
FIG. 29 is a schematic cross-sectional view illustrating a portion of a magnetic recording device according to a fifth embodiment.

FIG. 29 is a schematic cross-sectional view illustrating a portion of a magnetic recording device according to a fifth embodiment.

In a magnetic head 111C of the magnetic recording device 210 according to the fifth embodiment as shown in FIG. 29, the stacked body 20 further includes a third magnetic layer 23 and a fourth nonmagnetic layer 44 in addition to the first magnetic layer 21, the second magnetic layer 22, the first nonmagnetic layer 41, the second nonmagnetic layer 42, and the third nonmagnetic layer 43. Otherwise, the configuration of the magnetic head 111C is similar to the configuration of the magnetic head according to the second or third embodiment. An example of the magnetic head 111C will now be described.

As shown in FIG. 29, the third magnetic layer 23 is provided between the first nonmagnetic layer 41 and the first magnetic layer 21. The fourth nonmagnetic layer 44 is provided between the third magnetic layer 23 and the first magnetic layer 21. The third magnetic layer 23 includes a first element that includes at least one of Fe, Co, or Ni, and a second element that includes at least one selected from the group consisting of Cr, V, Mn, Ti, and Sc. For example, the third magnetic layer 23 has a negative polarization.

The first magnetic layer 21 and the second magnetic layer 22 include, for example, at least one of Fe, Co, or Ni. For example, a magnetic material that has a positive polarization is included. For example, the first magnetic layer 21 and the second magnetic layer 22 do not include the second element. Or, the concentrations of the second element included in the first and second magnetic layers 21 and 22 are less than the concentration of the second element included in the third magnetic layer 23.

In the magnetic head 111C, for example, the first nonmagnetic layer 41 includes at least one selected from the group consisting of Cu, Ag, Au, Al, and Cr. For example, the first nonmagnetic layer 41 functions as a layer that transmits polarized spin.

In the magnetic head 111C, for example, the second nonmagnetic layer 42 includes at least one selected from the group consisting of Cu, Ag, Au, Al, and Cr. For example, the second nonmagnetic layer 42 functions as a layer that transmits polarized spin.

In the magnetic head 111C, for example, the third nonmagnetic layer 43 includes at least one selected from the group consisting of Ta, Pt, W, Mo, Ir, Ru, Tb, Rh, Cr, and Pd. For example, the third nonmagnetic layer 43 functions as a layer that attenuates polarized spin.

In the magnetic head 111C, for example, the fourth nonmagnetic layer 44 includes at least one selected from the group consisting of Ta, Pt, W, Mo, Ir, Ru, Tb, Rh, Cr, and Pd. For example, the fourth nonmagnetic layer 44 functions as a layer that attenuates polarized spin.

A higher gain is obtained in the magnetic head 111C having such a configuration.

For example, there is a first reference example in which the third magnetic layer 23 is not provided in the configuration of the magnetic head 111C. In the first reference example, the stacked body 20 includes the first magnetic layer 21, the second magnetic layer 22, the first nonmagnetic layer 41, the second nonmagnetic layer 42, and the third nonmagnetic layer 43. The second magnetic layer 22 is located between the first magnetic pole 31 and the first magnetic layer 21. The first nonmagnetic layer 41 is located between the second magnetic layer 22 and the first magnetic layer 21. The second nonmagnetic layer 42 is located between the first magnetic layer 21 and the second magnetic pole 32. The third nonmagnetic layer 43 is located between the first magnetic pole 31 and the second magnetic layer 22. The second nonmagnetic layer 42 includes at least one selected from the group consisting of Cu, Ag, Au, Al and Cr. The third nonmagnetic layer 43 includes at least one selected from the group consisting of Ta, Pt, W, Mo, Ir, Ru, Tb, Rh, Cr and Pd. The first nonmagnetic layer 41 includes at least one selected from the group consisting of Cu, Ag, Au, Al and Cr.

Figure 30:
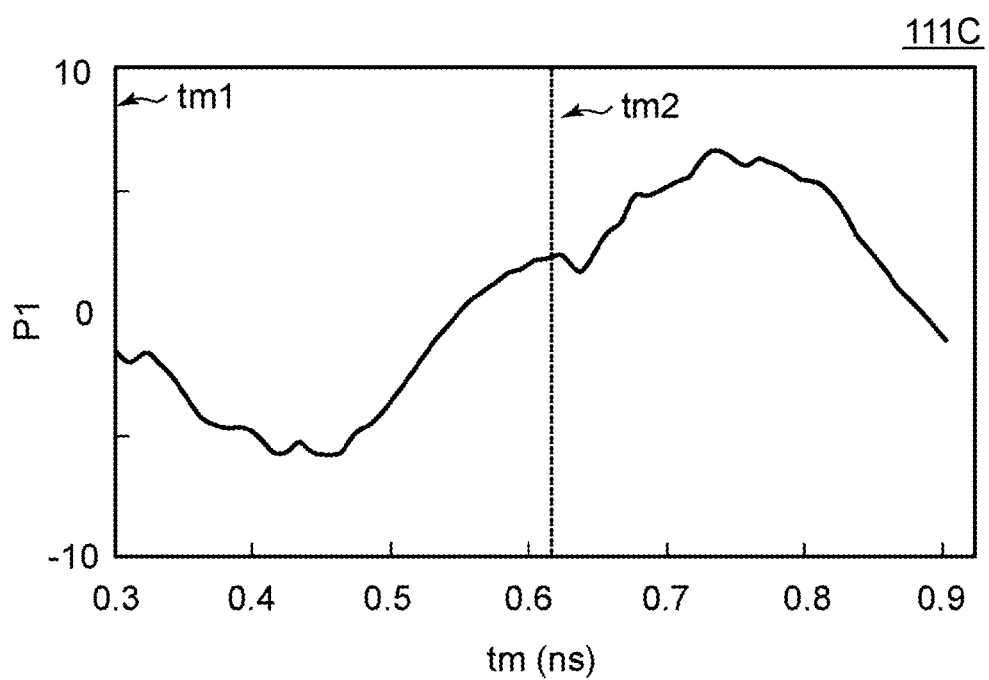
FIG. 30 is a schematic view illustrating a characteristic of the magnetic recording device according to the fifth embodiment.

FIG. 30 is a schematic view illustrating a characteristic of the magnetic recording device according to the fifth embodiment.

FIG. 30 illustrates simulation results of a characteristic of the magnetic head 111C according to the fifth embodiment. The results are illustrated for a simulation of the response of the magnetization of the total of the first magnetic layer 21, the second magnetic layer 22, and the third magnetic layer 23 when the recording current Iw is reversed while supplying the second current i2 to the stacked body 20. The horizontal axis of FIG. 30 is the time tm. The polarity of the recording current Iw reverses at the first and second times tm1 and tm2. The vertical axis of FIG. 30 is the parameter P1 corresponding to the reversal amount of the magnetization. When the parameter P1 is negative, the gain that is referenced to when a current is not supplied to the stacked body 20 increases.

In the magnetic head 111C as shown in FIG. 30, the parameter P1 is negative directly after the time at which the polarity of the recording magnetic field reverses (the first time tm1 or the second time tm2), and the parameter P1 becomes positive over time. In the magnetic head 111C, an increase of the gain is obtained when the frequency of the recording magnetic field is high and the time tm after the polarity reversal is short.

In the magnetic head 111C as shown in FIG. 30, the time tm at which the maximum value of the absolute value of the parameter P1 is obtained is 0.45 ns. On the other hand, in the first reference example described above, the time tm at which the maximum value of the absolute value of the parameter P1 is obtained is 0.4 ns. The magnetization of the first magnetic pole 31 reverses at a time that is slightly after the time at which the polarity of the recording magnetic field reverses (the first time tm1 or the second time tm2). In the magnetic head 111C, the reversal time of the magnetization of the first magnetic layer 21 better matches the reversal time of the magnetization of the first magnetic pole 31. A higher gain is obtained thereby.

A second reference example is conceivable in which the first magnetic layer 21 is provided and the second magnetic layer 22 and the third nonmagnetic layer 43 are not provided. In the second reference example, the first nonmagnetic layer 41 contacts the first magnetic pole 31.

Figure 31:
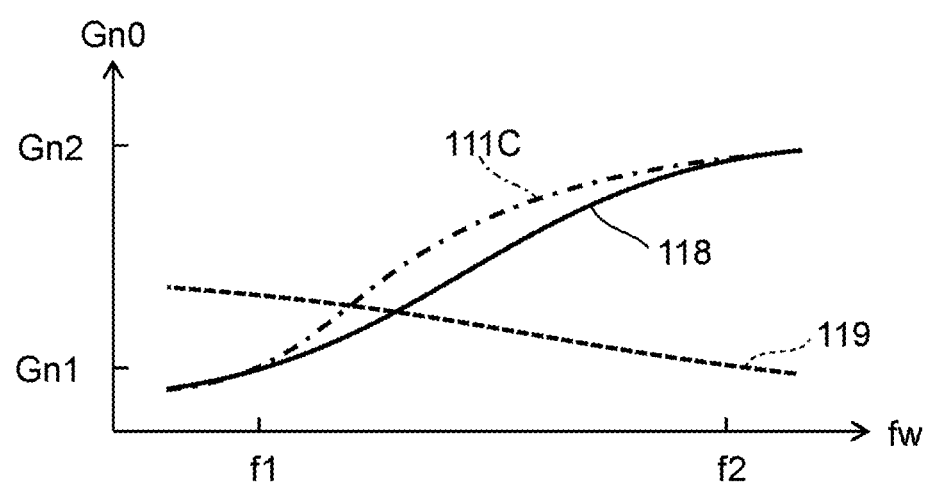
FIG. 31 is a schematic view illustrating characteristics of the magnetic recording devices.

FIG. 31 is a schematic view illustrating characteristics of the magnetic recording devices.

FIG. 31 illustrates the relationship between the gain and the frequency of the recording magnetic field for the magnetic head 118 of the first reference example, the magnetic head 119 of the second reference example, and the magnetic head 111C. The horizontal axis of FIG. 31 is the frequency fw of the recording magnetic field. The frequency fw corresponds to the frequency of the recording current Iw. The vertical axis of FIG. 31 is the gain Gn0 referenced to when a current is not supplied to the stacked body 20.

As shown in FIG. 31, compared to the magnetic head 118 of the first reference example, a high gain Gn0 is obtained at a low frequency fw in the magnetic head 111C. In the fifth embodiment as well, a high recording capacity can be obtained in a high-speed recording operation at a high frequency. The recording density can be more effectively improved.

Figure 32A:
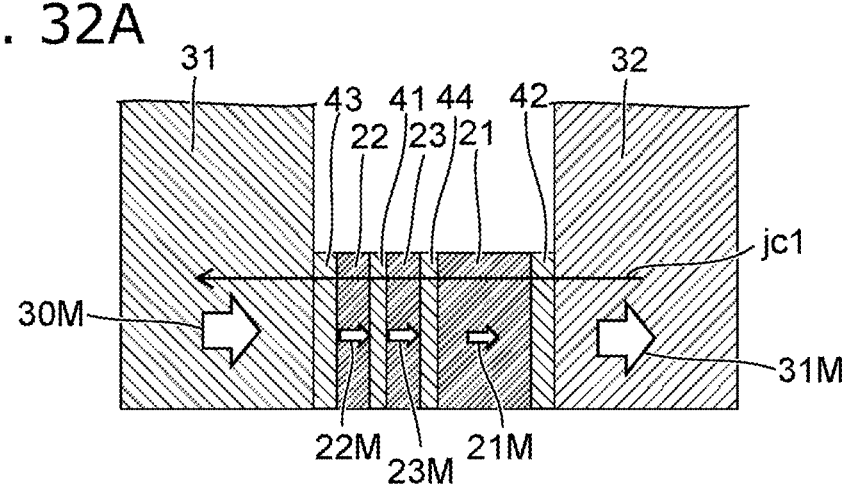
FIGS. 32A to 32C are schematic cross-sectional views illustrating characteristics of the magnetic recording device according to the fifth embodiment.
Figure 32B:
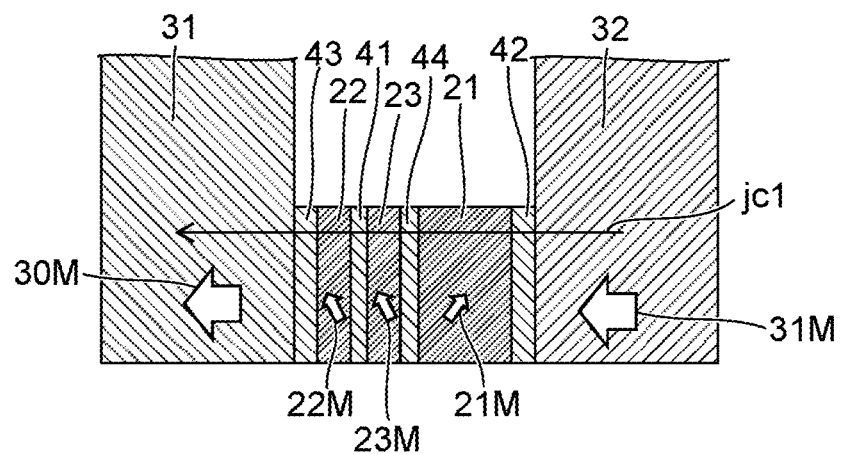
Figure 32C:
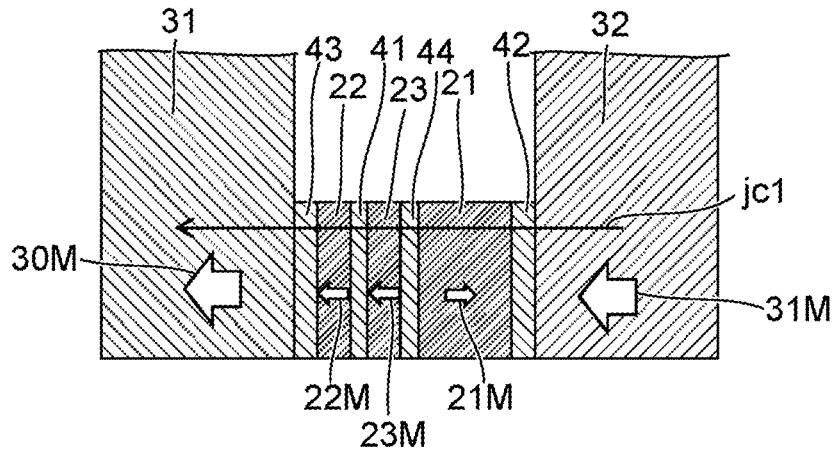

FIGS. 32A to 32C are schematic cross-sectional views illustrating characteristics of the magnetic recording device according to the fifth embodiment.

These drawings show an example of the changes of the orientations of the magnetizations of the magnetic head 111C. As shown in these drawings, for example, a magnetization 23M of the third magnetic layer 23 is interlocked with the magnetization 22M of the second magnetic layer 22.

Sixth Embodiment

Figure 33:
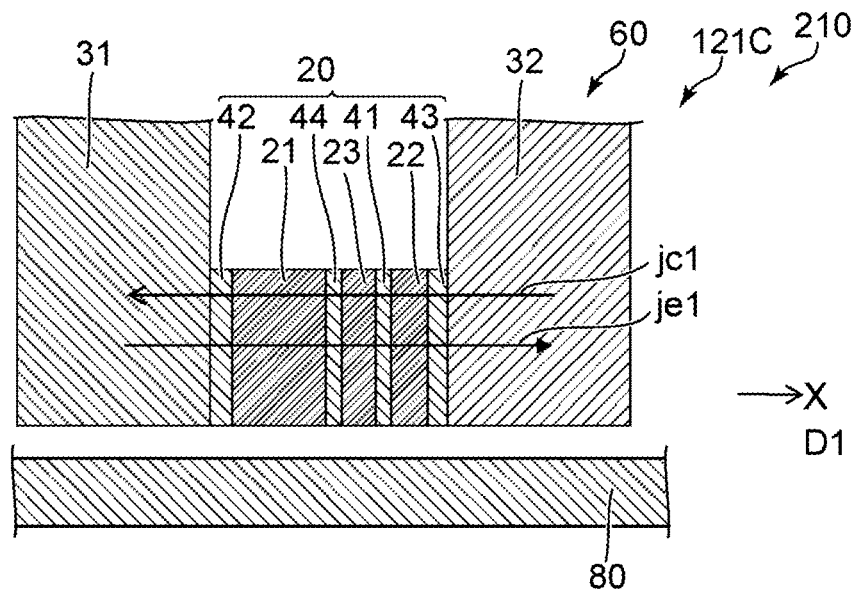
FIG. 33 is a schematic cross-sectional view illustrating a portion of a magnetic recording device according to a sixth embodiment.

FIG. 33 is a schematic cross-sectional view illustrating a portion of a magnetic recording device according to a sixth embodiment.

In a magnetic head 121C of the magnetic recording device 210 according to the sixth embodiment as shown in FIG. 33, the stacked body 20 further includes the third magnetic layer 23 and the fourth nonmagnetic layer 44 in addition to the first magnetic layer 21, the second magnetic layer 22, the first nonmagnetic layer 41, the second nonmagnetic layer 42, and the third nonmagnetic layer 43.

In the magnetic head 121C, the third magnetic layer 23 is provided between the first nonmagnetic layer 41 and the first magnetic layer 21. The fourth nonmagnetic layer 44 is provided between the third magnetic layer 23 and the first magnetic layer 21. The third magnetic layer 23 includes the first element that includes at least one of Fe, Co, or Ni, and the second element that includes at least one selected from the group consisting of Cr, V, Mn, Ti, and Sc.

The first nonmagnetic layer 41 includes at least one selected from the group consisting of Cu, Ag, Au, Al, and Cr. The second nonmagnetic layer 42 includes at least one selected from the group consisting of Cu, Ag, Au, Al, and Cr. The third nonmagnetic layer 43 includes at least one selected from the group consisting of Ta, Pt, W, Mo, Ir, Ru, Tb, Rh, Cr, and Pd. The fourth nonmagnetic layer 44 includes at least one selected from the group consisting of Ta, Pt, W, Mo, Ir, Ru, Tb, Rh, Cr, and Pd.

In the magnetic head 121C having such a configuration as well, a higher gain is obtained.

In the magnetic head 111C and the magnetic head 121C, the thickness of the third magnetic layer 23 is, for example, not less than 1 nm and not more than 5 nm. The thickness of the fourth nonmagnetic layer 44 is, for example, not less than 1 nm and not more than 5 nm. These thicknesses are lengths along the first direction D1. As described above, the first direction D1 may be tilted with respect to the X-axis direction.

According to the fifth and sixth embodiments, a magnetic recording device can be provided in which the recording density can be increased.

The fifth and sixth embodiments may include the following configurations (e.g. technological proposals).

Configuration C1

A magnetic recording device, comprising:
a magnetic head;
a magnetic recording medium; and
an electrical circuit,
the magnetic head including
 a first magnetic pole,
 a second magnetic pole, and
 a stacked body provided between the first magnetic pole and the second magnetic pole,
the stacked body including
 a first magnetic layer,
 a second magnetic layer provided between the first magnetic pole and the first magnetic layer,
 a first nonmagnetic layer provided between the second magnetic layer and the first magnetic layer,
 a second nonmagnetic layer provided between the first magnetic layer and the second magnetic pole, and
 a third nonmagnetic layer provided between the first magnetic pole and the second magnetic layer,
the second nonmagnetic layer including at least one selected from the group consisting of Cu, Ag, Au, Al, and Cr,
the third nonmagnetic layer including at least one selected from the group consisting of Ta, Pt, W, Mo, Ir, Ru, Tb, Rh, Cr, and Pd,
an electrical resistance of the stacked body being a first resistance when a current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of using the magnetic head to record information in the magnetic recording medium.

Configuration C2

A magnetic recording device, comprising:
a magnetic head;
a magnetic recording medium; and
an electrical circuit,
the magnetic head including
 a first magnetic pole,
 a second magnetic pole, and a stacked body provided between the first magnetic pole and the second magnetic pole,
the stacked body including
a first magnetic layer,
a second magnetic layer provided between the first magnetic layer and the second magnetic pole,
a first nonmagnetic layer provided between the first magnetic layer and the second magnetic layer,
a second nonmagnetic layer provided between the first magnetic pole and the first magnetic layer, and
a third nonmagnetic layer provided between the second magnetic layer and the second magnetic pole,
the second nonmagnetic layer including at least one selected from the group consisting of Cu, Ag, Au, Al, and Cr,
the third nonmagnetic layer including at least one selected from the group consisting of Ta, Pt, W, Mo, Ir, Ru, Tb, Rh, Cr, and Pd,
an electrical resistance of the stacked body being a first resistance when a current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of using the magnetic head to record information in the magnetic recording medium.

Configuration C3

The magnetic recording device according to Configuration C1 or C2, wherein
the first nonmagnetic layer includes a first material or a second material,
the first material includes at least one selected from the group consisting of Cu, Ag, Au, Al, and Cr, and
the second material includes at least one selected from the group consisting of Ta, Pt, W, Mo, Ir, Ru, Tb, Rh, and Pd.

Configuration C4

The magnetic recording device according to Configuration C1 or C2, wherein
the stacked body further includes
a third magnetic layer provided between the first nonmagnetic layer and the first magnetic layer, and
a fourth nonmagnetic layer provided between the third magnetic layer and the first magnetic layer, the third magnetic layer includes a first element that includes at least one of Fe, Co, or Ni, and a second element that includes at least one selected from the group consisting of Cr, V, Mn, Ti, and Sc,
the first nonmagnetic layer includes at least one selected from the group consisting of Cu, Ag, Au, Al, and Cr, and
the fourth nonmagnetic layer includes at least one selected from the group consisting of Ta, Pt, W, Mo, Ir, Ru, Tb, Rh, Cr, and Pd.

Configuration C5

The magnetic recording device according to any one of Configurations C1 to C4, wherein
the second current has an orientation from the first magnetic layer toward the second magnetic layer.

Configuration C6

The magnetic recording device according to any one of Configurations C1 to C5, wherein
a thickness of the second nonmagnetic layer is not less than 1 nm and not more than 5 nm.

Configuration C7

The magnetic recording device according to any one of Configurations C1 to C6, wherein
a thickness of the third nonmagnetic layer is not less than 2 nm and not more than 6 nm.

Configuration C8

The magnetic recording device according to any one of Configurations C1 to C7, wherein
the first magnetic layer and the second magnetic layer include at least one of Fe or Co.

Configuration C9

The magnetic recording device according to any one of Configurations C1 to C8, wherein
a thickness of the first magnetic layer is not less than 2 nm and not more than 8 nm.

Configuration C10

The magnetic recording device according to any one of Configurations C1 to C9, wherein
a thickness of the second magnetic layer is not less than 2 nm and not more than 4 nm.

Configuration C11

The magnetic recording device according to any one of Configurations C1 to C10, wherein
an intensity of a signal recorded in the magnetic recording medium is a first intensity when the electrical circuit does not supply the second current to the stacked body in the recording operation when a recording current corresponding to the information has a first frequency,
the intensity of the signal recorded in the magnetic recording medium is a second intensity when the electrical circuit supplies the second current to the stacked body in the recording operation when the recording current has the first frequency,
the intensity of the signal recorded in the magnetic recording medium is a third intensity when the electrical circuit does not supply the second current to the stacked body in the recording operation when the recording current corresponding to the information has a second frequency, the second frequency being greater than the first frequency,
the intensity of the signal recorded in the magnetic recording medium is a fourth intensity when the electrical circuit supplies the second current to the stacked body in the recording operation when the recording current has the second frequency, and a second ratio of the fourth intensity to the third intensity is greater than a first ratio of the second intensity to the first intensity.

In the magnetic heads (magnetic heads 111C and 121C) according to the fifth and sixth embodiments, the third magnetic layer 23 (for example, the magnetic layer having negative spin polarization) is $(Fe_{100-x}CO_x)_{100-y}E_y$ (10 atomic % ≤ x ≤ 50 atomic %, 10 atomic % ≤ y ≤ 90 atomic %). The second element E includes at least one selected from the group consisting of Cr, V, Mn, Ti and Sc. The composition ratio x and the composition ratio y are atomic percentages (atomic %). Thereby, for example, a high saturation magnetic flux density and a negative spin polarization having a large absolute value can be easily obtained. Efficient magnetization reversal is obtained. It is possible to improve the recording density.

In the first to sixth embodiments, the first magnetic pole 31 may include multiple magnetic regions arranged along the X-axis direction. The second magnetic pole 32 may include multiple magnetic regions arranged along the X-axis direction. The boundaries between the multiple magnetic regions may be clear or unclear. For example, the multiple magnetic regions are continuous.

In the following, an example of the magnetic head and the magnetic recording medium 80 included in the magnetic recording device 210 according to the first to sixth embodiments will be described.

Figure 34:
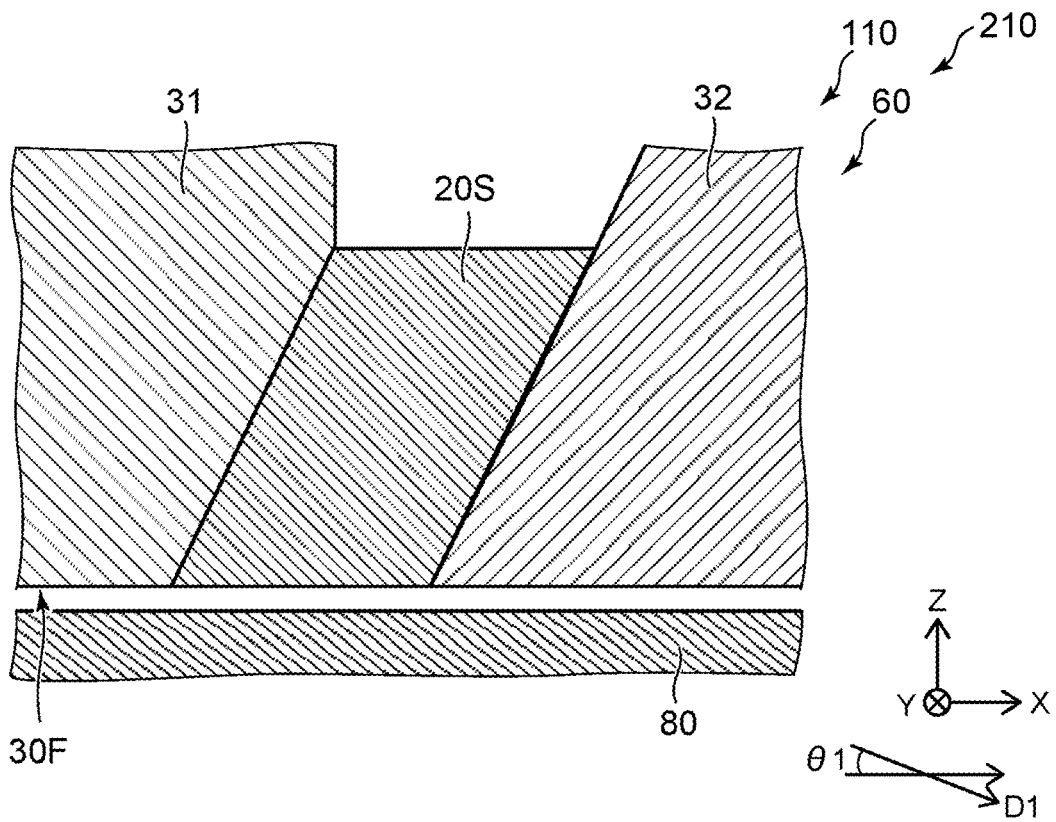
FIG. 34 is a schematic cross-sectional view illustrating the magnetic head according to the embodiment.

FIG. 34 is a schematic cross-sectional view illustrating the magnetic head according to the embodiment.

As shown in FIG. 34, in the magnetic head according to the embodiment (for example, the magnetic head 110), the first direction D1 from the first magnetic pole 31 toward the second magnetic pole 32 may be inclined with respect to the X-axis direction. The first direction D1 corresponds to the stacking direction of the stacked body 20. The X-axis direction is along the medium facing surface 30F. The angle between the first direction D1 and the medium facing surface 30F is taken as an angle θ1. The angle θ1 is, for example, not less than 15 degrees and not more than 30 degrees. The angle θ1 may be 0 degrees.

When the first direction D1 is inclined with respect to the X-axis direction, the thickness of the layer corresponds to the length along the first direction D1. The configuration in which the first direction D1 is inclined with respect to the X-axis direction may be applied to any magnetic head according to the embodiment. For example, the interface between the first magnetic pole 31 and the laminated body 20 and the interface between the stacked body 20 and the second magnetic pole 32 may be inclined with respect to the X-axis direction.

Figure 35:
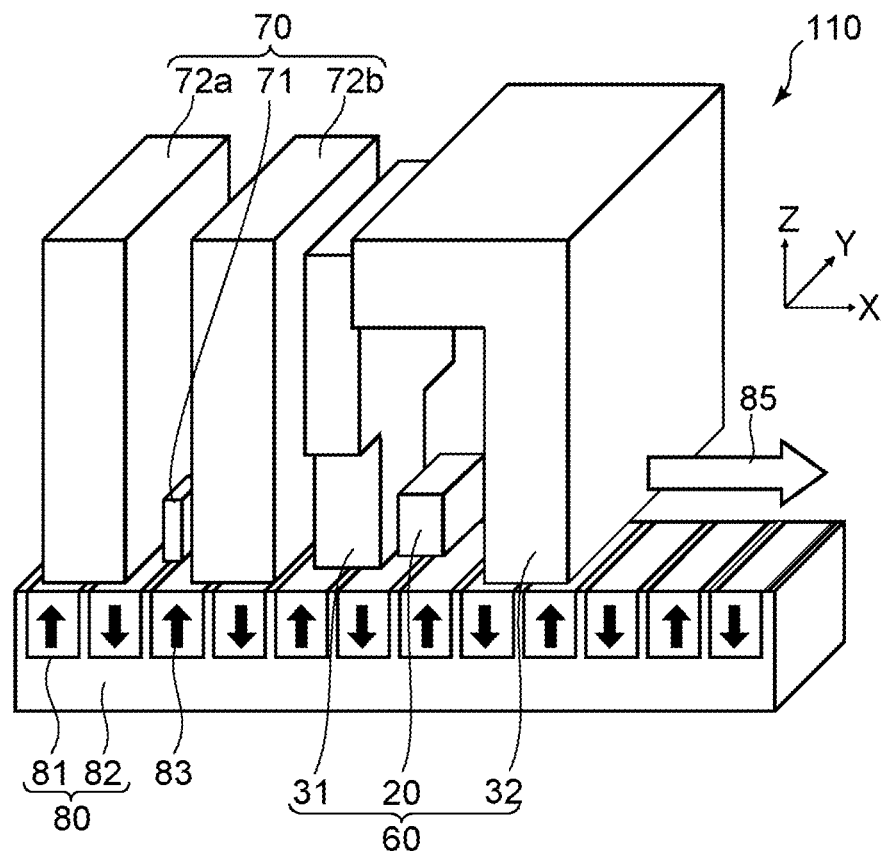
FIG. 35 is a schematic perspective view illustrating the magnetic recording device according to the embodiment.

FIG. 35 is a schematic perspective view illustrating the magnetic recording device according to the embodiment.

As shown in FIG. 35, the magnetic head according to the embodiment (for example, the magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60. For example, perpendicular magnetic recording is performed.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is possible to output a signal corresponding to the magnetization 83 of the magnetic recording layer 81.

As shown in FIG. 35, the magnetic recording medium 80 moves relative to the magnetic head 110 in a direction of the medium movement direction 85. The magnetic head 110 controls the information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 36:
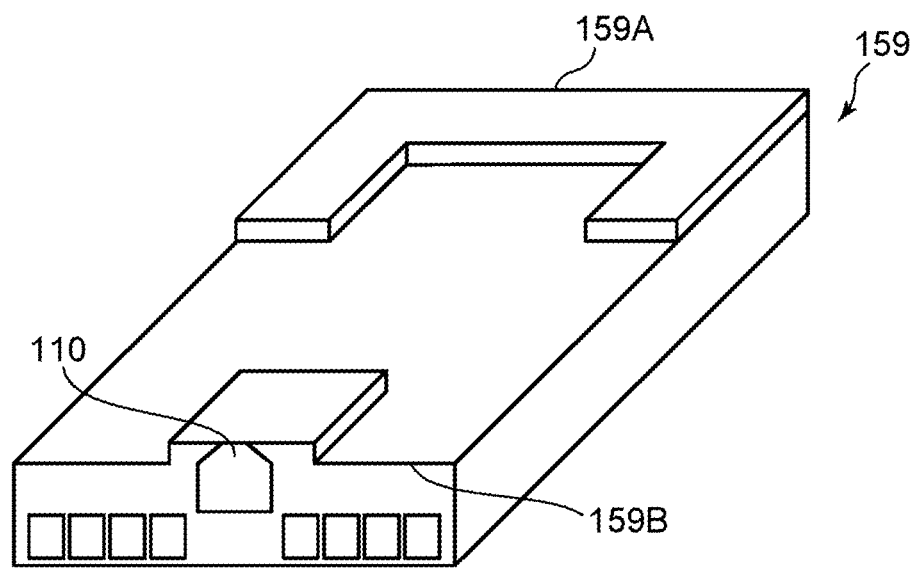
FIG. 36 is a schematic perspective view illustrating a portion of the magnetic recording device according to the embodiment.

FIG. 36 is a schematic perspective view illustrating a portion of the magnetic recording device according to the embodiment.

FIG. 36 illustrates a head slider.

The magnetic head 110 is provided on a head slider 159. The head slider 159 includes, for example, $Al_2O_3/TiC$ and the like. The head slider 159 moves relative to the magnetic recording medium while floating or contacting the magnetic recording medium.

The head slider 159 includes, for example, an air inflow side 159A and an air outflow side 159B. The magnetic head 110 is provided on the side surface of the air outflow side 159B of the head slider 159. As a result, the magnetic head 110 moves relative to the magnetic recording medium while floating or contacting the magnetic recording medium.

Figure 37:
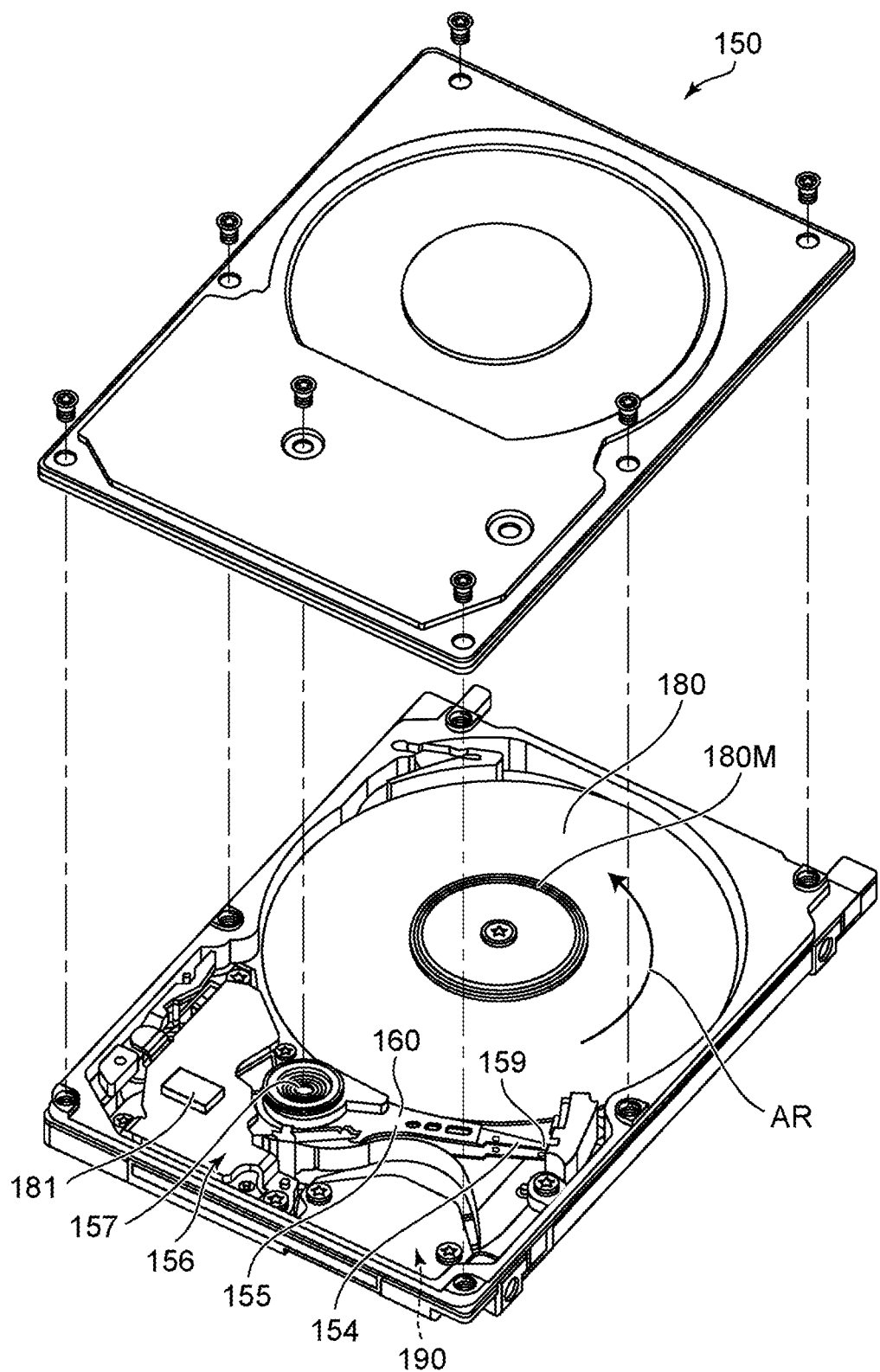
FIG. 37 is a schematic perspective view illustrating a magnetic recording device according to the embodiment.

FIG. 37 is a schematic perspective view illustrating a magnetic recording device according to the embodiment.

As shown in FIG. 37, in the magnetic recording device 150 according to the embodiment, a rotary actuator is used. A recording medium disc 180 is mounted on a spindle motor 180M. The recording medium disc 180 is rotated in the direction of an arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the pressing pressure by a suspension 154 and the pressure generated on the medium facing surface (ABS) of the head slider 159 are balanced. The distance between the media facing surface of the head slider 159 and the surface of the recording medium disc 180 is a predetermined fly height. In the embodiment, the head slider 159 may contact the recording medium disc 180. For example, a contact-sliding type may be applied.

The suspension 154 is connected to one end of an arm 155 (e.g., an actuator arm). The arm 155 includes, for example, a bobbin portion and the like. The bobbin portion holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. A drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 38A:
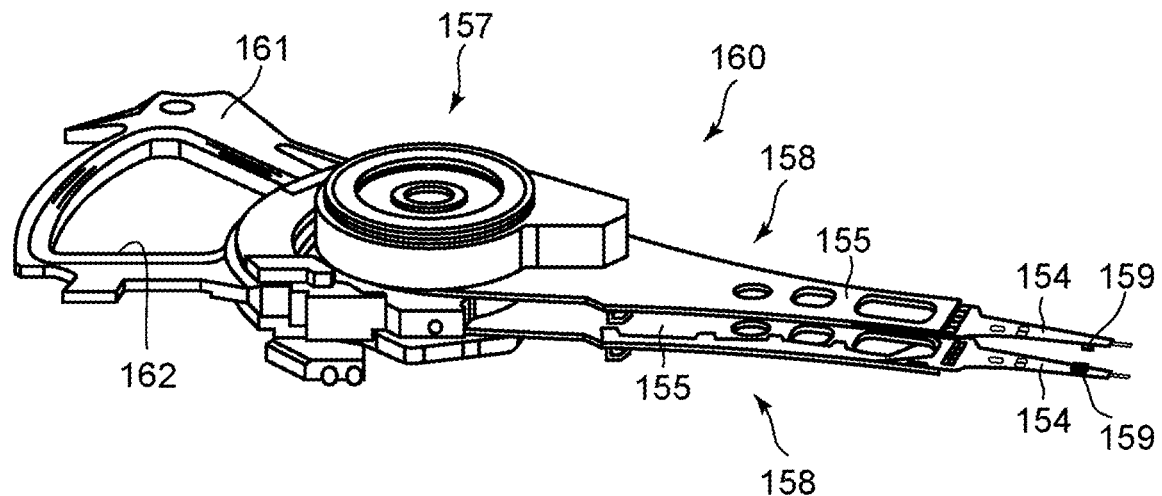
FIGS. 38A and 38B are schematic perspective views illustrating a portion of the magnetic recording device according to the embodiment.
Figure 38B:
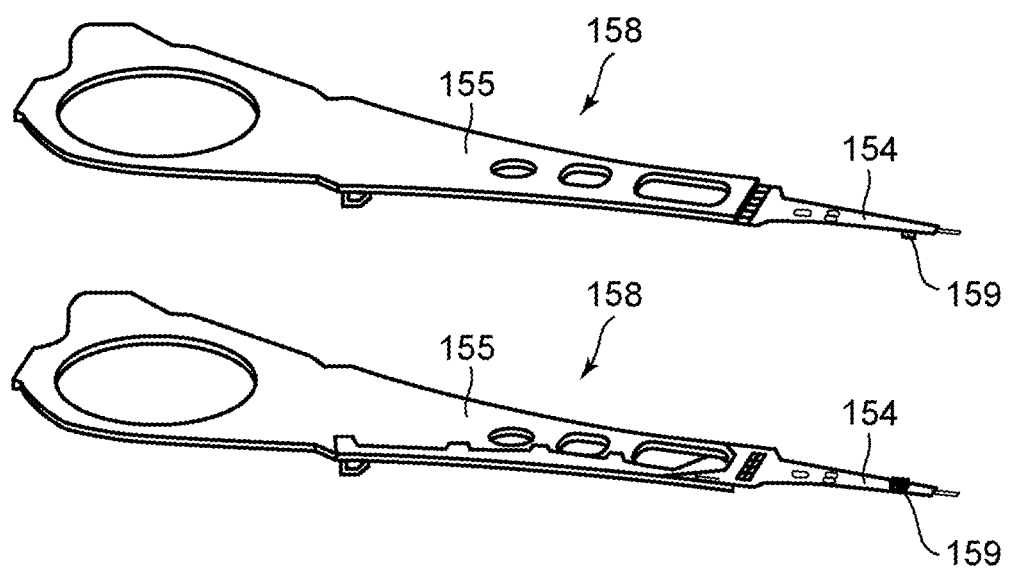

FIGS. 38A and 38B are schematic perspective views illustrating a portion of the magnetic recording device according to the embodiment.

FIG. 38A illustrates a partial configuration of the magnetic recording device and is an enlarged perspective view of a head stack assembly 160. FIG. 38B is a perspective view illustrating a magnetic head assembly (head gimbal assembly: HGA) 158 that is a portion of the head stack assembly 160.

As shown in FIG. 38A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 38B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, lead wires (not shown) for recording and reproducing signals. The suspension 154 may include, for example, a lead wire (not shown) for a heater for adjusting the fly height. The suspension 154 may include, for example, a lead wire (not shown) for a spin transfer torque oscillator. These lead wires and multiple electrodes provided on the magnetic head are electrically connected.

The magnetic recording device 150 is provided with a signal processor 190. The signal processor 190 records and reproduces a signal on a magnetic recording medium using a magnetic head. In the signal processor 190, the input/output lines of the signal processor 190 are connected to, for example, the electrode pads of the head gimbal assembly 158, and are electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces a signal on a magnetic recording medium using a magnetic head.

For example, as the above-mentioned magnetic recording medium, the recording medium disk 180 is used. The movable part includes, for example, the head slider 159. The position controller includes, for example, the head gimbal assembly 158. According to the embodiment, a magnetic head and a magnetic recording device, in which a recording density is possible to be improved, can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, nonmagnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
   a first magnetic pole;
   a second magnetic pole; and
   a stacked body provided between the first magnetic pole and the second magnetic pole, the stacked body including
      a first magnetic layer,
      a second magnetic layer provided between the first magnetic pole and the first magnetic layer, a third magnetic layer provided between the first magnetic pole and the second magnetic layer,
a first nonmagnetic layer provided between the first magnetic layer and the second magnetic pole,
a second nonmagnetic layer provided between the second magnetic layer and the first magnetic layer, and
a third nonmagnetic layer provided between the third magnetic layer and the second magnetic layer,
the first magnetic layer including $(Fe_{100-x}Co_x)_{100-y}$ (10 atomic % ≤x≤50 atomic %, 10 atomic % ≤y≤90 atomic %), a second element E including at least one selected from the group consisting of Cr, V, Mn, Ti and Sc,
the second magnetic layer including at least one of Fe, Co, or Ni, the second magnetic layer not including the second element, or a concentration of the second element in the second magnetic layer being less than a concentration of the second element in the first magnetic layer,
the third magnetic layer including $(Fe_{100-p}Co_p)_{100-q}EX_q$ (10 atomic % ≤p≤50 atomic %, 10 atomic % ≤q≤90 atomic %), a fourth element EX including at least one selected from the group consisting of Cr, V, Mn, Ti and Sc,
the second magnetic layer not including the fourth element, or a concentration of the fourth element in the second magnetic layer being less than a concentration of the fourth element in the third magnetic layer,
the first nonmagnetic layer including at least one selected from the group consisting of Cu, Ag, Au, Al, and Cr,
the second nonmagnetic layer including at least one selected from the group consisting of Cu, Ag, Au, Al, and Cr, and
the third nonmagnetic layer including at least one selected from the group consisting of Cu, Ag, Au, Al, and Cr.

2. The head according to claim 1, wherein
the composition ratio x is not less than 25 atomic % and not more than 35 atomic %, and
the composition ratio p is not less than 25 atomic % and not more than 35 atomic %.

3. The head according to claim 2, wherein
the composition ratio y is not less than 10 atomic % and not more than 30 atomic %, and
the composition ratio q is not less than 10 atomic % and not more than 30 atomic %.

4. The head according to claim 1, wherein the second nonmagnetic layer and the third nonmagnetic layer include Cr.

5. The head according to claim 1, wherein
the first nonmagnetic layer contacts the first magnetic layer and the second magnetic pole,
the second nonmagnetic layer contacts the second magnetic layer and the first magnetic layer, and
the third nonmagnetic layer contacts the third magnetic layer and the second magnetic layer.

6. The head according to claim 1, wherein the first magnetic pole contacts the third magnetic layer.

7. The head according claim 1, wherein
the stacked body further includes a fourth nonmagnetic layer,
the fourth nonmagnetic layer is located between the first magnetic pole and the third magnetic layer, and
the fourth nonmagnetic layer includes at least one selected from the group consisting of Cu, Ag, Au, Al, and Cr.

8. The head according to claim 7, wherein the fourth nonmagnetic layer contacts the first magnetic pole and the third magnetic layer.

9. The head according to claim 7, wherein a thickness of the fourth nonmagnetic layer is not less than 1 nm and not more than 5 nm.

10. The head according to claim 1, wherein a second current has an orientation from the first magnetic layer toward the second magnetic layer.

11. The head according claim 1, wherein a thickness of the first nonmagnetic layer is not less than 1 nm and not more than 5 nm.

12. The head according claim 1, wherein a thickness of the second nonmagnetic layer is not less than 1 nm and not more than 5 nm.

13. The head according to claim 1, wherein a thickness of the third nonmagnetic layer is not less than 1 nm and not more than 5 nm.

14. The head according to claim 1, wherein a thickness of the first magnetic layer is not less than 2 nm and not more than 8 nm.

15. The head according to claim 1, wherein a thickness of the second magnetic layer is not less than 2 nm and not more than 5 nm.

16. The head according to claim 1, wherein a thickness of the third magnetic layer is not less than 2 nm and not more than 5 nm.

17. A magnetic recording device, comprising:
the magnetic head according to claim 1;
a magnetic recording medium; and
an electrical circuit,
an electrical resistance of the stacked body being a first resistance when a current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current, and
the electrical circuit being configured to supply the second current to the stacked body in a recording operation of using the magnetic head to record information in the magnetic recording medium.

* * * * *